US009282384B1

(12) United States Patent
Graves

(10) Patent No.: US 9,282,384 B1
(45) Date of Patent: Mar. 8, 2016

(54) SYSTEM AND METHOD FOR COMMUTATION IN PHOTONIC SWITCHING

(71) Applicant: Huawei Technologies Co., Ltd., Shenzhen (CN)

(72) Inventor: Alan Frank Graves, Kanata (CA)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 14/508,676

(22) Filed: Oct. 7, 2014

(51) Int. Cl.
*H04Q 11/00* (2006.01)

(52) U.S. Cl.
CPC ... *H04Q 11/0005* (2013.01); *H04Q 2011/0037* (2013.01)

(58) Field of Classification Search
CPC ................ H04Q 11/0005; H04Q 2011/0037; H04Q 2011/0052; H04J 2203/0003; H04J 2203/0005; H04J 2203/0012; H04J 2203/0021
USPC ............................... 398/45, 46, 48, 51, 52, 54
See application file for complete search history.

(56) References Cited

U.S. PATENT DOCUMENTS

| 6,704,307 | B1 * | 3/2004 | Graves ............... H04Q 11/0478 370/372 |
| 2002/0186434 | A1 | 12/2002 | Roorda et al. |
| 2003/0035613 | A1 | 2/2003 | Huber et al. |
| 2007/0047541 | A1 * | 3/2007 | Beshai .................. H04L 49/103 370/389 |
| 2009/0220192 | A1 | 9/2009 | Presley et al. |
| 2009/0232497 | A1 | 9/2009 | Archambault et al. |
| 2014/0161450 | A1 | 6/2014 | Graves et al. |
| 2014/0269351 | A1 | 9/2014 | Graves et al. |
| 2014/0334821 | A1 * | 11/2014 | Mehrvar ............ H04Q 11/0005 398/54 |

FOREIGN PATENT DOCUMENTS

WO 2009051954 A1 4/2009

OTHER PUBLICATIONS

Chi, N. et al., "Experimental Characteristics of Optical Crosspoint Switch Matrix and Its Applications in Optical Packet Switching," Journal of Lightwave Technology, vol. 24, No. 10, Oct. 2006, pp. 3646-3653.
Van Campenhout, J. et al., "Low-power, 2x2 silicon electro-optic switch with 110-nm bandwidth for broadband reconfigurable optical networks," Optics Express, vol. 17, No. 26, Dec. 21, 2009, pp. 24020-24028.
International Search Report for Application No. PCT/CN2015/090145, mailed Dec. 21, 2015, 11 pages.

* cited by examiner

*Primary Examiner* — Dalzid Singh
(74) *Attorney, Agent, or Firm* — Slater & Matsil, L.L.P.

(57) ABSTRACT

In one embodiment, photonic switching fabric includes an input photonic commutator switch configured to receive a photonic frame stream including a plurality of containerized photonic packets and a first high port count photonic switch coupled to the input photonic commutator switch. The photonic switching fabric also includes a second high port count photonic switch coupled to the input photonic commutator switch, where the input photonic commutator switch is configured to route the photonic frame to either the first high port count photonic switch or the second high port count photonic switch and an output photonic commutator switch coupled to the first high port count photonic switch and the second high port count photonic switch, where the output photonic commutator switch is configured to output a switched photonic frame.

23 Claims, 29 Drawing Sheets

SYSTEM AND METHOD FOR COMMUTATION IN PHOTONIC SWITCHING

TECHNICAL FIELD

The present invention relates to a system and method for communications, and, in particular, to a system and method for photonic networks.

BACKGROUND

Data centers route massive quantities of data. Currently, data centers may have a throughput of 5-7 terabytes per second, which is expected to drastically increase in the future. Data centers contain of huge numbers of racks of servers, racks of storage devices and other racks, all of which are interconnected via a massive centralized packet switching resource. In data centers, electrical packet switches are used to route all data packets, irrespective of packet properties, in these data centers.

The racks of servers, storage, and input-output functions contain top of rack (TOR) packet switches which combine packet streams from their associated servers and/or other peripherals into a lesser number of very high speed streams per TOR switch routed to the electrical packet switching core switch resource. The TOR switches receive the returning switched streams from that resource and distribute them to servers within their rack. There may be 4×40 Gb/s streams from each TOR switch to the core switching resource, and the same number of return streams. There may be one TOR switch per rack, with hundreds to tens of thousands of racks, and hence hundreds to tens of thousands of TOR switches in a data center. There has been a massive growth in data center capabilities, leading to massive electronic packet switching structures.

These electronic switching structures are problematic to design, consume large amounts of power, and have limited throughput. Photonic switching consumes less power and has a high throughput with different capabilities and different architectures.

SUMMARY

An embodiment photonic switching fabric includes an input photonic commutator switch configured to a photonic frame stream including a plurality of containerized photonic packets and a first high port count photonic switch coupled to the input photonic commutator switch. The photonic switching fabric also includes a second high port count photonic switch coupled to the input photonic commutator switch, where the input photonic commutator switch is configured to route the photonic frame to either the first high port count photonic switch or the second high port count photonic switch and an output photonic commutator switch coupled to the first high port count photonic switch and the second high port count photonic switch, where the output photonic commutator switch is configured to output a switched photonic frame.

An embodiment method of photonic packet switching includes toggling a first optical commutator switch during a first period of time and receiving a first packet of a photonic packet stream. The method also includes directing the first packet to a first high port count photonic switch and switching the first packet by the first high port count photonic switch to produce a first switched photonic packet during a second period of time, where the second period of time is after the first period of time. Additionally, the method includes setting up a second high port count photonic switch during the second period of time.

An embodiment method of controlling a photonic switching fabric includes toggling an input commutator switch during a first period of time and toggling an output commutator switch during the first period of time. The method also includes determining a first connection map for the photonic switching fabric by a first control module during a second period of time, where the second period of time is after the first period of time and transmitting the first connection map to the photonic switching fabric by a second control module during the second period of time.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
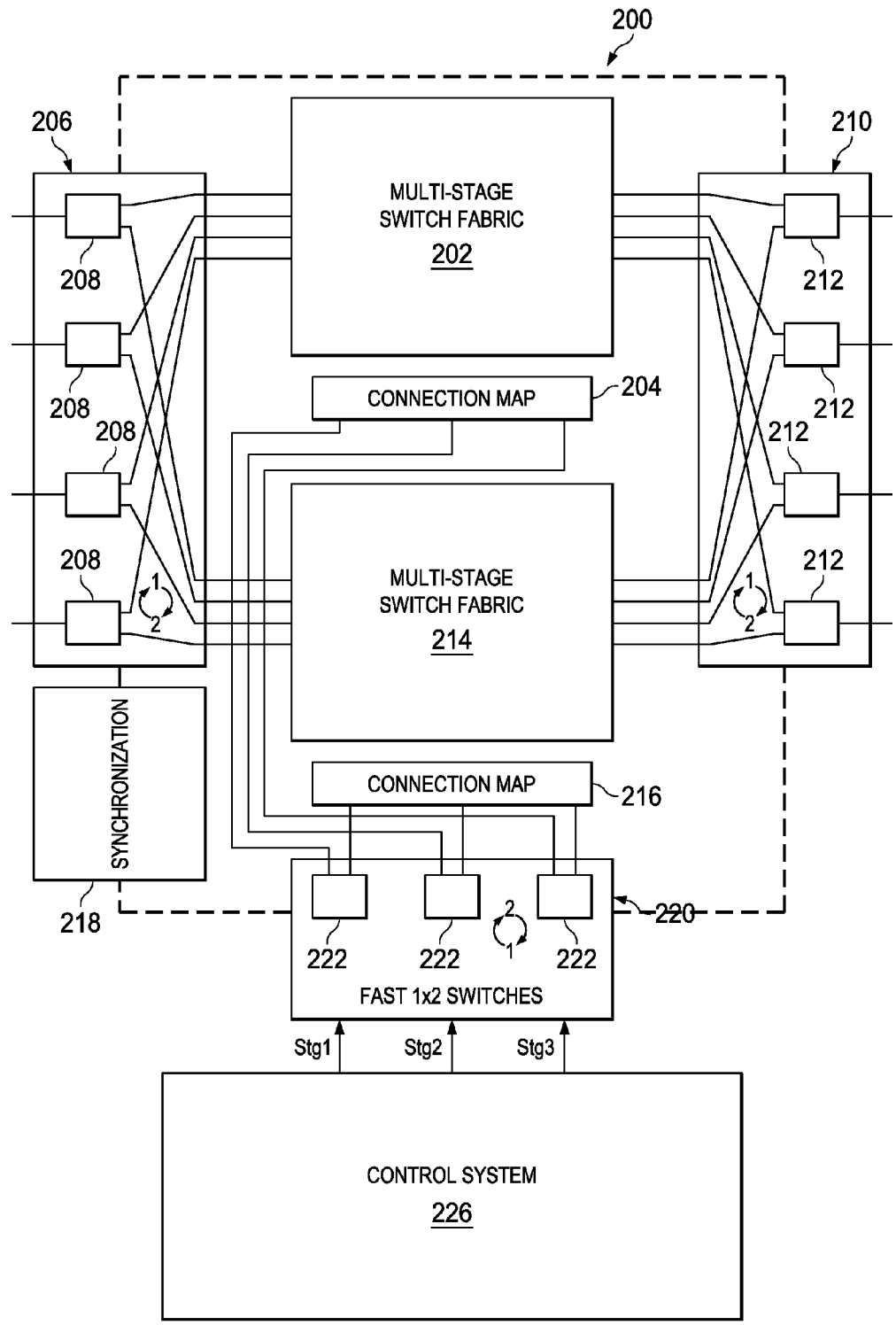
FIG. 1 illustrates an embodiment system for photonic packet switching with commutation.

It should be understood at the outset that although an illustrative implementation of one or more embodiments are provided below, the disclosed systems and methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Reference to data throughput and system and/or device capacities, numbers of devices, and the like is purely illustrative, and is in no way meant to limit scalability or capability of the embodiments claimed herein.

In an embodiment, there is a hybrid photonic/electronic packet switch based on splitting packet streams into higher bandwidth streams of long packets and lower bandwidth streams of short packets. The long packets may be padded out to a constant length and switched by a high throughput photonic synchronous circuit switch with a very high frame rate. The short packets are switched in an electronic packet switch. In this approach, 80-95% of the bandwidth is switched photonically, with the remaining 5-20% switched electronically. This splitting, with the majority of the bandwidth passing through the photonic switch, results in the electronic node reaching a throughput bandwidth capacity at an overall node capacity of 5-20 times the capacity of a comparable all-electronic node. A synchronous photonic circuit switch, where the paths each carry one long containerized packet per frame, having a frame rate of approximately 120 ns for a 100 Gb/s interfaced switch or approximately 300 ns for a 40 Gb/s interfaced switch, with an inter-packet gap time of 2.4 ns for 40 Gb/s or 1 ns for 100 Gb/s.

While photonic switching is attractive in communications because high port count photonic switches may switch enormous bandwidths of data, and the bandwidth per port may be very high, the aggregated switching times and timing skew or offset of high port count multi-stage photonic switches may be relatively large. For example, the switching time of complex multistage carrier injection switches in silicon waveguides may range from under 10 ns to more than 30 ns. Also, photonic switches may lack photonic stores, buffers, or other means to re-time photonic signals.

An embodiment is based on linear arrays of very fast 1:2 and 2:1 switches, for example lithium niobate switches with a sub-1 ns switching and skew time, toggling between two high port count complex switching matrices, such as multi-stage switches based on very large scale integration (VLSI) injected carrier electro-optic switches in silicon, which may have a high timing skew from their physical size, and may take a relatively long time to switch. This embodiment may facilitate a photonic switching fabric containing two parallel large switching fabrics, where one high port count switching fabric is set up while the other provides a frame of long packet connectivity before the high port count switches swap roles. A high port count switch may be a single stage or multistage switch with=four or more ports. It may have many more ports, for example hundreds or thousands of ports, which is facilitated by the use of a complex multistage structure. This approach uses small fast photonic commutator switches and slower large complex photonic switches to produce a large fast photonic switching node.

Complex pipelined control may be used to control a photonic switch. In pipelined control, a series of control elements perform sub-tasks to generate an overall connection map for the overall control. The control elements perform sub-tasks in one frame period before handing off the results of that sub-task to the next element in time in the pipeline. Then, the first element repeats its sub-task for the next frame. Commutation in the control area may be used to multiply the pipeline cycle time, thereby relaxing the processing speed demands. Commutation facilitates the pipeline step time being a multiple of the packet period. This can extend the overall pipeline processing delay and/or facilitate the more efficient use of fewer larger processing steps between pipeline element hand-offs, maintaining or shortening the overall pipeline and its delay because of the reduced time required for step-to-step information hand-offs.

Commutation of the traffic switching path to relax switching time and skew limits of the fabrics and commutation of the control path to relax time constraints on the steps may be used together or separately.

An embodiment separates the process of setting up a switch from the process of passing traffic through the switch. It may provide switching of a long packet stream with short inter-packet gaps (IPGs). A slow set up time high port count switch may have a setup time period with a commutation level of two and switch packets with relatively short inter-packet gaps. With a commutation level of n, the allowable switching set up time is (n−1) frames.

Embodiment techniques may be used to reduce the timing constraints on a large packet switch used in an overall switching node where the packets are split into long and short packets. The short packets below a given threshold are switched electrically, while the long packets are padded and switched photonically in a synchronous photonic switch structure.

An embodiment uses a high throughput photonic node with dual high port count fabrics which provides a fast connection set up time between packets. This approach facilitates relaxed timing and skew for high port count switching structures. Photonic switching technologies are combined with one high speed technology and one large port count technology. A commutated pipelined control system facilitates the pipeline element speed of operation being separated from the frame time of the switch by a factor of the commutation level.

Fast, low skew photonic circuit switching fabrics may switch transport paths of high bandwidth, for example 25-400 Gb/s or more per path, for example long packets of one of four streams of a sub-multiplexed 100 gigabit Ethernet (GE), 100 GE, or a sub-multiplexed or entire 400 GE in a fast photonic circuit switch. The constituent high port count switches in the overall switching fabric may have a slow set up time, a higher level of skew or both, from the precision of control timing and the physical speed of operation of the electro-optic control of the switch.

A large complex high port count photonic switch may be combined with small 2:1 and 1:2 fast, low skew, photonic switches. This facilitates two separate large switching fabrics surrounded by 1:2 fast switches on the inputs and fast 2:1 switches on the outputs. Together, the switches operate as a single large switching fabric with the set-up speed of the 1:2 switches when the set-up time of the large switch is less than the hold time between consecutive set-ups.

FIG. 1 illustrates system 200 with two high port count photonic switches with arrays of 1:2 and 2:1 fast, low skew, photonic switches. Array 206 contains commutators 208, which receive optical packet stream inputs. Commutators 208, 1×2 fast photonic switches, operate within the inter-packet gap in the packet stream. One switch carries traffic while the other is being set up, and then they switch roles. The commutators are toggled at the frame rate of a switched entity, such as a long packet switch which switches packets above a given threshold in containers with their payloads padded to a fixed length.

This process is referred to as commutation, because it is analogous to the commutation in an electrical motor. In a two way commutated system the switches provide full connectivity for half of the time, while the other switch is being set up to handle the following time period. Then, the roles of the two switches are reversed. Between the two switches, they provide full connectivity. The set-up times of the large multi-stage fabrics are not visible to the through traffic.

Array 206 directs incoming photonic packets to either high port count switch 202 or high port count switch 214. While one high port count switch is switching the packets of a given frame, the other high port count switch is being set up to switch the incoming packets of the next frame.

The switched photonic packets are sent to array 210, which contains commutator switches 212, 2:1 fast photonic switches. Commutator switches 212 alternately connect switches 202 and 214 to the output ports of the overall switch node, alternating at the frame rate to produce a continuous output. Thus, the switched photonic packets are output as a continuous stream through commutator switches 212.

Control system 226 coordinates the control in the photonic switches. Control system 226 generates control signals for various photonic switching stages, for example, for a first stage, a second stage, and a third stage in the high port count switches and the commutator switches. This control signal may be in the form of a computed connection map for each frame of packet connections, where this frame connection map is delivered to the correct large multi-stage switch fabric.

The signals are sent to the high port count switch switches via array 220, which contains electrical commutator switches 222, which route the control signal to the appropriate high port count switch. They alternately send connection map 204 for high port count switch 202 or connection map 216 for high port count switch 214 in synchronism with the toggling of the traffic commutators.

Synchronization block 218 synchronizes one commutation step per timeslot.

The speed-of-light propagation skew on the traffic paths through the two fabrics is set to be within the inter-packet gap (IPG). The cabling lengths are carefully selected to facilitate proper timing, because 1 ns is the time taken for light to propagate about 8 inches (20 cm) in fiber. The propagation skew is defined as the variation in delay along the various paths through the overall switch fabric and modulates the placement of the output IPG. When using commutation, the multi-stage switching fabrics have one time slot, for example 120 ns or 300 ns, for their control skew and set up time, rather than the IPG, which may be 1-2.5 ns. In addition, the IPG may be modified within certain limits (e.g. a factor of 2-10) by accelerating the packet clock.

In an embodiment non-commutated long packet switch with 100 Gb/s packet streams, the switching frame, the period a long packet lasts, is about 120 ns, while the set-up plus skew time may be 5-30 ns. In a commutated structure, when the fast set-up 1:2 switches have a set up and skew time of less than 1 ns, the set-up time of the high port count switches may be up to about 118 ns without a negative impact on the throughput of the entire photonic switching fabric for long packets with 100 Gb/s nominal bit rate streams.

Figure 2:
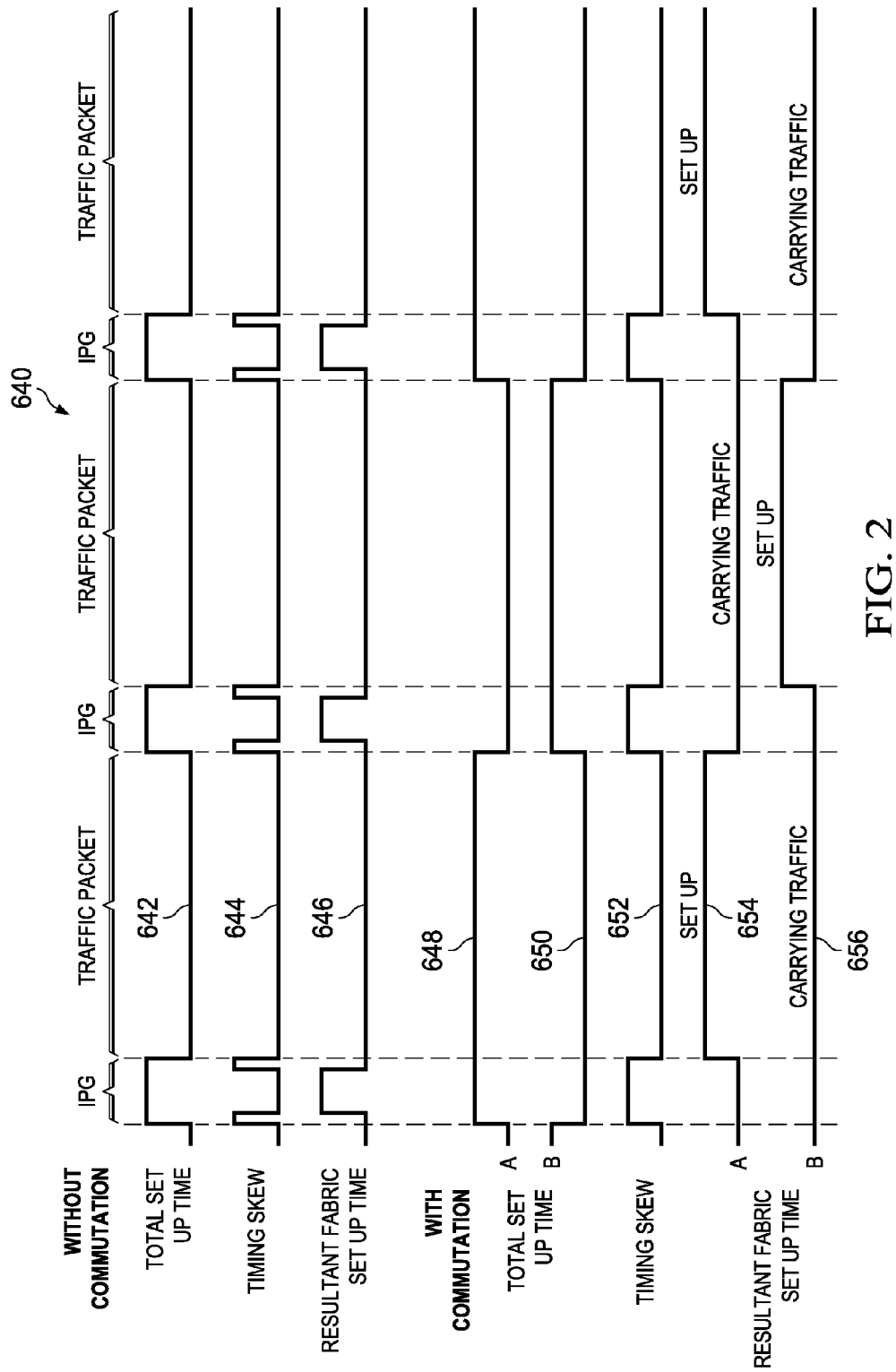
FIG. 2 illustrates a timing diagram for photonic packet switching with commutation and without commutation.

FIG. 2 illustrates timing diagram 640 for non-commutated and commutated photonic switches. The frame period of the switch is the duration of the traffic packet plus the IPG. In 40 GE, this is around 300 ns for a 1500 byte long packet plus 2.5 ns for the IPG, in 100 GE this is 120 ns for a 1500 byte long packet plus 2 ns for the IPG, and for 400 GE this is around 30 ns for a 1500 byte long packet plus 0.25 ns for the IPG.

Without commutation, the total set-up time is shown by trace 642, the timing skew is shown by trace 644, and the resultant fabric set-up time is shown by trace 646. The fabric is set up during the IPG, because the tail end of the previous packet passes before set up is initiated, and the set up is completed before the leading edge of the next packet arrives. This places requirements on the setup time of the physical photonic crosspoints plus on the timing effects (control timing skew) of the electronic control of those crosspoints. The total set-up time includes timing skew and tolerances as well as the resultant actual set-up time for the photonic switching fabric. In an 80:20 split, where 20% of the timing budget is allocated to skew and 80% to the switch set-up time, the switch is set up in 2 ns for 40 GE, 800 ps for 100 GE, and 200 ps for 400 GE.

With commutation, the total set-up time for switch A is shown by trace 648, the total set-up time for switch B is shown by trace 650, the timing skew is shown by curve 652, the resultant fabric set-up time for switch A is shown by trace 654, and the resultant fabric set-up time for switch B is shown in trace 656. Switch A and switch B, high port count switches, are toggled between being connection paths based on a prior set up and being set-up, where switch A is toggled in anti-phase with switch B. The timing skew on the high port count switches may be entering or exiting commutation elements, while the large switches have periods equal to the traffic packet duration for set-up or connectivity. This leads to a timing skew on the large switches of about 1 ns or 2.5 ns for 100 GE and 40 GE, respectively, without packet acceleration or around 5 ns or 12 ns for a moderately accelerated system at 100 GE or 40 GE, respectively, with acceleration around 3.5% in both cases. At 100 GE, this provides alternating 120 ns packet periods. Propagation skew due to variable path lengths through the switch may be addressed so packets from different sources are properly interleaved at the output stage of the switch (in a non-commutated switch) or at the output commutator (in a commutated switch). For example, the optical paths are as close as possible to equal delays. Propagation average may be addressed by the output commutators timing being delayed by the average propagation time through the switch.

Commutation switching of the photonic inputs and outputs of high port count photonic switches is timed within the IPG period by the regular cyclic toggling of an array of fast 1:2 and 2:1 switches. Fast 1:2 and 2:1 photonic switches, with a speed of about 0.1 ns to about 0.5 ns may be made from lithium niobate (LiNbO$_3$). Thus, a photonic switching fabric contains large slow photonic switches and small fast photonic switches to create a large fast photonic switching fabric.

Commutation may also be used in a control system for a synchronous photonic circuit switching fabric. Multiple control systems, for example pipelined control systems, operate in a cyclic manner on sequential time slots of the packet streams. The switch is completely re-set up for each time slot with no dependence on the previous or pre-existing connections. Hence, control information is not passed from time slot to time slot. Information may be passed between commutation phases in some embodiments.

With two way commutation, one controller or control pipeline processes the connectivity data of packets 1, 3, 5, 7, 9, etc. while the other controller or control pipeline processes the connectivity data of frames 0, 2, 4, 6, 8, increasing the processing step window from one packet time slot to two packet time slots. For example, with 40 Gb/s streams, the processing time increases from 300 ns to 600 ns, and for 100 Gb/s streams, the processing time or processing time per step for pipelined controllers increases from 120 ns to 240 ns.

Figure 3:
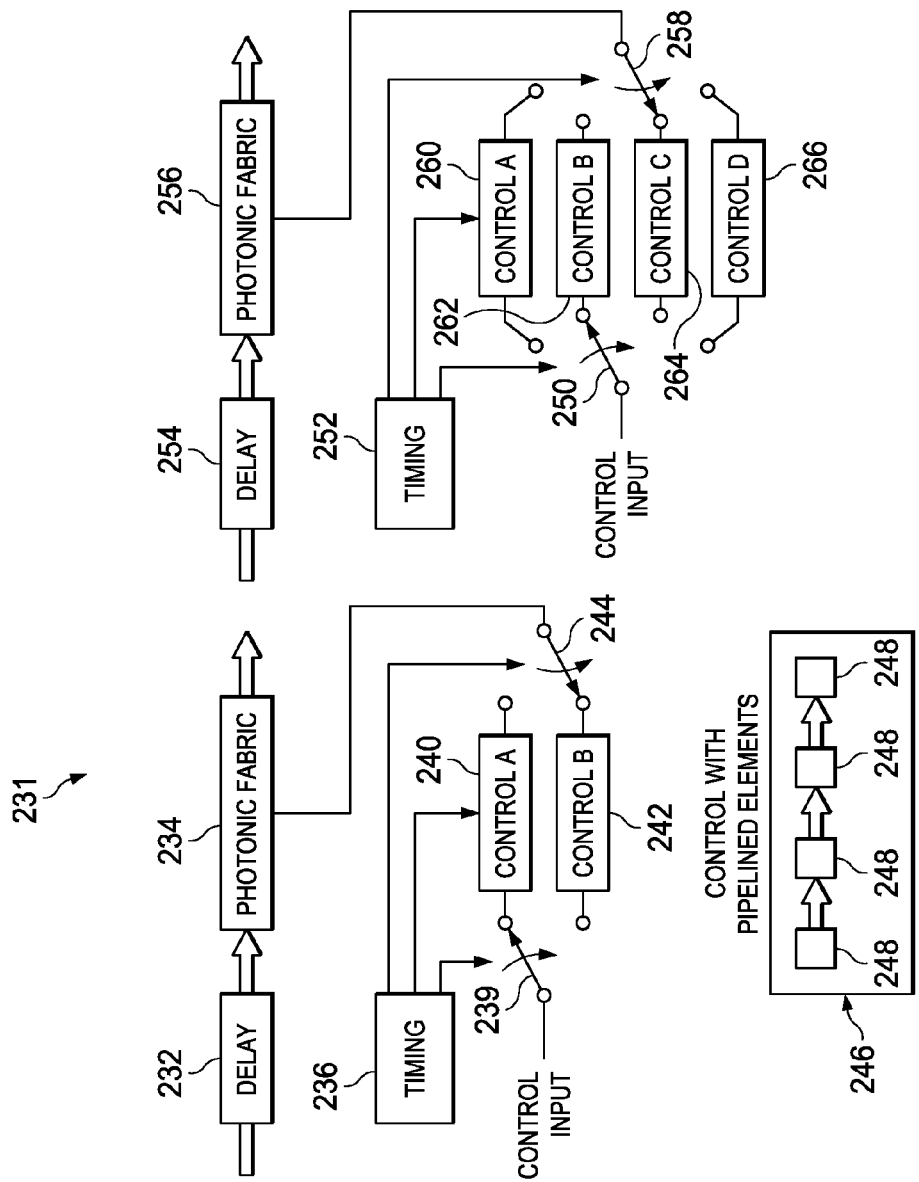
FIG. 3 illustrates embodiment commutated control systems for photonic packet switching.

FIG. 3 illustrates switching systems 231 with commutated control structures. The left portion of control structure 231 shows two way commutation applied to a control structure, which doubles the available cycle time for the control system for each stage of a pipelined control system and halves the processing rate by presenting only half of the connection information. While control system 240 is receiving and starting to process information from the control input through commutator 239 and output by switch 244, control system 242 is completing processing. Then, control system 242 outputs the processed information to high port count switch 234 through switch 244. Switches 239 and 244 toggle, and the process is repeated with new information from control input flowing to control system 242 while control system 240 completes processing its information from the previous period and outputting it to control high port count switch 234. Hence, the control information entering the control input is received and processed, and the switch is under control at all times, but the load is time sliced into two control systems, each processing at half the rate. When the control systems are pipeline control systems, for example pipeline control 246 with pipeline elements 248, a number of processing stages and information is sequentially handed from stage to stage so new information for processing enters the pipeline stage 1, and the period between handovers between stages is doubled. The photonic packet stream wait in delay 232 before reaching high port count switch 234 to account for the processing time. Timing block 236 controls the switches to synchronize the timing.

In another example, there may be a higher degree of commutation. For example, there may be 3, 4, 5, or more degrees of commutation. For example, 8 way control commutation uses eight parallel processing pipelines operating on an eight packet time slot processing step, for example 2.4 µs for 40 Gb/s packet streams, 960 ns for 100 Gb/s packet streams, and 240 ns for 400 Gb/s packet streams. Processing stream 1 processes frames 1, 9, 17, 25, 33, . . . , processing stream 2 processes frames 2, 10, 18, 26, 34, . . . , processing stream 3 processes frames 3, 11, 19, 27, 35, . . . , processing stream 4 processes frames 4, 12, 20, 28, 36, . . . , processing stream 5 processes frames 5, 13, 21, 29, 37, . . . , processing stream 6 processes frames 6, 14, 22, 30, 38, . . . , processing stream 7 processes frames 7, 15, 23, 31, 39, . . . , and processing stream 8 processes frames 8, 16, 24, 32, 40, . . . .

The right side of control structure 231 shows fourth degree control commutation. Control systems 260, 262, 264, and 266 operate in a sequentially offset manner processing control input through input commutator 250 from timing block 252 and outputting the control information to high port count switch 256 through switch 258. The packet stream is delayed by delay 254. The control systems may each contain a pipelined control.

There are a variety of solid state photonic switches, depending on the material used. Indium phosphide and gallium-indium-arsenic-phosphide have good optical properties, but are problematic to scale to very large structure. Silicon has somewhat less advantageous optical properties than indium phosphide and gallium-indium-arsenic-phosphide, but still has good optical properties, especially in the 1300 nm to 1550 nm range, and may be readily scaled to provide complex functions. There is significant knowledge on processing silicon from the electrical industries which may be leveraged in fabricating silicon photonic switching fabrics. Thermo-optic silicon switches are relatively slow, with sub-millisecond switching times. Electro-optic silicon switches using carrier injection techniques to change waveguide properties offer faster switching times as low as 2-5 ns to which drive skew and propagation delay and skew effects are added. In a large multi-stage switch, the overall switching time and skew may be around 10-30+ ns. Lithium niobate (LiNbO$_3$) which has very fast, for example sub-nanosecond switching times may be used to create simple very fast switches, such as small arrays of 1:2 or 2:1 switches. A variety of other materials may also be used.

Figure 4:
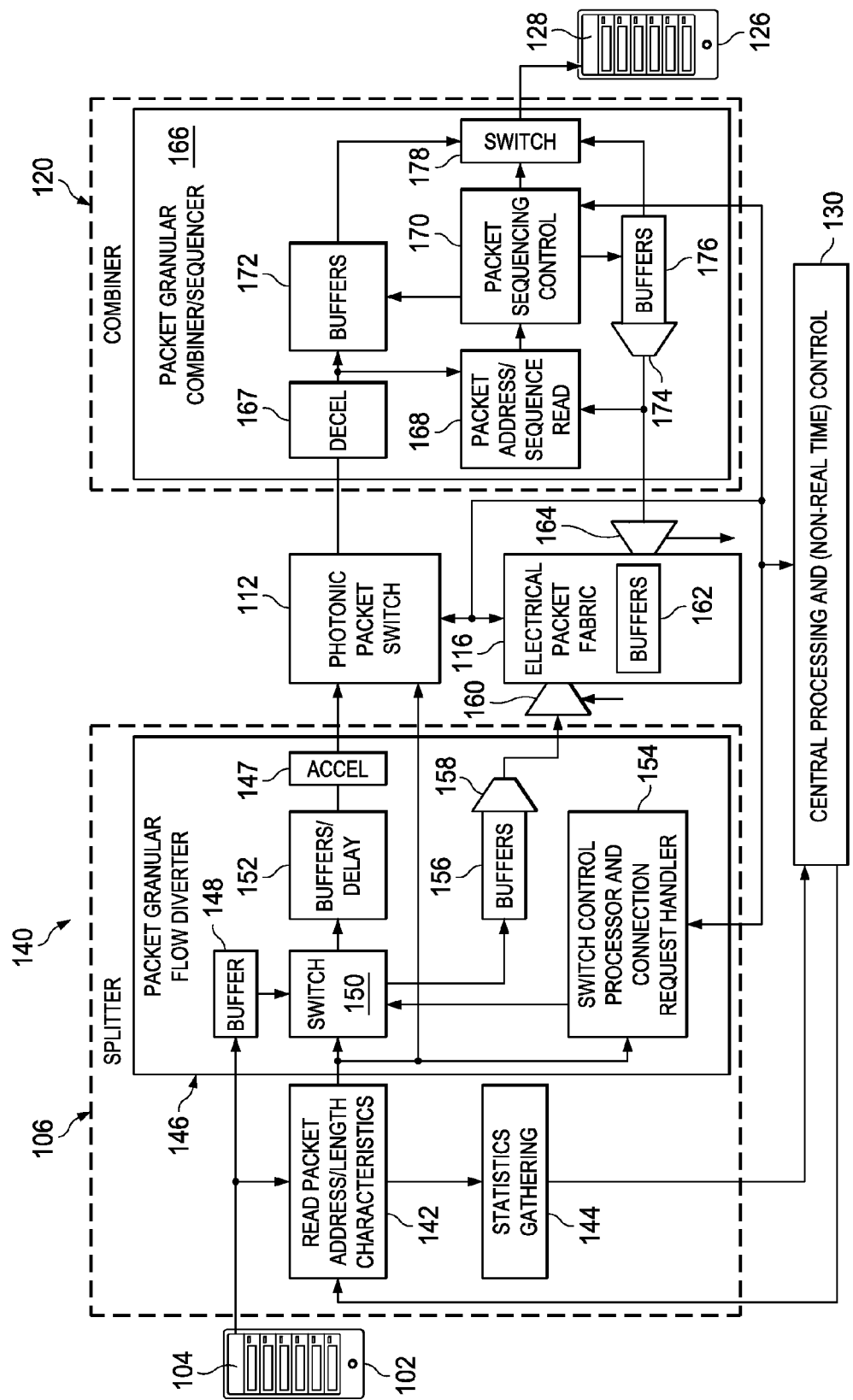
FIG. 4 illustrates an embodiment system for photonic packet switching using a photonic packet switch and an electronic packet switch.

FIG. 4 illustrates system 140 for routing packet streams, e.g., in a data center. Systems for routing packet streams are further discussed in U.S. patent application Ser. No. 13/902,008 filed on May 24, 2013, and entitled "System and Method for Steering Packet Streams," which this application incorporates hereby by reference. Initially, the packet stream from top of rack (TOR) switch 104 in rack 102 is fed to a buffer 148 in packet granular flow diverter 146 while read packet address and length characteristics module 142 determines the packet address and the length of the packet. The packet address and length are fed to statistics gathering module 144, which gathers statistics to send to control unit 130. Control unit 130 gathers statistics on the mix of packet lengths for non-real time uses. Switch control processor and connection request handler 154 handles the real time packet-by-packet processes within packet granular flow diverter 146, which diverts individual packets into one path or another based on a measured or detected packet attribute such as the packet length.

Buffer 148 stores the packet while the packet address and length are read. Also, the packet address and length characteristic are fed to read packet address and length characteristics module 142 and to switch control processor and connection request handler 154. The output of switch control processor and connection request handler 154 is fed to switch 150 to cause that switch to switch packets into one of two paths, depending on the routing metrics. The packet is conveyed to switch 150, which is set by the output from the switch control processor and connection request handler 154, so the packet will be routed to photonic switching fabric 112 or to electrical packet switching fabric 116. For example, the routing is based on the determination by switch control processor and connection request handler 154 as to whether the length of the packet exceeds or does not exceed a set packet length or other threshold. Switch 150 routes the packet to photonic switching fabric 112 or to electrical packet switching fabric 116, for example based on the length of the packet. Switch 150 may be a simple switch. If the packet is routed to photonic switching fabric 112, it is passed to buffer and delay 152, accelerator 147, and then to photonic switching fabric 112. Buffer and delay 152 stores the packet until the appropriate destination port of photonic switching fabric 112 becomes available, because of the lack of photonic buffering or storage. Buffer and delay 147 also pad the packet out to a constant length and/or apply a container wrapper to the packet. Accelerator 147 accelerates the clock rate of the packet stream routed to photonic switching fabric 112 to increase the IPG.

On the other hand, if the packet is routed to electrical packet switching fabric 116, it is passed to buffer 156, statistical multiplexer 158, and statistical demultiplexer 160, then to electrical packet switching fabric 116. Buffer 156 stores the packets until they can be sent to the electrical packet switch. Because the packets sent to the electrical switch are all short packets below the length threshold, they represent between approximately 5% and 20% of the overall bandwidth, depending on the setting of the long/short threshold and approximately 80%-95% of the traffic bandwidth is switched photonically, de-loading the bandwidth demand on the electronic switching of the node by a factor of about 5 to 20. Packets from multiple packet streams may be statistically multiplexed by statistical multiplexer 158, so the ports of electrical packet switching fabric 116 may be more fully utilized. Then, statistical multiplexer 160 performs further statistical multiplexing of low occupancy data streams before feeding the resultant multiplexed traffic into a series of parallel data buffers.

Photonic switching fabric 112 is a multistage solid state photonic switching fabric created from multiple solid state photonic switching stages, each of which is a non-blocking single stage switch, such as a crosspoint matrix, which may be directly or simply addressed at the stage level. Electrical packet switching fabric 116 is an electrical packet fabric, which may be designed for switching short packets. Electrical packet switching fabric 116 may receive packets using statistical demultiplexer 160 and statistically demultiplex already switched packets using statistical demultiplexer 164 into streams going to individual combiners 120. The packets are then further demultiplexed into individual packet flows by statistical demultiplexer 174 in combiner 120. Electrical packet switching fabric 116 may include processing functions responsive to the packet routing information in any conventional manner for an electrical packet switch and buffer 162, which may include arrays of buffers.

The switched packets from photonic switching fabric 112 and electrical packet switching fabric 116 are fed to combiner 120, which combines the two switched packet streams. Combiner 120 contains packet granular combiner and sequencer 166. The photonic packet stream is fed to decelerator 167, where the clock speed of the packet is decelerated, which reduces the inter-packet gap. In an example, the decelerated packet has the same clock rate and inter-packet gap as the packet before acceleration. Then, the photonic packet stream is fed to buffer 172 to be stored, while the address and sequence is read by packet address and sequence reader 168, which determines the destination address and sequence number of the photonic packet. The electrical packet stream is also fed to statistical demultiplexer 174 to be statistically demultiplexed and to parallel buffers 176 to be stored, while its characteristics are determined by the packet address and sequence reader 168. Then, packet address and sequence reader 168 determines the sequence to read packets from buffers 172 and buffers 176 based on combining the packets from both paths in sequence to restore a sequential sequence numbering of the packets of the combined short plus long packet streams. This may include packets flowing from a given source TOR to a given destination TOR, so the combinations of short and long packets in each of the streams are read out in the correct sequence for each stream. Next, the packet sequencing control unit 170 releases the packets in each flow in their original sequence within their own flows, which are combined with other flows from other sources, each of which also has the correct packet sequence within its own flow. As the packets are released by packet sequence control unit 170, they are combined using switch 178, e.g. a simple switch. In an example, splitter 106 and combiner 120 are implemented in a single module. Alternatively, splitter 106 and combiner 120 may be implemented separately. Splitter 106 may be integrated in TOR switch 104, and combiner 120 may be implemented in TOR switch 128. TOR switch 104 may be in rack 102, and TOR switch 128 may be in rack 126.

Photonic packet switches may be used as the core switch in a data center. In a photonic packet switch, packets are switched by photonic devices, without converting them to electrical signals. Photonic packet switches switch streams of packets by switching each packet independently towards its destination. Thus, the photonic switching fabric is set up for a new destination during the inter-packet gap or dead-band. For a given level of transport efficiency, the inter-packet gap is inversely proportional to the bit rate. For high speed switches the inter-packet gap can be very short, giving rise to difficulties in addressing and setting up the photonic switch.

Figure 5A:
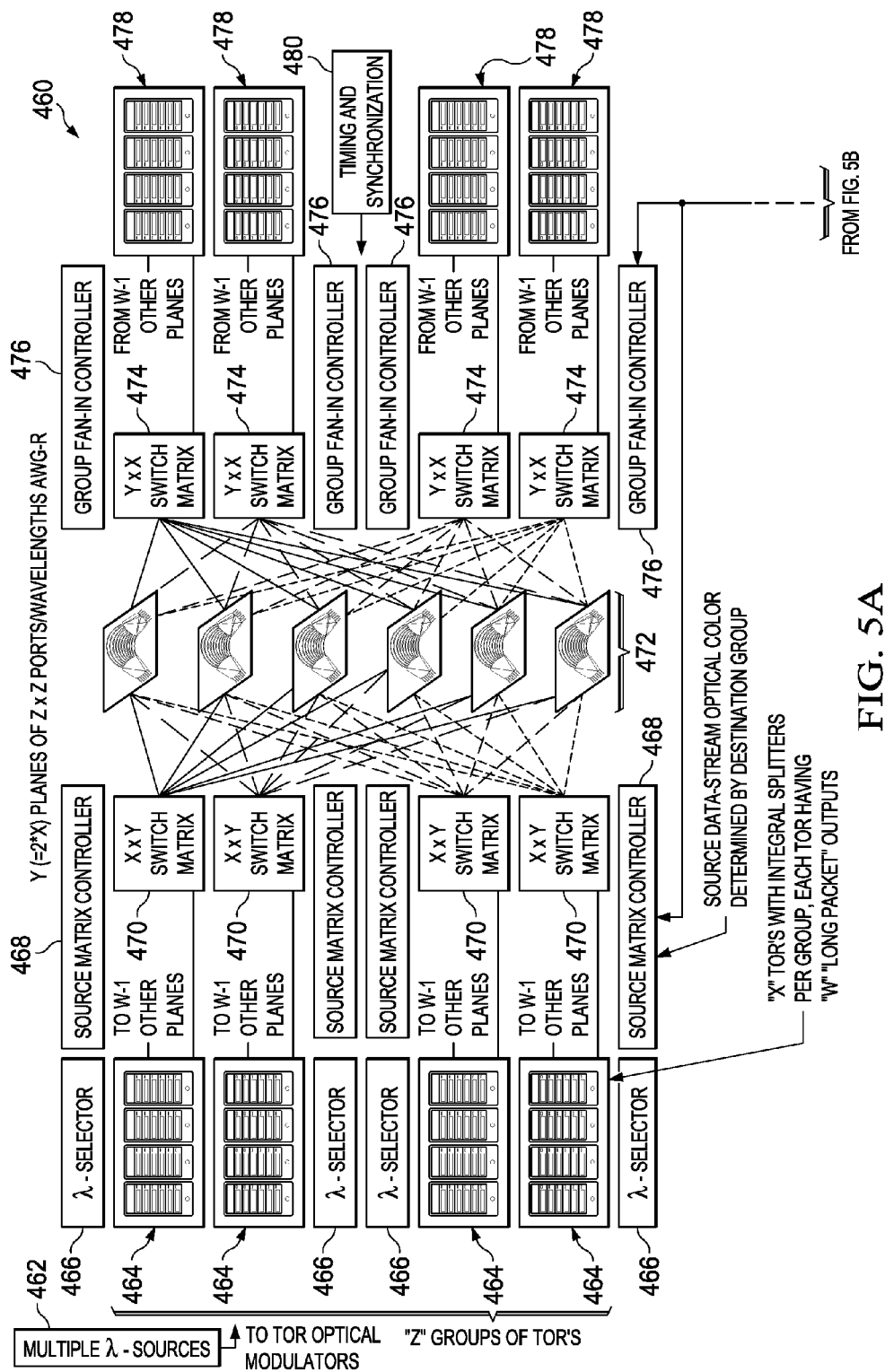
FIGS. 5A-5B illustrate an embodiment photonic packet switch with pipelined control.
Figure 5B:
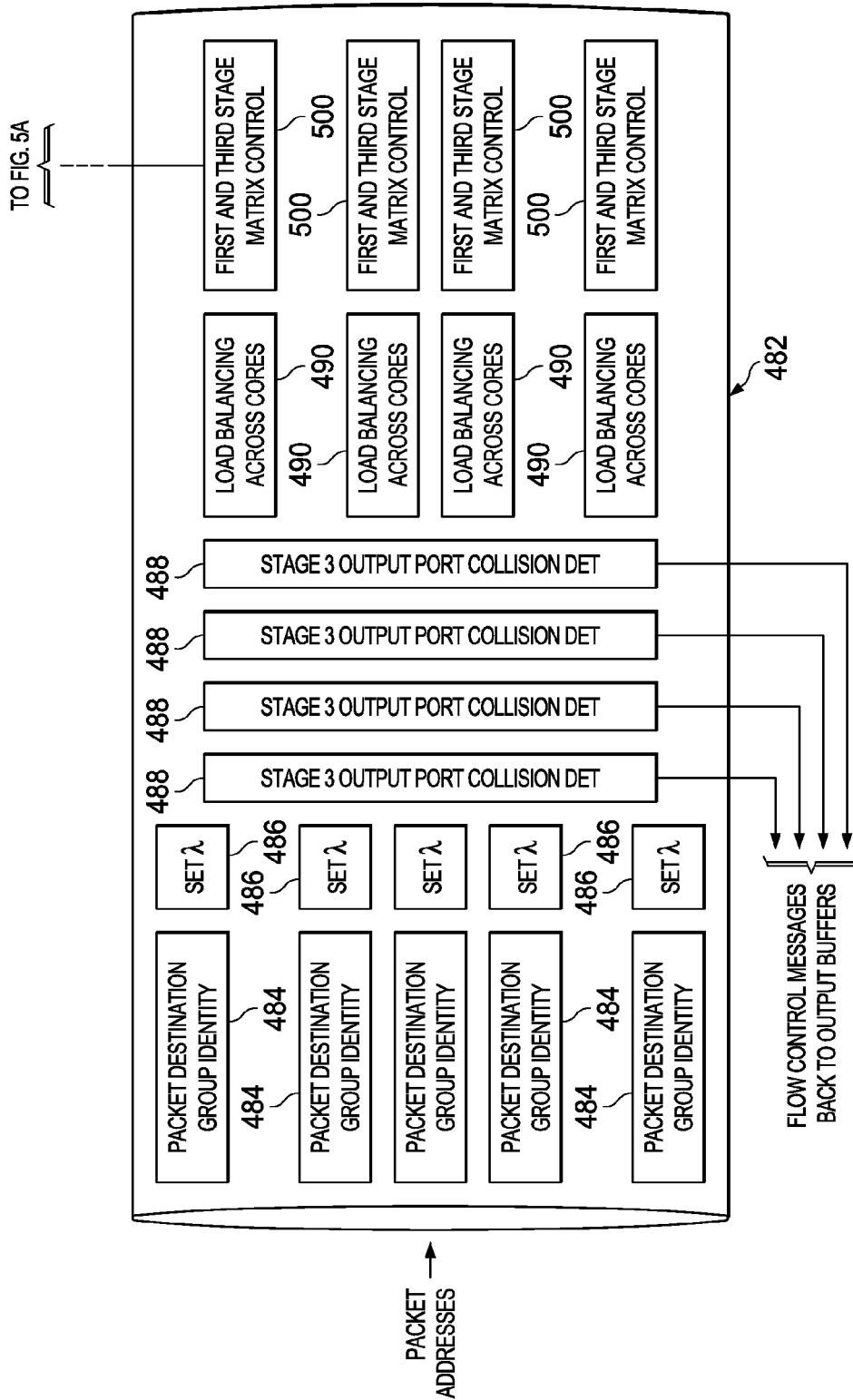

FIGS. 5A-B illustrates an embodiment photonic switch, photonic switch 460, a large port count photonic switch based on a crosspoint arrayed waveguide grating (AWG-R) CLOS structure and a pipelined control process implemented between first stage controllers identified as source matrix controllers and third stage controllers identified as group fan in controllers. Photonic switch 460 may be used as a switching plane in a multi-plane structure with W-1 other identical planes each implemented by a photonic switch 460 in a W-plane load-shared structure to provide a high total traffic throughput and redundancy against a switch plane failure, utilizing W port TORs. Alternatively, the photonic switch is used without a planar structure in small switching nodes. While only one three stage photonic switch is shown in FIGS. 5A-B, there may be multiple photonic switches in parallel. There may be as many parallel switch planes as there are high capacity ports per TOR. W may equal 4, 8, or more. The switching fabric contains the first stage crosspoint switches 470 and third stage crosspoint switches 474, and second stage array of AWG-Rs 472. For 80×80 port second stage AWG-Rs, 12×24 port first stage switches, 24×12 third stage switches, and four outputs per TOR creating four planes, this creates a 3840×3840 port core long packet switching capability organized as four quadrants of 960×960 for an overall throughput of 153.6 Tb/s at 40 Gb/s or 384 Tb/s at 100 Gb/s. In another example, each 100 Gb/s stream is split into four 25 Gb/s sub-streams, and each fabric is replaced with four parallel fabrics, one fabric per sub-stream. In an additional example using an AWG-R of 80×80 ports, 16×32 and 32×16 port crosspoint switches, and 8 planes, a 10,240 port core long packet node organized as eight planes of 1280 ports per switch is created, which requires eight parallel switch plane structures (W=8) of 1280×1280 if 100 Gb/s feeds are switched monolithically, for example using multi-level coding to bring the symbol rate down to around 25 Gsymbols/sec (e.g. quadrature amplitude modulation (QAM)-16 or pulse amplitude modulation (PAM)-16 to fit the data sidebands of the optical signal within the pass-bands of the AWG-Rs. Alternatively, 32 structures of four separate 25 Gb/s sub-streams per 100 Gb/s stream are used. A node based on this switch and with W=8 is capable of handling 1.024 Pb/s of input port capacity. Alternatively for z=40, corresponding to a 100 GHz optical grid and 55+ Ghz of usable bandwidth (pass-bands) and using 16×32 first stage switches, 32×16 third stage switches, and 8 ports/TOR, giving 8 parallel load shared planes, gives a capacity of 8×(16×40)=5120×5120 ports=512 Tb/s at 100 Gb/s per port while using simpler coding for the 100 Gb/s data streams.

TOR groups 464, where a group is defined as the TORs connected to one particular first stage switching module and the corresponding third stage switch module, are associated with agile wavelength generators, such as individual tunable lasers or wavelength selectors 466. Wavelength selectors 466 select one of Z wavelength sources 462, where Z is the number of input ports for one of AWG-Rs 472. Instead of having to rapidly tune thousands of agile lasers, 80 precision wavelength static sources may be used, where the wavelengths they generate are distributed and selected by a pair of Zx1 selector switches at the local modulator. These switches do not have to match the packet inter-packet gap set up time, because the wavelength is known well in advance. However, the change over from one wavelength to another takes place during the IPG, so the selector switch is in series with a fast 2:1 optical gate to facilitate the changeover occurring rapidly during the IPG.

Because a group of TORs shares the same first stage and third stage switching module, the group-to-group connections through the second stages are the same for connections between groups. Because this part of the addressing, and hence connectivity, is known from the group portion of the source and destination address, and the connectivity through the second stage is determined by the choice of wavelength, the choice of wavelength may be directly determined from the destination TOR group portion of the address for the TORs within a given source group.

The modulated optical carriers from TOR groups 464 are passed through first stage crosspoint switches 470, which are X×Y switches set to the correct cross-connection settings by the pipelined control process 482, physically implemented between the source matrix controllers (SMCs) associated with the first stage matrixes and the group fan in controllers (GFCs) associated with the third stage matrixes. These SMCs and GFCs collaborate to derive the connection map for each new frame of switching, which is carried out by the three stage CLOS switch, involving a free path allocation activity, which is interdependent on the settings of other paths. This is broken down, both into zones of computation of parts of the map and in time by, a pipeline. This results in a series of cross-connect maps, one per frame, being fed to each of the constituent switch modules, which apply the simple map rapidly with direct or simple addressability. The first stages are controlled from SMCs 468, part of the pipelined control system, which are concerned with managing the first stage connections. Also, the first stage input ports are connected to the first stage output ports without contention and the first stage mapping of connections matches the third stage mapping of connections to complete an overall end-to-end connection. The first stages complete connections to the appropriate second stages, AWG-Rs 472, as determined by the pipelined control process. The second stages automatically route these signals based on their wavelength, so they appear on input ports of the appropriate third stage modules, third stage crosspoint switches 474, where they are connected to the appropriate output port under control of the third stages' GFCs 476. The group manager manages the connection of the incoming signals from the AWG-R second stages to the appropriate output ports of the third stages and identifies any contending requests for the same third stage output port from the relevant SMC requests received at a specific GFC. The SMCs and GFCs collaborate in a pipelined process, so portions of the SMCs and GFCs perform portions of the processes leading to a connection map for a frame. Then, the portions hand off the results of that portion of the process to other resources within the SMC/GFC community via an orthogonal mapper (not pictured in FIG. 5A-B) to manage output port contention and the internal path set-up through the switching stages, so non-output port contending connections are set up. The orthogonal mapper is a hardware mapper, which passes information from SMCs to the appropriate GFC and information from the GFCs to the appropriate SMC. Additional details of a control structure are included in U.S. patent application Ser. No. 14/455,034 filed on Aug. 8, 2014, and which application is hereby incorporated herein by reference. Third stage crosspoint switches 474 are coupled to TORs 478.

The operation of the fast framed photonic circuit switch with tight demands on skew, switching time alignment, and crosspoint set up time uses a centralized precision timing reference source shared with any other synchronous fixed framed system. Skew is the timing offset or error on arriving data to be switched and the timing variations in the switch from the physical path lengths, variations in electronic and photonic response times, etc. This timing reference source is timing block 480 which provides timing to the switch stages by gating timing to the actual set up of the computed connections and providing reference timing for the locking of the TOR packet splitter and buffer/accelerator block's timing. Timing block 480 provides bit interval, frame interval, and multi-frame interval signals including frame numbering across multiple frames that is distributed throughout the system to facilitate that the peripheral requests for connectivity reference known data/packets and known frames so the correct containerized packets are switched by the correct frame's computed connection map.

FIG. 5B shows pipelined control 482. Steps along the pipelined control include packet destination group identification block 484 and set wavelength block 486, both of which may be distributed out to the TOR site or may be centralized. The pipelined control also includes third stage output port collision detection block 488, load balancing across cores block 490, which detects multiple usage of second stage ports and connections, and moves the duplicated port usage or connections to free ports on other second stage planes, and first and third stage matrix control block 500, all of which may be centralized. The implementation of this involves collaboration between the SMCs and GFCs by the orthogonal mapper function. Each of the major steps of the control process are completed within one frame period (~120 ns for 100

Gb/s or ~300 ns for 40 Gb/s) or are divided into smaller steps which themselves can be completed within a frame period, so the resources of each step or sub-step, as appropriate, may be freed up for doing the same computational tasks for the next frame. One alternative is to provide multiple parallel incarnations of a platform to implement a long step, each incarnation implementing the long step of a different frame and then being reused several frames later.

In each packet destination group identification block 484, the destination group is identified from the TOR group identification portion of the destination address of the source packets. There may be a maximum of around X packet container addresses in parallel, with one packet container address per input port in each of several parallel flows. X equals the group size, which equals the number of inputs on each input switch, for example 8, 16, 24, or 32. The wavelength is set according to the SMC's wavelength address map. Alternatively, when the TOR is located sufficiently far from the central processing function for the switch, this wavelength setting may be duplicated at the TOR splitter. For example, if the processing beyond the wavelength determination point to the point where a connection map is released takes G microseconds and the speed of light in glass=⅔ and $c_0$=200,000 km/sec, the maximum distance back to the TOR would be ½ of 200,000*G. For G=2 µs the TORs is within a 200 meters path length of the core controller, for G=4 µs, 400 meters, and for G=6 µs, 600 meters. The maximum length runs in data centers may be upwards of 300-500 meters, and there may be a place for both centralized and remote (at the TOR site) setting of the optical carrier wavelength. The packet destination group identification block may also detect when two or more parallel input packets within its source group of TORs have identical destination group and TOR addresses, in which case a potential collision is detected, and one of the two packets can be delayed by a frame or a few frames. Alternatively, this may be handled as part of the overall output port collision detection process spanning the source TORs to the destination TORs is handled within the third stage collision detect block, which are shown as orthogonal to the flow, because each instantiation deals with a subset of the output ports.

Packet destination group identification block 484 may be conceptually distributed, housed within a hardware state machine of the SMC, or in both locations, because the information on the wavelength to be used is at the TOR and the other users of the outputs of packet destination group identification block 484 are within the centralized controller. The packet destination group identification block passes the selected input port to output group connectivity to the third stage output port collision detect and mapper function, which passes the addresses from the SMC to each of the appropriate GFCs based on the group address portion of the address to facilitate the commencement of the output port collision detection processes. This is because each GFC is also associated with a third stage module which is associated with a group and a particular wavelength. Hence, specific portions of the SMCs' computational outputs are routed to specific GFCs to receive the relevant subset (connections being made to the GFC's associated TOR group and associated switch fabric third stage dedicated to that TOR group) from the SMCs. Hence, one of the functions of the third stage output port collision detect is to map the same subset of the SMCs' data to of the GFCs' streams, which are the same number of parallel GFC streams (X) as there the number of SMC streams. Another function that the third stage output port collision detection block performs is detecting whether two SMCs requesting the same third stage output port (the same TOR number or TOR Group number). When a contention is detected, it may then initiate a back-off of one of the contending requests. The SMC may also pass along some additional information along with the address, such as a primary and secondary intended first stage output connection port for each connection from the SMC's associated input switch matrix, which may be allocated by the SMCs to reduce the potential for blocking each other in the first stage as their independent requests are brought together in the third stage output port collision detect block. Hence, those which can immediately be accepted by the GFC can be locked down, thereby reducing the number of connections to be resolved by the rest of the process.

Based on the output identified group for each packet in the frame being processed, packet destination group identification block 484 passes the wavelength information to set wavelength block 486, which tunes a local optical source or selects the correct centralized source from the central bank of continuously on sources. In another example, the wavelength has already been set by a function in the TOR. Because the wavelength selection occurs early in the control pipeline process, the source setup time requirement may be relaxed when the distance to the TOR is relatively low, and the function is duplicated at the TOR for setting the optical carrier wavelength. In FIG. 5B, a central bank of 80 sources and two 80:1 selector switches with a series of fast 2:1 light gate for each optical source provide a wavelength agile optical carrier to electro-optic modulators within each of the TORs to generate modulated 100 Gb/s (or 40 Gb/s) optical carrier to be switched at the correct wavelength to properly transit the second stage. The fast light gates may have a speed of about <1 ns, while the selector switches have a speed slower than the fast light gates but faster than a packet duration.

Third stage output port collision detection block 488 takes place in the group fan in controllers 476, which have received communications relevant to itself via an orthogonal mapper (not pictured) from source matrix controllers 468. The intended addresses for the group of outputs handled by a particular group fan in controller associated with a particular third stage module, and hence a particular addressed TOR group, are sent to that group fan in controller. The group fan in controller, in the third stage output port collision detection process, detects overlapping output address requests from the inputs from all the communications from the source matrix controllers and approves one address request per output port from its associated third stage and rejects the other address requests. This is because each output port of the third stage matrix associated with each GFC supports one packet per frame. The approved packet addresses are notified back to the originating source controller. The rejected addresses of containerized packets seeking contending outputs are notified to retry in the next frame. In one example, retried packet addresses have priority over new packet addresses. The third stage output port collision detection step reduces the maximum number of packets to be routed to any one output port in a frame to one. This basically eliminates blocking as a concern, because, for the remainder of the process, the dilated switch is non-blocking, and all paths can be accommodated once the path maps are determined by the collaboration of the SMCs and GFCs to implement the control process 482.

At this stage, the inputs may be connected to their respective outputs, and there is sufficient capacity through the switch and switch paths for all connections, but the connection paths utilizing the second stages is still to be established. The first stage matrices and the third stage matrices have sufficient capacity to handle the remaining packet connections once the output port collisions are detected and resolved. Connections are then allocated through the second stage to provide a degree of load balancing through the core so the second stage inputs and outputs are only used once. This may be done with a non-dilating switch or a dilating switch.

Load balancing across core block 490 facilitates each first stage output being used once and each third stage input being used once with each output of the first stages being connected to the same second stage as the corresponding inputs of the third stage to complete the connection. Hence, each second stage input and output is only used once.

The initial communication from the SMCs to the appropriate GFCs may also include a primary intended first stage output port address and an additional address to be used as a secondary first stage output port address if the GFC cannot accept the primary address. Both the primary and secondary first stage output port addresses provided by the SMC may translate to a specific input port address on the GFC, which may already be allocated to another SMC. The probability that both are already allocated is low relative to just using a primary address. These primary and secondary first stage output ports are allocated so that each output port identity at the source SMC is used at most once, because, in a 1:2 dilating first stage, there are sufficient output ports for each input port to be uniquely allocated two output port addresses. These intended first stage output port addresses are passed to the appropriate GFCs along with the intended GFC output port connection in the form of a connection request. Some of these connection requests will be denied by the GFC on the basis that the particular output port of the GFC's associated third stage switch module is already allocated (i.e. overall fabric output port congestion), but the rest of the output port connection requests will be accepted for connection mapping, and the requesting SMCs will be notified. When both a primary and a secondary first stage output address, and consequent third stage input address, has been sent by the SMC, the primary connection request may be granted, the secondary connection request may be granted, or neither connection request is granted.

In one situation where the primary request is granted, when the connection request is accepted, the third stage input port implied by the primary choice of first stage output port and consequent third stage input port, translated through the fixed mapping of the second stage at the correct wavelength, is not yet allocated by the GFC for that GFC's third stage input port for the frame being computed. The request is then allocated, which constitutes an acceptance by the GFC of the primary connection path request from the SMC. The acceptance is conveyed back to the relevant SMC, which locks in that first stage input port to primary output port connection and frees up the first stage output port which had been allocated to the potential secondary connection, so it can be reused for retries of other connections.

In another situation where the secondary request is granted, the connection request is accepted, but the third stage input port implied by the primary choice of first stage output port, and hence second stage plane, is already allocated by the GFC for that GFC's third stage for the frame being computed, but the SMC's secondary choice of first stage output port, and hence second stage plane and third stage input port, is not yet allocated by the GFC for that GFC's third stage for the frame being computed. In this example, the GFC accepts the secondary connection path request from the SMC, and the SMC locks down this first stage input port to first stage output port connection and frees the primary output port for use in retries of other connections.

In an additional example, the overall connection request is accepted, because the fabric output port is free and the third stage input ports implied by both the primary and secondary choice of first stage output port, and hence second stage plane, are already allocated by the GFC for that GFC's third stage for the frame being computed. In this example, the GFC rejects both the primary and secondary connection path requests from the SMC. This occurs when neither the primary or secondary third stage input ports are available. This results in the SMC freeing up the temporarily reserved outputs from its output port list and retrying with other primary and secondary output port connections from its free port list to reach any available input port on the destination third stage switch. A pair of output port attempts may be swapped to different GFCs to resolve the connection limitation.

Overall, the SMC response to the acceptances from the GFC is to allocate those connections between first stage inputs and outputs to set up connections. The first stage connections not yet set up are then allocated to unused first stage output ports, of which at least half will remain in a 2:1 dilated switch, and the process is repeated. The unused first stage output ports may include ports not previously allocated, ports allocated as primary ports to different GFCs but not used, and ports allocated as secondary ports but not used. Also, when the GFC provides a rejection response due to specified primary and secondary input ports to the third stage already being used, it may append its own primary or secondary third stage input ports, and/or additional suggestions, depending on how many spare ports are left and the number of rejection communications. As this process continues, the ratio of spare ports to rejections increases, so more unique suggestions are forwarded. These suggestions usually facilitate the SMC to directly choose a known workable first stage output path. If not, the process repeats. This process continues until all the paths are allocated, which may take several iterations. Alternatively, the process times out after several cycles. Connections not established by the time-out point may be deferred to a later frame or the packet may be re-sent.

When the load balancing is completed or times out, the SMCs generate connection maps for their associated first stages and the GFCs generate connection maps for their associated third stages for use when the packets in that frame propagate through the buffer and arrive at the packet switching fabric of the fast photonic circuit switch. When the load balancing is complete, the load balancing has progressed sufficiently far, or the load balancing times out, the first stage SMCs and third stage GFCs, respectively, generate connection maps for their associated first stages and third stages. These connection maps are small, as the mapping is for individual first stage modules or third stage modules and is assembled alongside the first stage input port wavelength map previously generated in the packet destination group identification operation.

The SMC and GFC functions may be implemented as hardware logic and state machines or as arrays of dedicated task application-specific microcontrollers or combinations of these technologies.

Figure 6:
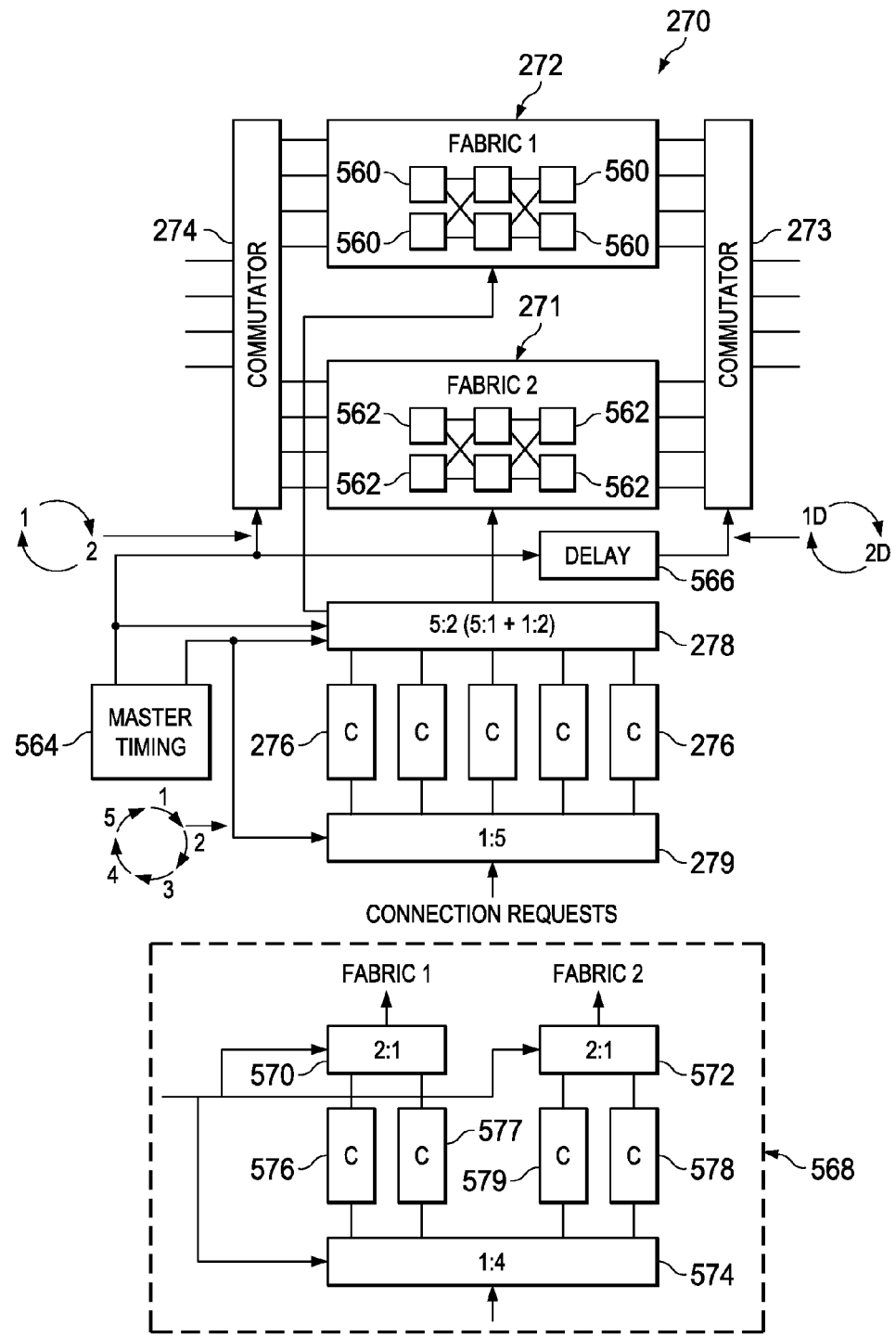
FIG. 6 illustrates an embodiment system for commutated photonic packet switching.

FIG. 6 shows system 270, a high level view of two parallel large complex but relatively slow switches with fast high speed small commutator switches. High port count switches 271 and 272 are photonic integrated circuit based switches with switching modules 562 and 560, respectively which are large and complex, but relatively slow from the switching speed of the crosspoints switches, of time-of-flight delay along optical paths (generating skew), and/or the timing of changes in connections in large arrays of switches after the connection map is established, creating control system timing skew. Commutator 274 is an array of 1:2 fast photonic switches at the input of high port count switch 271 and 272, while commutator 273 is an array of fast 2:1 photonic switches at the output of high port count switches 271 and 272. The input fast switches, which may be referred to as commutators, connect the synchronized input packets alternately to the upper and lower high port count switches. While the upper switch is receiving and routing a set of packets, the lower switch is out of service setting up for the next frame. The next long packet is on each input, which will be fed in when the commutator reverses the connections, taking the upper switch out of service to set up for the following packets while routing the current set of packets to the lower switch.

Commutation may also be used by control modules 276, with commutators 278 and 279, electrical commutator switches. Commutation of the control may be used with switch commutation or as a stand-alone capability. The commutation of control facilitates multiple control pipelines to be connected in parallel, each processing a subset of frames. Master timing block 564 controls the timing. Also, delay module 566 delays the timing signals coming in to commutator 273.

For example, with 4-way commutation shown in system 568 one pipeline handles frames 1, 5, 9, 13, 17, the second pipeline handles frames 2, 6, 10, 14, 18, the third pipeline handles frames 3, 7, 11, 15, 19, while the fourth pipeline handles frames 4, 8, 12, 16, 20, facilitating an internal pipeline structure to be used with four times the processing time per step. System 568 contains switch 574, a 1:4 commutator switch and switches 572 and 570, 2:1 commutator switches. The commutator switches commutate among control pipelines 576, 577, 578, and 579. For 40 Gb/s, the step time is increased from 300 ns to 1200 ns, for 100 Gb/s the step time, where each step of the pipeline is completes its allotted task and is ready for a new frame input information, is increased from 120 ns to 480 ns, and for 400 Gb/s the step time is increased from 30 ns to 120 ns. When a control process is implemented at 100 Gb/s port capacities and hence a 120 ns step (frame) time without control commutation the same control process can be used for 400 Gb/s packet streams by adding 4 way commutation to four instantiations of this control process.

Photonic circuit switches have to be completely set up during the gap between the packets—the Inter-packet Gap. This set up window includes the physical act of setting up the crosspoints—delivering the electronic commands to the crosspoints and the crosspoints responding to the commands and the skew—the precision of the timing of the commands and their propagation time variations in various parts of the overall complex switch structure, both for these electronic commands and for the optical signals flowing at about ⅔ $c_0$.

Figure 7:
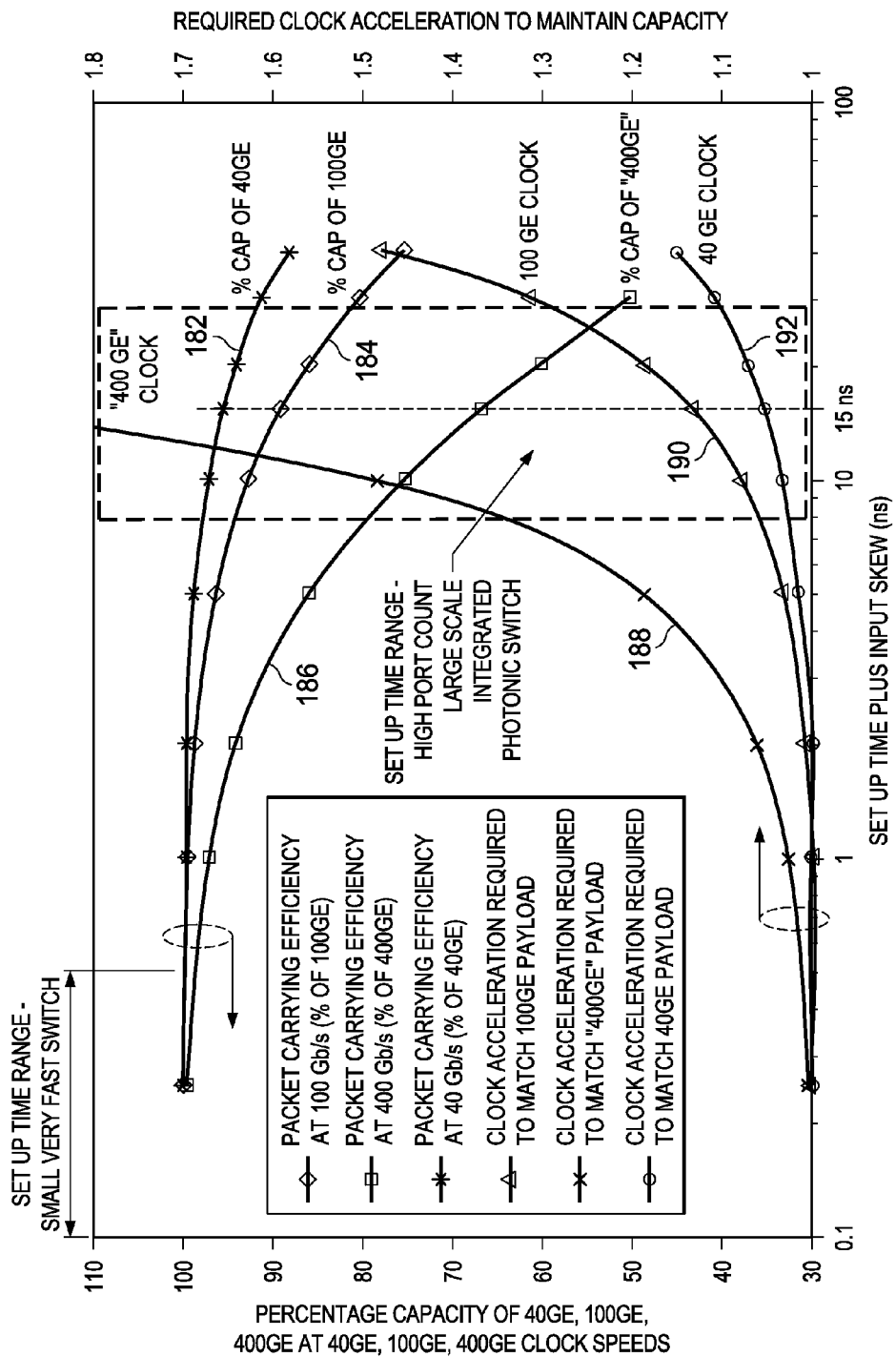
FIG. 7 illustrates a graph of capacity and clock acceleration versus set up and skew time.

FIG. 7 illustrates a graph showing the impact of IPG increases on speeds of photonic switching fabrics, port transport efficiencies, and clock acceleration levels. Curves 182, 184, and 186 show the packet carrying efficiency versus set-up and skew time for 40 Gb/s, 100 Gb/s, and 400 Gb/s packet streams, respectively, plotted against the left-hand vertical axis. The set-up and skew time is the combined time to set up the switch connections and variations in timing due to physical dimensions, different path lengths, and other factors which may add a tolerance on the start or end of the set-up window. The packet carrying efficiency is the percentage of packet carrying capacity lost when the IPG of a high speed GE stream is modified to have a non-standard longer duration and no packet acceleration is used. As the inter-packet gap is increased on a stream of long packets so the packet payload decreases, and by the time the increase is a significant percentage of the packet duration, the decrease in payload capacity is significant.

In one example, the IPG is increased without capacity loss by accelerating the packet clock rate. Additional details on increasing an IPG are discussed in U.S. patent application Ser. No. 13/901,944 filed on May 24, 2013, and entitled "System and Method for Accelerating and Decelerating Packets," which this application incorporates hereby by reference. Curves 188, 190, and 192 show the clock acceleration to match a 40 GE payload, 100 GE payload, and 400 GE payload, respectively, versus set up time plus input skew for a photonic circuit switch. These curves show the clock rate acceleration ratio n:1 to restore the packet carrying capacity to the original level as a function of the increased IPG plotted against the right hand vertical axis.

Table 1 shows the packet capacity loss and clock rate for the cases of set up time plus skew of 10 ns and 30 ns, derived from the chart of FIG. 7.

TABLE 1

|  | 40 Gb/s | | 100 Gb/s | | 400 Gb/s | |
| --- | --- | --- | --- | --- | --- | --- |
| Timing and skew allowance (ns) | 10 | 30 | 10 | 30 | 10 | 30 |
| Capacity loss (%) | 2.5 | 8.4 | 6.9 | 19.3 | 24.4 | 49.8 |
| Clock rate to restore capacity (GHz) | 41.36 | 44.4 | 108.1 | 131.8 | 592.4 | 48,000 (48 THz) |

The clock rate increases are significant for bit rates above 40 Gb/s.

In one example of a switching structure, the complexity is separated from the speed, exploiting two photonic switching technologies—one optimized for large complex switching functions with a moderate set up time and skew and the other optimized for fast switching speeds and very low skew for simple repetitious toggling. In the first category, silicon based carrier injection switches, integrated into a single photonic integrated circuit may be used, with massive arrays of these switching cells based on electro-optic (carrier injection) Mach Zehnder switches. In a Mach-Zehnder switch, one arm of a Mach Zehnder interferometer has its optical path propagation time modified by injecting carriers into a p-type intrinsic n-type (pin) junction built across the arm. These switches are built up by mass integration into large switch arrays. In another example, GaAsInP/InP technology may be used to produce crosspoint chips based on semiconductor optical amplifiers (SOAs) as switching elements. In the second category, ultra-fast switching capabilities of lithium niobate are exploited, which lack scalability, but may switch in sub 100 ps time frames. Other examples may also be used for both categories.

Figure 8:
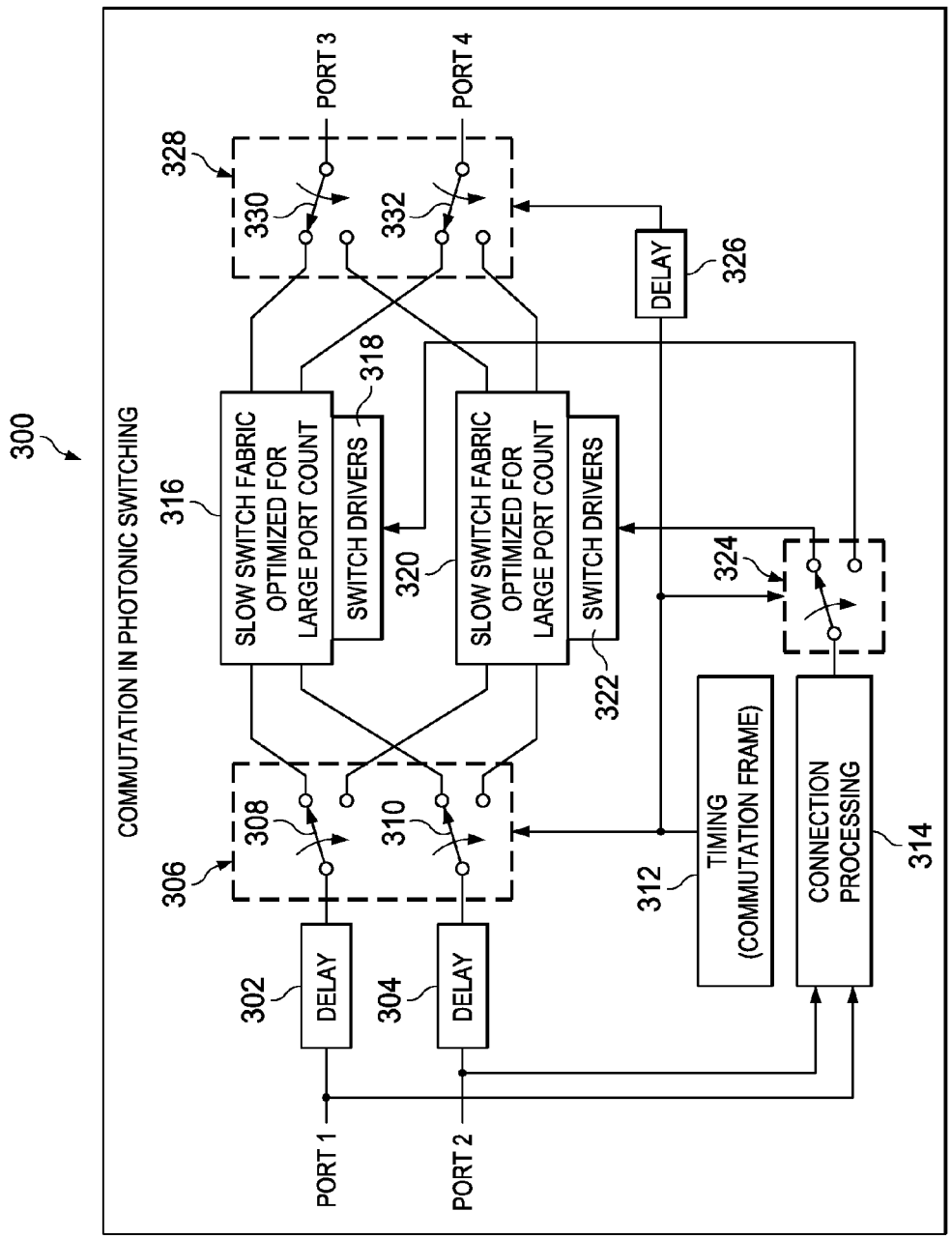
FIG. 8 illustrates an embodiment system for photonic packet switching with commutation between two high port count switches.

The two categories of technologies may be exploited using commutation, where one high port count switch is being set up while another high port count switch is switching with the two arrays of the ultra-fast switching toggling between the two high port count switches. FIG. 8 illustrates photonic switching fabric 300, a commutated switching structure with high port count large complex slow photonic switches alternately utilized to provide switching paths. The alternation is achieved using arrays of 1:2 and 2:1 fast photonic switches at the inputs and outputs respectively, these arrays being used to achieve commutation between the large switching fabrics. In this structure, there are two parallel slow photonic switching fabrics optimized for large port count, high port count switches 316 and 320. The inputs of high port count switches 316 and 320 are connected to the outputs of commutators 308 and 310, forming switching array 306. Commutators 308 and 310 are 1:2 fast commutating switches. The outputs of high port count switches 316 and 320 are coupled to switches 330 and 332 in array 328. Switches 330 and 332 are 2:1 fast commutating switch. Also, commutating switch 324, an electrical commutating switch, is disposed between connection processing block 314, which generates and delivers frame by frame connection maps, and switch drivers 318 and 322, which apply the delivered frame connection maps to the large port count switches. Switch drivers 318 and 322 drive high port count switches 316 and 320, respectively. The routing information inputs into 314 may be extracted from the packet streams directly as is shown in FIG. 8 or may be a common signaling routing information feed as is shown in FIG. 4.

The commutators alternate their connectivity between high port count switch 316 and high port count switch 320. The electrical commutator operates in anti-phase to the optical commutators to provide connectivity information to the high port count switches while they are not providing switched paths, for configuration, and ready for the next frame when they will be providing the switched paths.

At the start of an IPG, the optical commutators are operated within the IPG period to connect traffic to high port count switch 316 which had been set up during the previous frame and the connection processing to high port count switch 320. The connection map is downloaded from connection processing block 314 to switch drivers 322. Switch drivers 322 set up high port count switch 320 based on the connection map. The physical paths are set up by the end of a packet container duration, which may be 300 ns for 40 GE, 120 ns for 100 GE, or 30 ns for 400 GE. During this time, high port count switch 316 is in service and switching one frame of photonic packet containers. The photonic packet containers are delayed by delay 302 and delay 304 to provide time for the connection processing with direct extraction from the packet stream container headers. For the common channel approach, the timing delays are accounted for within the splitter function padder/buffer and acceleration blocks.

At the end of the packet container duration, when the photonic packet containers have been routed, another IPG commences. The commutators are controlled by timing block 312. There is a delay 326 between timing block 312 and array 328 to facilitate the average time-of-flight of photonic signals through the large fabrics, so the output commutators switch at a point delayed by the throughput average time of flight through the large port count switches, and commutating between the end of one output packet container and the beginning of the next packet container. The optical and electrical commutators are reversed so the newly set up high port count switch 320 is inserted into the switching path and high port count switch 316 is connected to connection processing block 314. The packet containers of this frame period, having been delayed by the time to process the connections by delays 302 and 304, are now routed to their destinations. Meanwhile, a connection map from connection processing block 314 is sent to switch drivers 318 to set up high port count switch 316. This process continues cyclically with each switch, providing connectivity for half the time and being set up during the other half the time.

Higher levels of commutation may be used to facilitate longer set-up times. A commutation level of three provides up to two frame periods for set-up, and a commutation level of four provides for up to three frame periods for set up. Commutation may be set at a higher level for additional benefits. Because the commutators are simple and the commutated high port count switches are complex, system failures are more likely to occur in the high port count switches than the commutators. By having additional high port count switches, the commutators may act both as commutators and provide protection against failures. For example, in a 400 GE switch with a 30-60 ns set up time photonic switching fabric, a three way commutator with three high port count switches may be used. When a single high port count switch fails on this three way commutated switch, the entire node may fail. However, with four high port count switches, only three of which are actually used for operation then, when any high port count switches fail, the sequencing of the commutators is altered so the node continues operating with the remaining three high port count switches.

Figure 9:
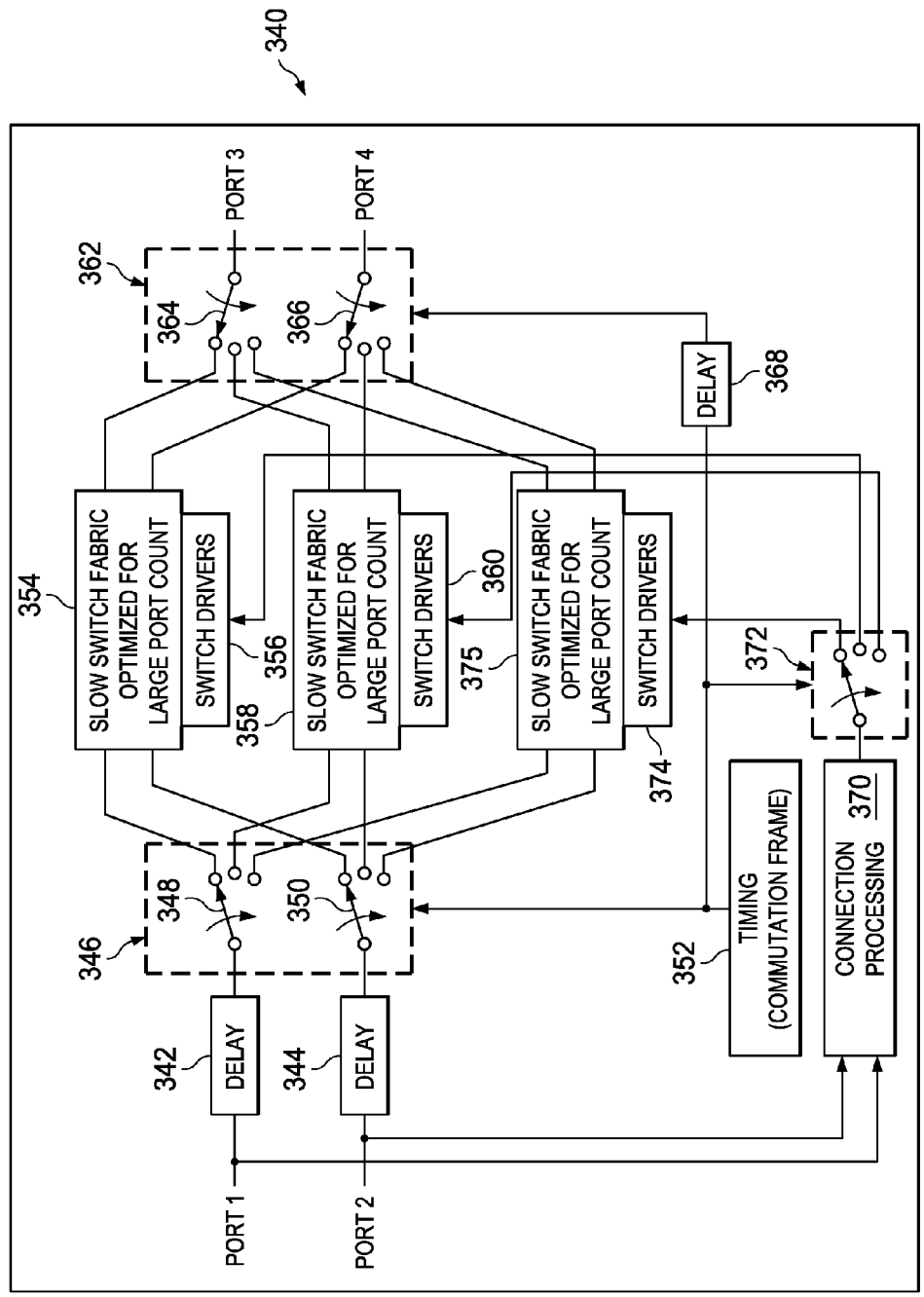
FIG. 9 illustrates an embodiment system for photonic packet switching with commutation between three high port count switches.

FIG. 9 illustrates system 340 for three way commutation. System 340 contains high port count switches 354, 358, and 374 with corresponding switch drivers 356, 360, and 375. Commutator 346 with switches 348 and 350, which are three way fast switches, connects the inputs to the photonic packet stream, which is delayed by delays 342 and 344. The outputs of high port count switches 354, 358, and 374 are coupled to switches 364 and 366, 3:1 fast photonic switches, in commutator 362. Connection processing block 370 determines the connection map. Electrical commutation switch 372 couples connection processing block 370 alternately to one of switch driver 356, switch driver 360, or switch driver 375 to deliver the appropriate frame's connection maps to control the corresponding high port count switch. Timing block 352 controls the phasing and timing of the commutation switches, with delay block 368 providing timing offset to compensate for the average time of flight through the switch.

Figure 10:
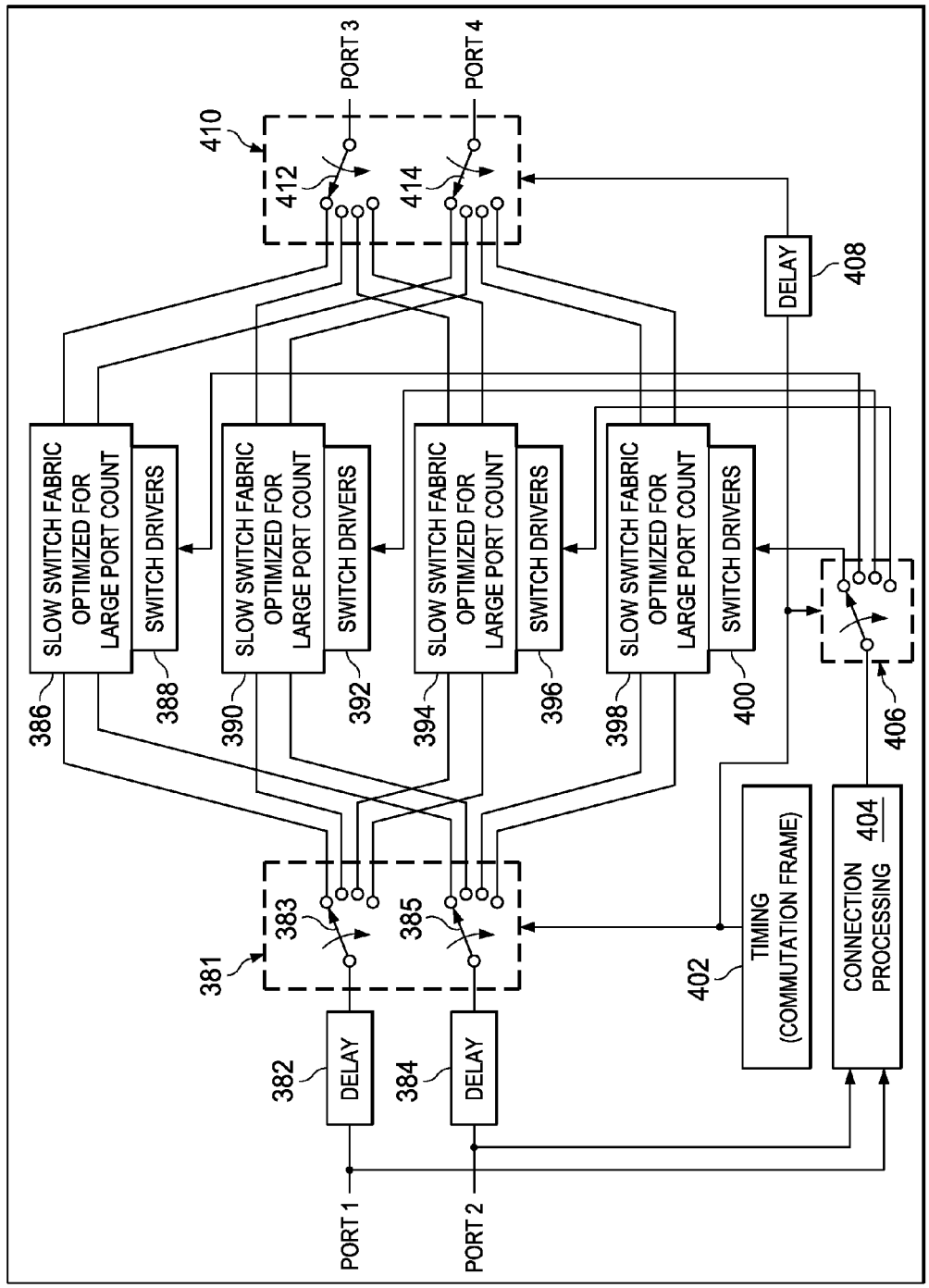
FIG. 10 illustrates an embodiment system for photonic packet switching with commutation between four high port count switches.

FIG. 10 illustrates system 380 with four level commutation. System 380 contains high port count switches 386, 390, 394, and 398 with corresponding switch drivers 388, 392, 396, and 400. Array 381 with switches 383 and 385, four way fast switches, connects the inputs of the high port count switches to the photonic packet stream, which is delayed by delays 382 and 384. The outputs of high port count switches 386, 390, 394, and 398 are coupled to switches 412 and 414, 4:1 fast photonic switches, in array 410. Connection processing block 404 determines the connection map for the frames. Electrical commutation switch 406 couples connection processing block 404 to one of switch driver 388, switch driver 392, switch driver 396, or switch driver 400 to deliver the appropriate connection maps on a frame by frame basis to control the corresponding high port count switch. Timing block 402 controls the commutation switches, with the delay block 408 providing timing offset to compensate for the average time of flight through the switch. Higher levels of commutation may also be used.

Figure 11:
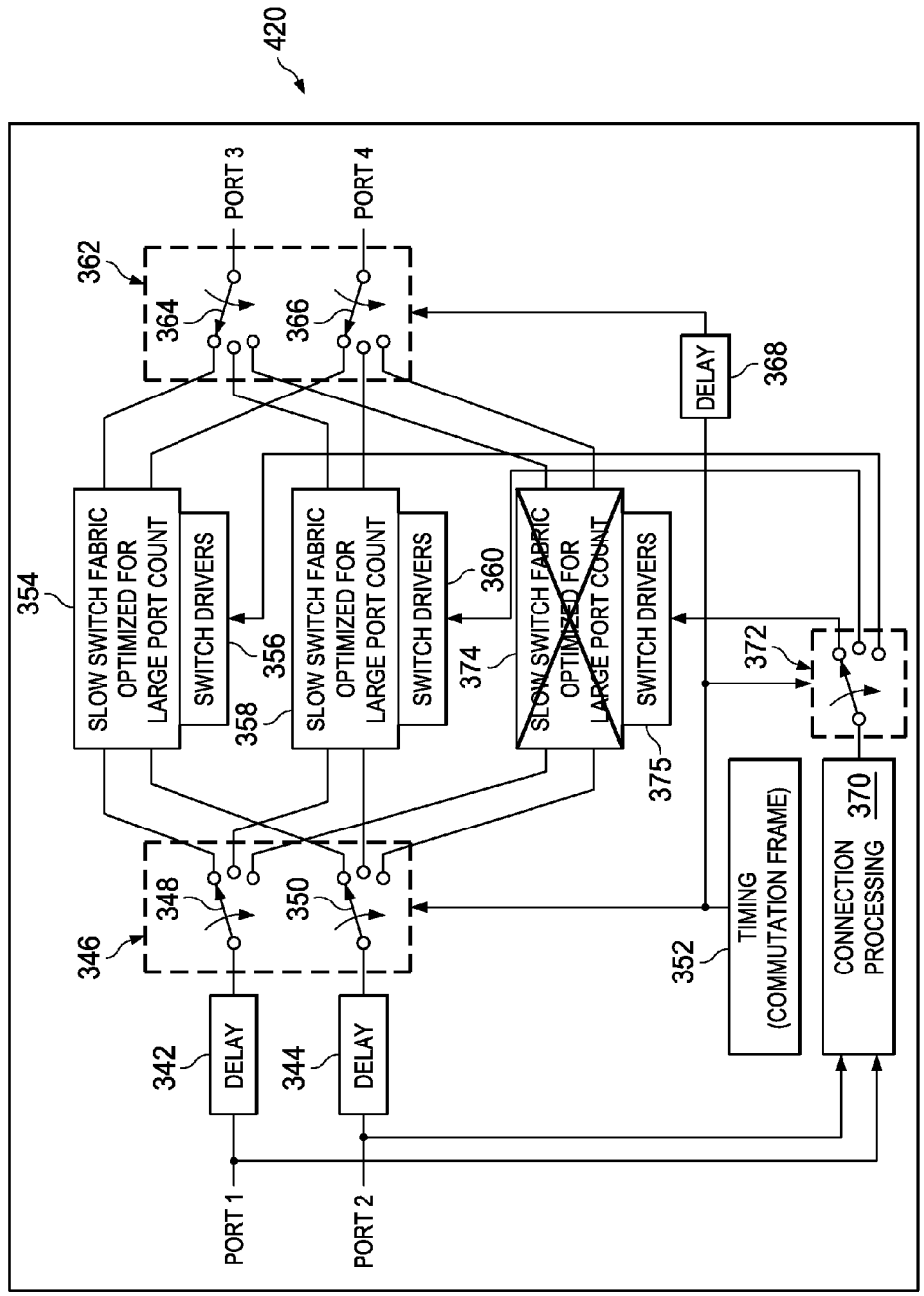
FIG. 11 illustrates an embodiment system for photonic packet switching for compensating for an out of service high port count switch.

FIG. 11 illustrates system 420, which uses three way commutation to provide both a fast switch using high port count switches with an additional way of commutation to protect against switching failure. The three way commutator switches in system 340 commutators 346 and 362, provide both fast switching with an additional layer of protection for a high port count switch failure. High port count switches 354, 358, and 374 are sufficiently fast to operate at two-level commutation, but are actually used for three-level commutation. Table 2 illustrates the state of the high port count switches during the commutation phases. The high port count switches are in traffic every three periods, with a period of setting up, and a period of reconnection set-up. When any one of the high port count switches fails, for example high port count switch 374 in system 420, the commutators are re-scheduled to a two way commutation among the two surviving high port count switches, high port count switch 354 and high port count switch 358. Table 3 shows the state of the high port count switches after high port count switches 375 fails. High port count switch 375 is not used. High port count switch 354 and high port count switch 358 alternate being in traffic and setting up.

This facilitates the full capacity of the overall switch node being maintained after a switch failure but with an equipment overhead of 50% instead of the 100% overhead in a fully duplicated switch node. For higher level commutation this protection can be achieved with a lower level of overhead—33% for 4 way→3 way (protection active) commutation, 25% for 5 way→4 way (protection active) commutation, etc.

The use of three way commutation rather than two way commutation with a standby third switch and a complex protection switching arrangement facilitates all three switches to be continuously exercised during operation, confirming their functionality and avoiding the possibility of a "silent" failure of the standby switch of the alternative approach. Any switch which fails this functionality confirmation is removed from service by appropriately reprogramming the commutator sequence.

TABLE 2

| Commu-tation Phase | High Port Count Switch 354 | High Port Count Switch 358 | High Port Count Switch 375 |
|---|---|---|---|
| 1 | In traffic | Setting up | Reconnection set-up |
| 2 | Reconnection set-up | In traffic | Setting up |
| 3 | Setting up | Reconnection set-up | In traffic |
| 4 | In traffic | Setting up | Reconnection set-up |
| 5 | Reconnection set-up | In traffic | Setting up |
| 6 | Setting up | Reconnection Set-up | In traffic |

TABLE 3

| Commu-tation Phase | High Port Count Switch 354 | High Port Count Switch 358 | High Port Count Switch 375 |
|---|---|---|---|
| 1 | In traffic | Setting up | Not used |
| 2 | Setting up | In traffic | Not used |
| 3 | In traffic | Setting up | Not used |
| 4 | Setting up | In traffic | Not used |
| 5 | In traffic | Setting up | Not used |
| 6 | Setting up | In traffic | Not used |

In another example, in a configuration where three high port count switches are used in operation, four high port count switches with four level commutation may be used. In other examples, one, two, or more additional levels are used from the desired number of switches to maintain operation when a high port count switch fails.

A high port count switching fabric with thousands of ports may involve a large number of switching stages or relatively few switching stages implemented with high port-count photonic switches in a photonic integrated circuit (PIC). Some technologies which may be used include silicon with carrier injection switching and InGaAsP/InP semiconductor optical amplifier based switching.

Figure 12:
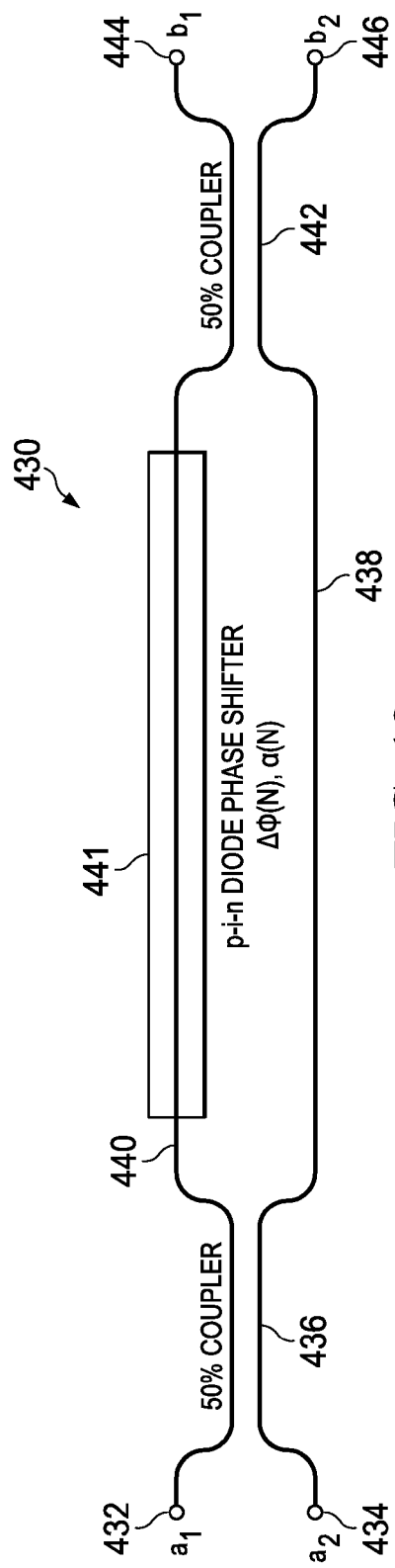
FIG. 12 illustrates a Mach Zehnder interferometer.

FIG. 12 illustrates a Mach-Zehnder interferometer 430, an example switching element of a silicon carrier injection switch. Incoming light enters input 432 or input 434, and proceeds to coupler 436, a 50:50 coupler, where it is split. Half of the optical signal is coupled to leg 438 and half of the optical signal is coupled to leg 440. The optical signals from legs 438 and 440 are combined by coupler 442, where it is output in output 444 or output 446. The output depends on the relative optical path lengths of leg 438 and leg 440. When the optical path lengths are the same, or have a difference in phase shift of a multiple of $2\pi$, between leg 438 and leg 440, there is complete constructive interference. However, if the path lengths have a relative phase shift of $-\pi$, $\pi$, $3\pi$, etc., there is complete destructive interference. For intermediate relative phase shifts, there is an intermediate interference. If the optical path lengths are varied, for example by variable phase shifter into one or both legs, Mach-Zehnder interferometer 430 may be used as an optical switch. As illustrated, phase shifter 441, a p-type intrinsic n-type (pin) diode phase shifter, is in leg 440. Phase shifter 441 may be a pin diode phase shifter. A voltage may be applied to phase shifter 441 to adjust its optical path length. Mach-Zehnder interferometer 430 is integrated on a single substrate, for example on a PIC. This switch may have a 0.6 dB on-state loss and a 20-25 dB off state loss, with a switching time of 2-5 ns.

This creates a 2×2 switch which can be replicated in a switching architecture, such as a Benes switch, to create 16×16, 16×32, 32×32, or larger crosspoint arrays with a large number of switches in series.

Figure 13:
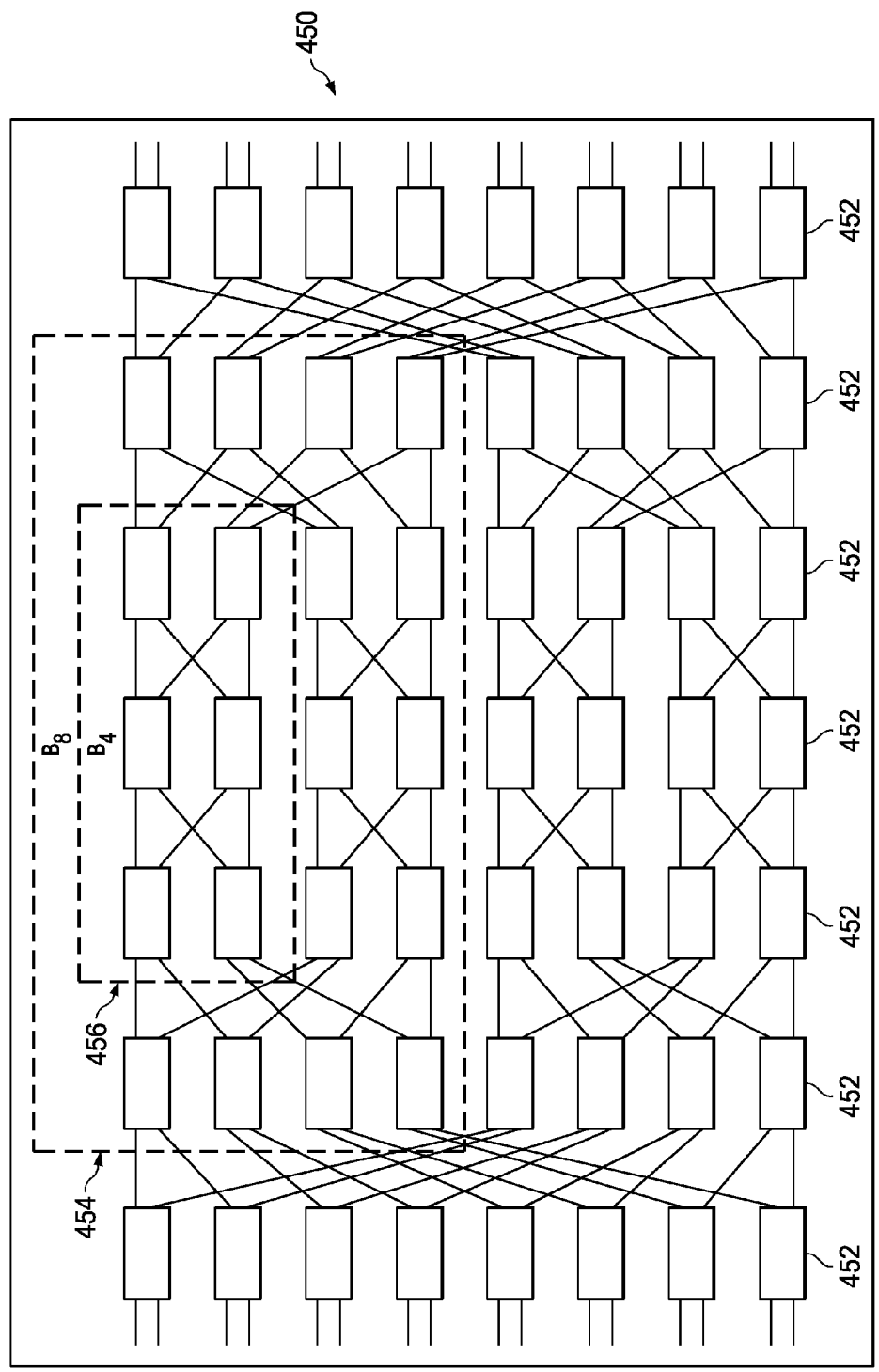
FIG. 13 illustrates a Benes switch.

FIG. 13 illustrates Benes switch 450. A Benes switch has the same number of rows as the number of columns with an even number of rows and columns. Benes switch 450 is a 16×16 Benes architecture built from 8×8 Benes blocks 454, which in turn are built from 4×4 Benes block 456. Benes switches can be used as switching modules to fabricate larger more complex switches, for instance by using them as modules in a CLOS architecture.

Figure 14:
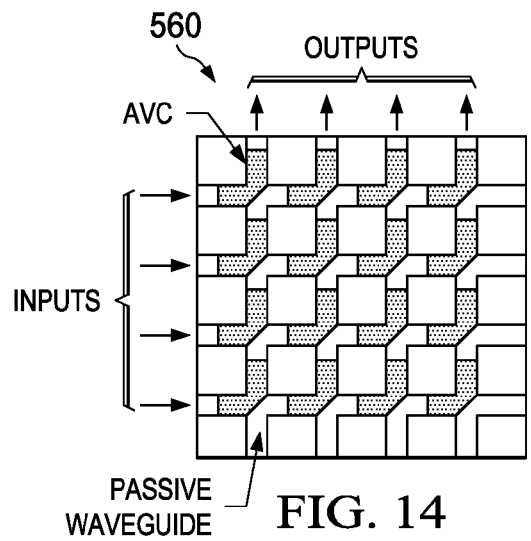
FIG. 14 illustrates an embodiment solid state photonic switch.
Figure 15:
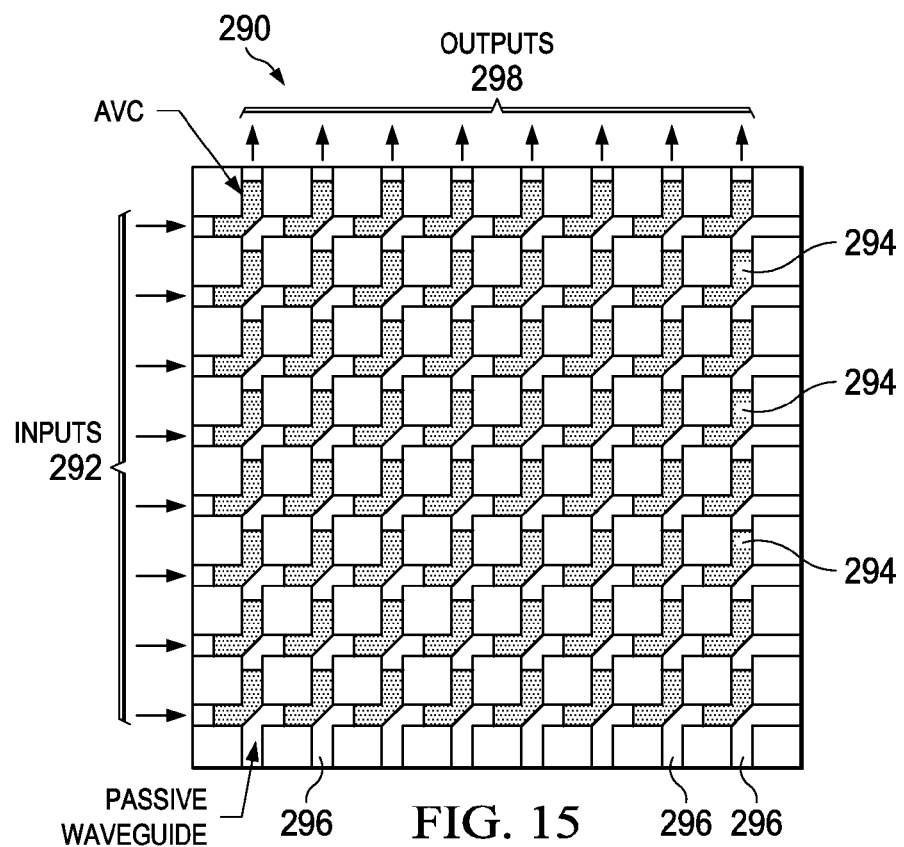
FIG. 15 illustrates an embodiment solid state photonic switch.

FIG. 14 illustrates switch 560, a 4×4 directly addressable crosspoint matrix switch. A similar design may be used for a larger switch. FIG. 15 illustrates switch 290, a solid state photonic switch with active vertical couplers (AVC) between rows of input optical paths and output optical paths, for the case of N=8. Switch 290 may be fabricated in InGaAsP/InP multi-layers on an InP substrate. Such a structure may use AVCs to provide integrated amplification utilizing similar technology to semiconductor optical amplifiers (SOAs). Switch 290 may be used for fabrics in first stage fabrics, second stage fabrics, and/or third stage fabrics. Switch 290 may be a non-blocking indium-gallium-arsenic-phosphide/indium phosphide crosspoint array as shown, which may be used as a directly addressable switch module. In another example, a silicon solid state monolithic or hybridized switch crosspoint array with a different internal structure is used, for example a Benes structure, which uses an additional stage of connection processing in the pipeline, or a dilating tree plus select switch matrix, which is directly addressable. Switch 290 contains inputs 292 and outputs 298. As pictured, switch 290 contains eight inputs 292 and eight outputs 298, although it may contain more or fewer inputs and outputs and may have the same number of inputs as outputs, fewer inputs than outputs, or more inputs than outputs, facilitating building dilating switch fabrics. Also, an InGaAsP/InP example of switch 290 contains AVCs 294 and passive waveguides 296. AVCs are pairs of semiconductor optical amplifier parts fabricated on top of the waveguide with an interposed 90 degrees totally internally reflective waveguide corner between them. These amplifiers have no applied electrical power when they are off. Because the AVCs are off, they are opaque, and the input optical waveguide signal does not couple into them. Instead, the optical signal propagates horizontally across the switch chip in the input waveguide. At the crosspoint where the required output connection crosses the input waveguide the AVC is biased and becomes transparent. In fact, the AVC may have a positive gain to offset the switching loss. Because the AVC is transparent, the input light couples into it, then turns the corner due to total internal reflection, and couples out of the AVC into the vertical output waveguide. While FIG. 15 shows an N=8 switch, switches with a larger N and/or rectangular switches, with more inputs than outputs or more outputs than inputs, may also be used for switching modules for use in dilated multistage switches.

Another photonic switching material is lithium niobate, which is conducive to single or small arrays of simple functions, such as 1:2 switches or 1:4 switches. However, lithium niobate based switches can switch in sub-nanosecond time frames, for example 100 ps or faster. In other material systems, even faster switching speeds and improvements in electro-optic silicon switches may facilitate significant improvement in the speed of simple switches.

Figure 16:
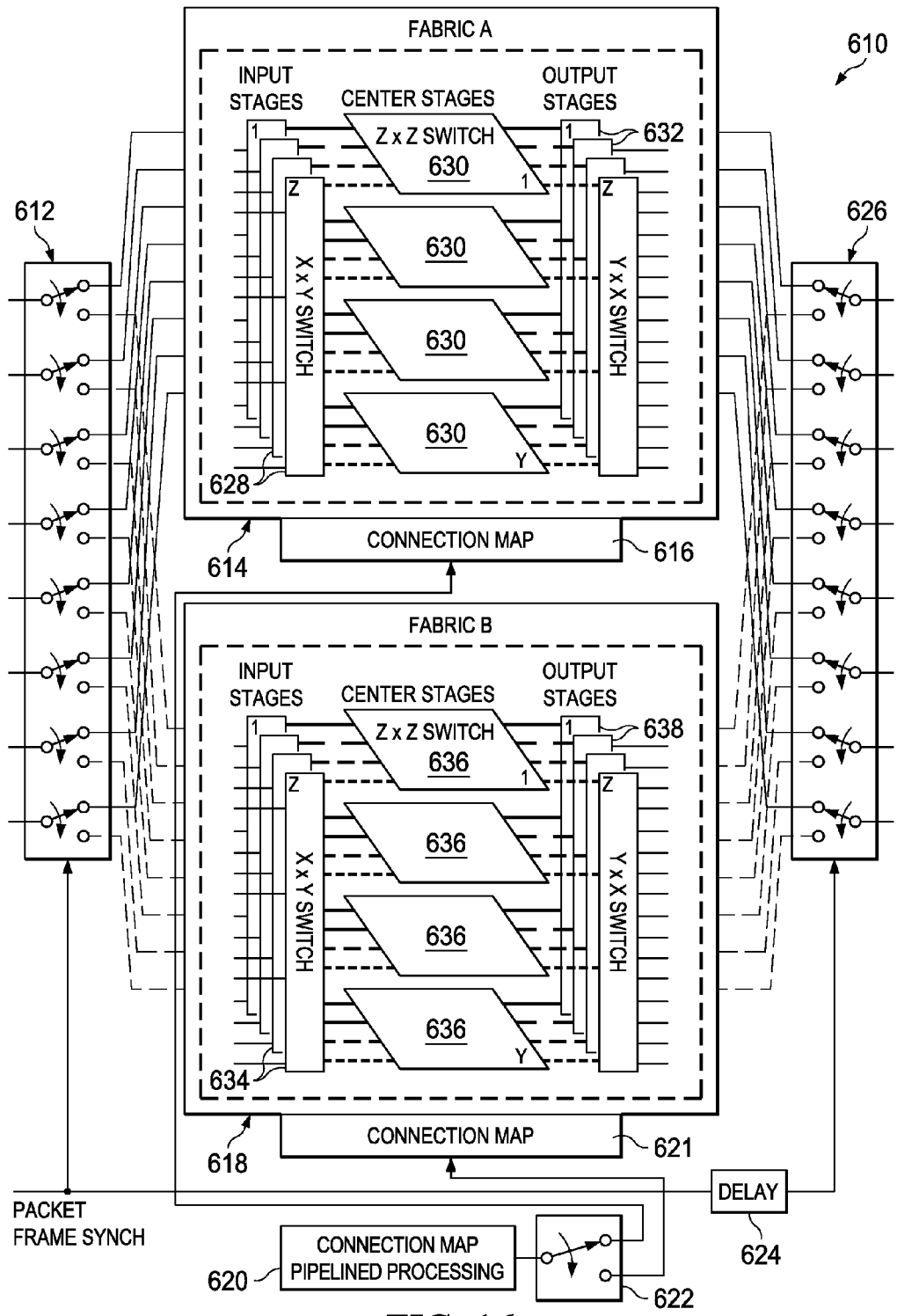
FIG. 16 illustrates another system for photonic packet switching with commutation.

FIG. 16 illustrates system 610 for a very high capacity fast synchronous photonic circuit switching node using commutation. Two high port count switches with commutating switches across their inputs and outputs are used to relax the set up speed and skew time constraints. Array 612 receives synchronous input packet streams. The input packet stream may be a stream of long packets with an IPG of P. Switches in array 612 are fast 1:2 toggling switches, for example made from lithium niobate. In one example, the switches have a switching time of around 0.1 ns and a skew of less than 1 ns. Array 612 receives a packet frame synch signal. In 100 GE, the padded long packet frame period may be 120 ns, corresponding to the duration of 1500 bytes at 100 Gb/s. The fast switches maintain a connection for a packet frame period. They then toggle synchronously with the IPG, and maintain the toggled connection for a frame period, when they toggle back.

Packets are alternately routed to high port count switch 614 and high port count switch 618. High port count switch 614 and high port count switch 618 are large multi-stage silicon based switching fabrics. The switching time and set up skew for the high port count multi-stage switches is less than or equal to a frame time, which is about 120 ns for 100 GE. High port count switch 614 contains first stage 628, second stage 630, and third stage 632, while high port count switch 618 contains first stage 634, second stage 636, and third stage 638. During a packet duration, one high port count switch maintains its connection for the entire frame duration while the other is set up. Then, the high port count switches swap roles.

Connection map and pipelined processing block 620 receives connection requests. Based on the connection requests, connection map pipelined processing block 620 determines connection maps for high port count switch 614 and high port count switch 618. The connection maps are alternately routed to connection map 616 for high port count switch 614 and connection map 621 for high port count switch 618 by switch 622, an electrical commutating switch.

Commutator 626 outputs the switched packets from high port count switch 614 and high port count switch 618. Commutator 626 is controlled by the packet frame synch which is delayed by delay 624 to compensate for the average time of flight delay through the photonic switching fabric. Variations in the time of flight generate propagation skew. To address this, the paths through the high port count switches may be designed to all have the same or similar delay even, because fixed delay can be compensated for in timing, for instance via the delay block 624 in FIG. 16. However, propagation skew (delay variations over different paths) is problematic, because the delay is a function of the actual switch paths used for a particular routing. Matching switched path length delays eliminates this issue. The switches in commutator 626 are fast 2:1 toggling switches, for example made from lithium niobate. In one example, the switch time is 0.1, and the skew and time of flight skew are less than a nanosecond achieved by matching the optical path lengths within the large fabrics, leading to P=1 ns. Alternatively, a small increase in P is applied with a small loss in capacity or a small packet clock rate acceleration. The output packet streams have an IPG of P.

After the connections are passed to high port count switch 614 it is in service, having been set up during the previous frame, and high port count switch 618 is out of service and connected to the control processing and receiving/setting up the connections for the next frame of packets. The output commutator, commutator 626, alternately connects high port count switch 614 and high port count switch 618 nominally in synchronism with the input commutation, although it may be delayed to compensate for the time of flight of photons through the optical paths. The delay may be approximately 1 ns for about every 20 cm of optical path.

Illustrated in the upper half of FIG. 2 is the resulting timing diagram for the switch illustrated in FIG. 16 and a non-commutated high port count photonic switching fabric. Without commutation or packet acceleration, there is a 1 ns set up time, in the IPG for 100 GE. The local connection map is applied to the individual switching matrices, and the switching matrices take down the previous connections and set up the new connections during the IPG. This also includes an allowance for skew or timing tolerances, such as a timing tolerance after the end of the previous packet to facilitate that the take down of the previous connection does not commence before the end of the previous packet and that the new connections are placed before the arrival of the start of the new packet due to factors such as variations in arrival times of packets. The level of these tolerances depends on multiple factors, including the variations between packet arrival times on each of the switch inputs and the packet frame synchronization signal, and the physical length of the paths to and within the switch, because a 1 ns delay comes from approximately 20 cm in an optical waveguide. The skew may be positive or negative, leaving less set-up time available. The set-up time for multi-stage switches is less than 1 ns in 100 GE with no IPG enhancement.

With commutation, the switch set-up time and skew are less than a traffic packet duration plus 2 IPGs. Set-up time may be traded for skew. In the lower half of FIG. 2, which illustrates a commutated approach, the total skew is 1+1 ns, and the set-up time is 120 ns, for a total of 122 ns.

The total set-up time may be broken into switch crosspoint configuration set-up time and control timing skew in various proportions when the switch set-up time and return to service is completed by the time the next set of packets to be switched by the fabric arrives. In the lower half of FIG. 2, the entire IPG is allocated to optical propagation skew, but the large fabric control skew may be smaller or larger than the IPG. The skew should be so that no part of the previous packet is lost from the commutator operating too early and the commutator completes its commutation switching before the next packet starts. Furthermore, the two skews at either end of the first fabric (Fabric A in FIG. 2) result in high port count switch 614 being set up and returned to service before the start of the of the next set of packets to be routed through high port count switch 614 and the same for high port count switch 618 (Fabric B in FIG. 2). For 100 GE long packet streams without clock acceleration, there is 1 ns allocated for peak-to-peak optical propagation skew and 120 ns for setting up the high port count switches. Some time may be mapped from the set-up time to increase the control skew budget. For 400 GE, the values are around 0.25 ns for optical path skew and 30 ns for set up time and control skew for two way commutation.

By using some packet acceleration, for example less than 10%, the IPG may be increased without excessive clock rate increases. An acceleration of 10% brings the skew for 100 GE to 26 ns total (13+13), and shortens the set-up time window to about 108 ns. For 400 GE, the corresponding skews and set-up times are about 6.5 ns total skew (3.25+3.25) and about 27 ns set-up time.

Figure 17:
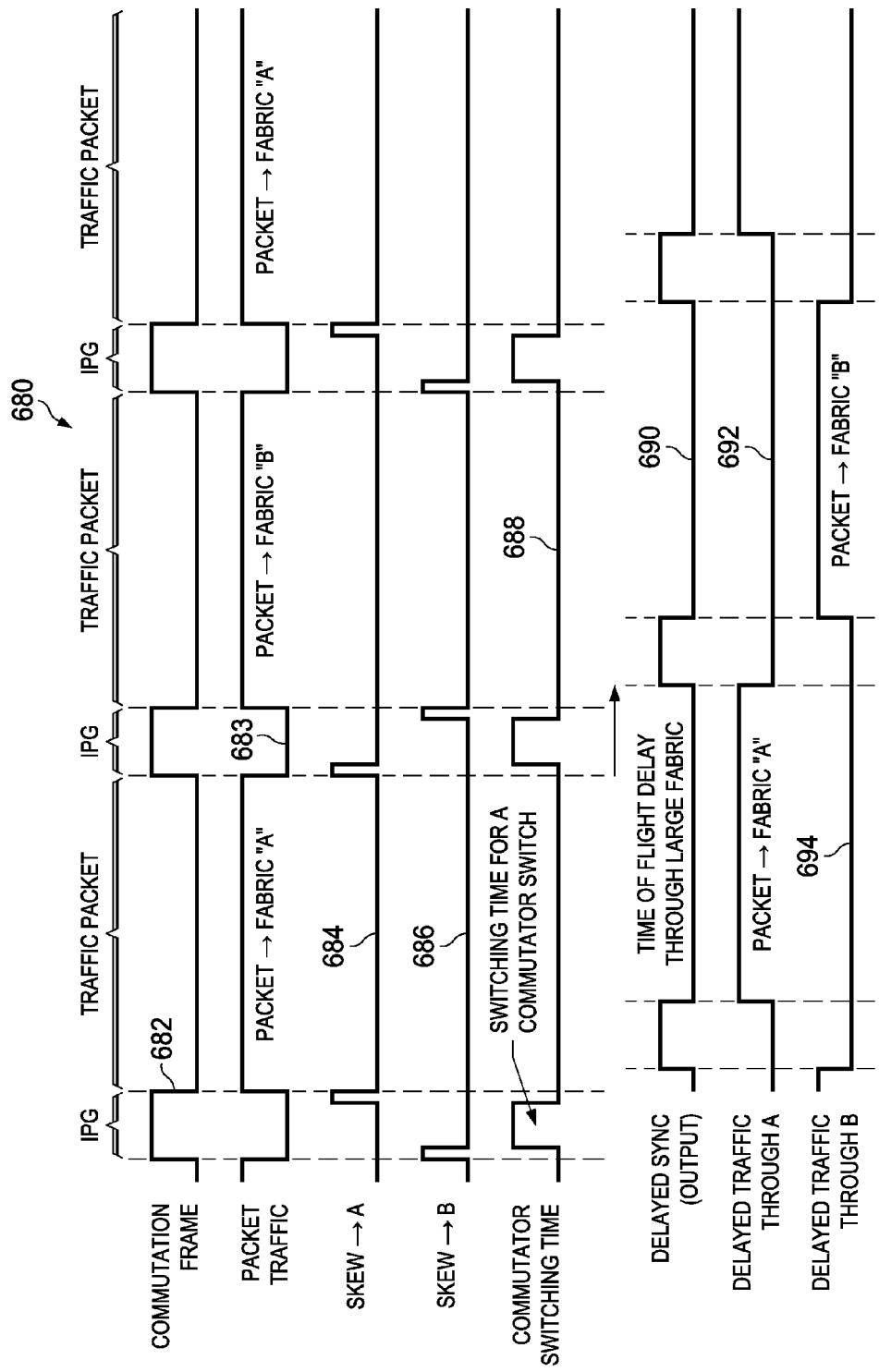
FIG. 17 illustrates a timing diagram for photonic packet switching with commutation.

FIG. 17 illustrates timing diagram 680 for the commutators themselves. Curve 682 shows the commutation frame, curve 683 shows the packet traffic, curve 684 shows the first skew, curve 686 shows the second skew, curve 688 shows the switching time for the commutator switch, curve 690 shows the sync delay for the output, curve 692 shows the delayed traffic emerging from the high port count switch, and curve 694 shows the delayed traffic emerging from the second high port count switch.

The timing requirements for the commutators are approximately as tight as those for a large switch without commutation. However, these requirements are applied to a small, simple switch optimized for speed and skew, not a complex multi-stage switching fabric. In one example, lithium niobate is used. Simple switches made out of lithium niobate may have switching times of 200 ps, 100 ps, or less. When the switch drive is properly timed, and skew across the various switch ports is addressed, this becomes the apparent switching speed performance for the overall switch node.

As seen in FIG. 16, the photonic paths through the commutators feed the high port count switches and receive switched traffic on a packet by packet basis from the high port count switches. The high port count switches have a finite delay through them determined by the length of the optical path from the output of the input commutators to the inputs of the output commutators. This delay is likely to be significant compared to the IPG, or significantly more than the IPG. Hence, the output commutation is delayed from the input commutation to account for the time of flight through the high port count switches.

The commutator timing skew and switching time are accommodated within the IPG. The simple switching may be implemented with a 0.1 ns switching time. The propagation skew is a function of both the precision of the delivery times of the packets (TOR/Splitter to switch timing skew) from the peripherals and the variations in the time of flight through the high port count switches between the commutators (switch propagation skew). The propagation skew through the high port count switches is distinct from the time of flight nominal delay through these switches, which is the difference between the maximum and minimum possible delay. The nominal or average time of flight delay is determined and compensated for, and the output commutation framing clock may be appropriately delayed. The skew from the high port count switches results from variations in the delay along the selected signal paths through the high port count switch. This may be controlled by design of the optical path lengths through the high port count switch. Both the overall delay and the propagation skew may be lower when the high port count switch is more compact and the propagation skew can be reduced by design of optical path lengths.

In one example, a 400 GE capable 1024 by 1024 port switching fabric, created from two 1024×1024 three stage large switch fabrics and an array of input 1:2 and output 2:1 commutators, provides 0.4 Pb/s of packet switching capacity in a single switching plane with a commutated architecture. This may be used to create a 1.6 Pb/s quadranted photonic switching core or a 3.2 Pb/s octanted photonic switching core in the data center using 4 high speed port and 8 high speed port TORs, respectively. In one example, a three stage switching structure utilizing AWG-Rs in the second stage is used in conjunction with wavelength-agile optical carriers. Alternatively, a switch based on three stages of active crosspoint switches is used with fixed wavelength optical carriers. The crosspoint switches may be mounted on optical macromodules, for example integrated on $SiO_2$ on Si structures, which may have erbium doped waveguide amplification implemented in silica waveguides or hybridized SOA. Erbium doped waveguide amplification operates similarly to erbium doped fiber amplification, with a gain medium of about 10-15 cm of Er doped $SiO_2$ waveguide for compact arrays of amplifiers with up to 10-15 dB of gain.

Figure 18:
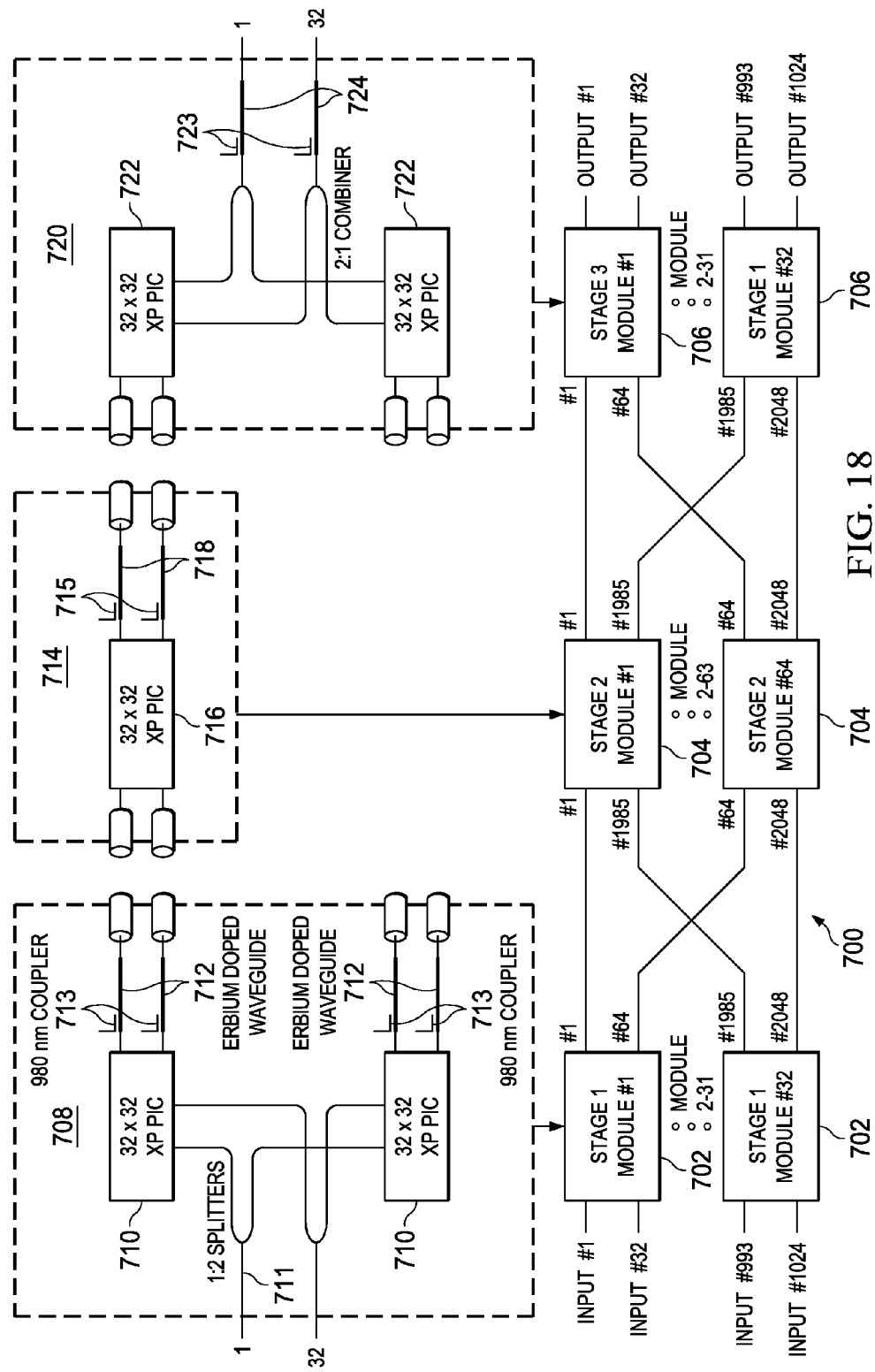
FIG. 18 illustrates an embodiment three stage photonic switch.

FIG. 18 illustrate the structure of a 1024×1024 photonic switch with 1:2 dilation for fully non-blocking behavior. System 700 contains 32 first stage modules 702, 64 second stage modules 704, and 32 third stage modules 706. First stage module 708 contains 1:2 splitters 711, 32 by 32 crosspoint PICs 710, 980 nm couplers 713, and erbium doped waveguides 712. Second stage module 714 contains 32 by 32 crosspoint PIC 716, erbium doped waveguides 718, and couplers 715. Third stage module 720 contains 32 by 32 crosspoint PICs 722, 1:2 splitters 723, and erbium doped waveguides 724. The erbium doped waveguides are stimulated into amplification by application of 980 nm pump light from a moderately high power continuous wave laser as in erbium doped fiber amplifiers. The PICs may be InGaAsP/InP or silicon PICs. In addition the approach may be simplified for silicon electro-optic switching modules by replacing the pair of 32×32 switches and the splitters used in each first stage module with a single 32×64 switch module and replacing the two 32×32 switches and combiners used in each third stage switch module with a single 64×32 switch.

In one example, the commutation is built into the switch in the switching modules. This may be implemented in a macromodule configuration or in another approach. Packets are received by first stage module, which contains a commutator and high port count switches. The commutator and two high port count switches are embedded in a first stage module. While one high port count switch is being set up, the other is in traffic, and vice versa. In one example, the commutator is made of lithium niobate, and the high port count switches are 32×64 port count switches.

In one example, the photonic modules are mounted on plug-in circuit packs using printed circuit boards and shelf backplanes. This may be done with a fiber-based flexible circuit optical backplane or backplanes, which may support thousands of optical connections.

Figure 19:
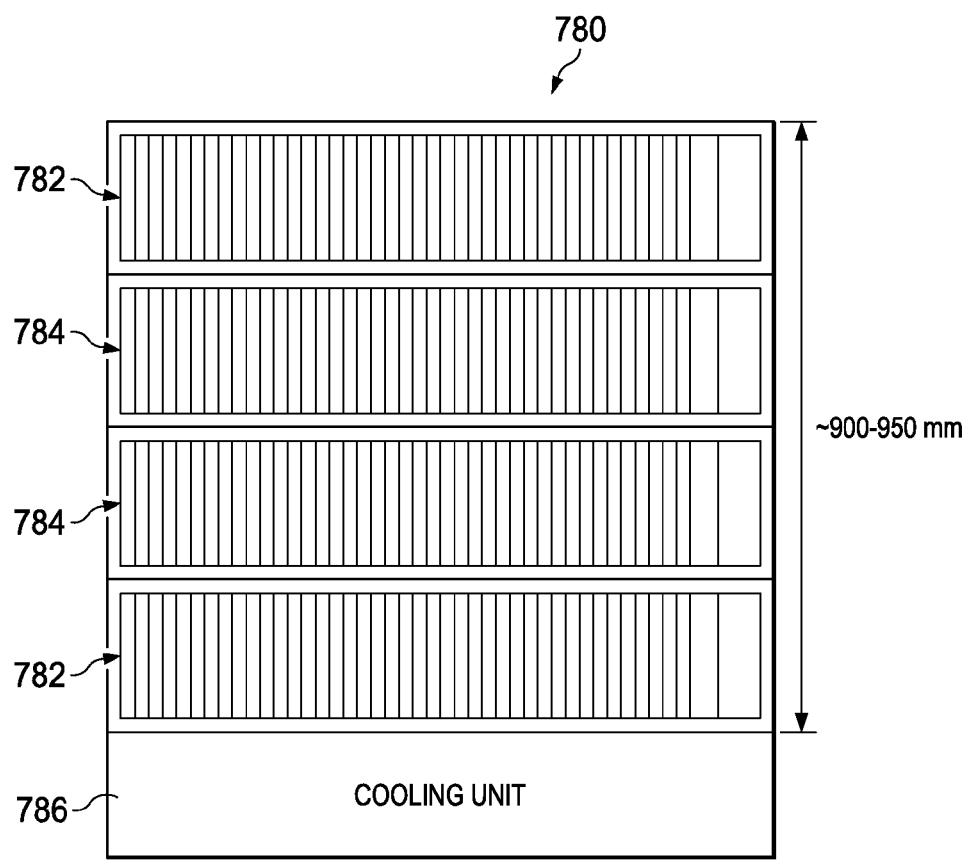
FIG. 19 illustrates an embodiment rack configuration for photonic packet switching.

FIG. 19 illustrates an example implementation based on equipment rack 780 which contains double depth plug in cards, which are cards about 200 mm front to back. Port card shelves 782 have input port cards/output port cards and switch card shelves 784 which have switch cards. Rack 780 contains a four shelf 1024×1024 fast photonic circuit switch with 1:2 mid-stage dilation to create a non-blocking, three stage structure based on high density circuit boards. Optical macromodules on the boards provide intra-circuit pack optical interconnect and functionality, carrying InGaAsP/InP or Si crosspoint PIC and associated functions. The optical macromodules also contain high density ribbon interconnect to high density multi-way optical plug-in faceplate and backplane connectors, such as Molex® connectors. The port card shelf contains 32 trib stage 1 or stage 3 switching cards, a shelf controller, and point of use power supplies (PUPS) in an about 750 mm width shelf. The switch shelf contains 32 stage 2 switch cards, a shelf controller, and PUPS in an approximately 750 mm wide shelf. Additionally, rack 780 contains cooling unit 786.

Backplane interconnects may use multiple flexi-optical backplanes to achieve the optical shuffle function, where one optical connection is made between each first and second stage card or module and between each second and third stage card or module. These flexible optical shuffles are mounted on hinged panels to one or both side edges of the backplane at the rear of the shelf to be hinged out of the way to provide access to the electrical backplane. The shelf electrical backplane is a multi-layer printed circuit board without optical interconnect. The optical interconnect implemented by the flexi-optical shuffle functions is via a number of flexible Kapton® optical interconnect matrices, where individual fibers are automatically placed on a glued Kapton® film and laminated with a second Kapton® film in a prior art standard process—for example from Molex® connectors. The interconnection is via the Molex® multi-fiber connectors. There is a four shelf design where two of the shelves each contain 32 input or output stage cards and the other two shelves each contain 32 switch center stage cards. Alternatively, there is a six shelf design where three of the shelves each contain 21 or 22 input or output stage cards and the other two shelves each contain 21 or 22 switch center stage cards. The height of rack 780 may be from about 900 mm to about 950 mm for the four shelf design and 1350-1425 mm for the six shelf design.

Figure 20A:
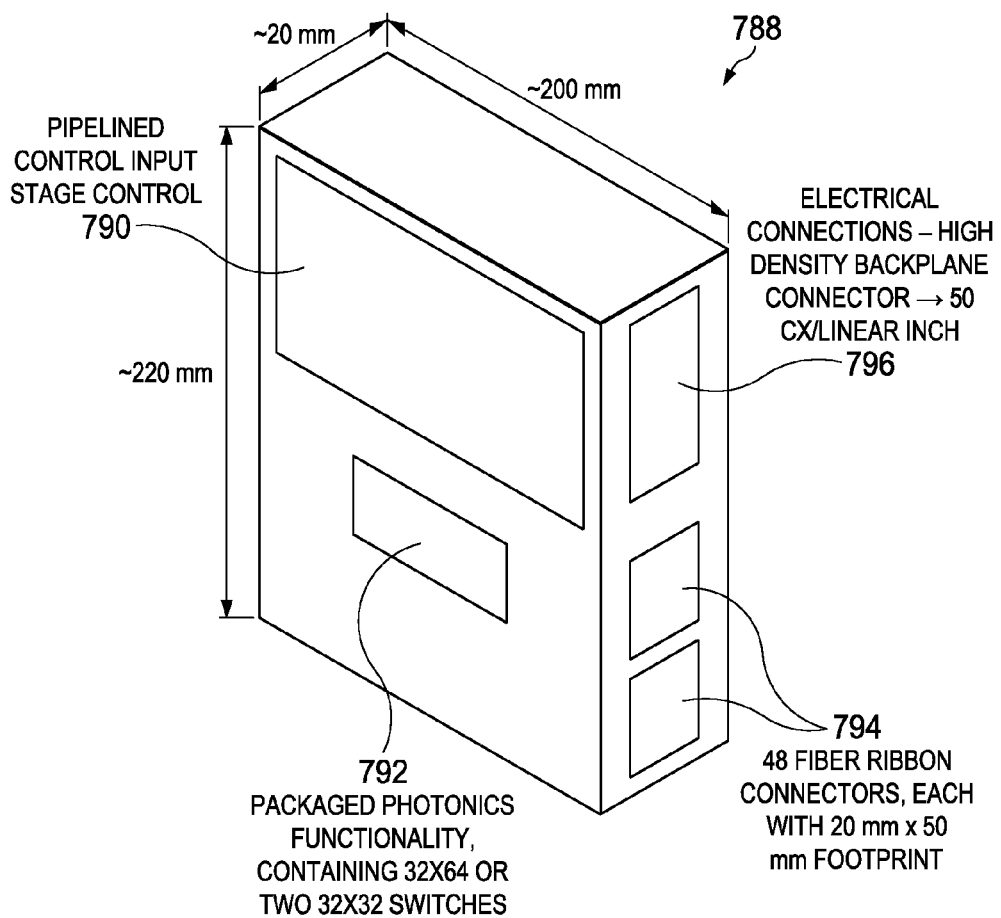
FIGS. 20A-20B illustrate embodiment cards for photonic packet switching.
Figure 20B:
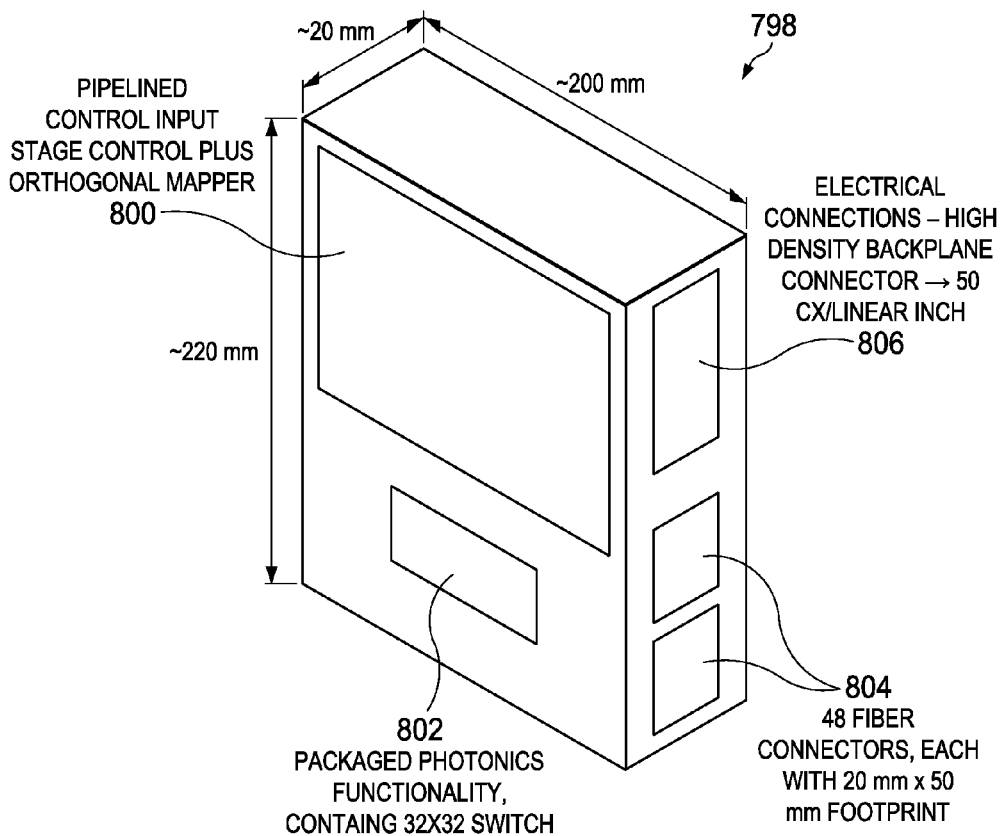

FIGS. 20A-B illustrate example cards—which are complex plug-in photonic/electronic units—for a 1024 by 1024 three stage fast photonic switching fabric. FIG. 20A shows input port card/output port card 788, which is about 200 mm by 20 mm by 220 mm for the four shelf design or 200 mm by 30 mm by 220 mm for the six shelf design. Input port card/output port card 788 includes pipelined control input stage control 790, electrical connections high density backplane connector 796, which is 50 cx/linear inch, packaged macromodule 792, and fiber ribbon connectors 794. Fiber ribbon connectors 794 contain 48 fiber ribbon connectors with a 20 mm by 50 mm footprint. The packaged photonic area 792 contains at least one 32×64 or 32×32 switch.

FIG. 20B illustrates switch card 798, which contains pipelined control input stage orthogonal mapper 800, electrical connections 806, fiber connectors 804, and packaged macromodule 802. Electrical connections 806 include a high density backplane connector with 50 cx/linear inch. Fiber connectors 804 contain 48 fiber connectors each, each with a 20 mm by 50 mm footprint. Packaged macromodule 802 contains at least one 32 by 32 switch.

A switch with four shelves, or around 250 mm in height, may be a one meter height rack. Two switches may be in a single rack with the commutator elements in a small volume in an adjacent rack. The commutators may be placed into a central location between the switches, adding 250 to 500 mm to the rack height, leading to a rack height of about 2.25 to about 2.5 meters. Alternatively, the commutators are distributed into the input and output stage shelves, leading to a wider shelf. With a six shelf design, the two large switches are accommodated in two racks, but there is space for additional shelves for the commutators in those two racks.

The resultant delay and example uncompensated and compensated propagation skews due to internal path lengths are calculated for this structure, in the case of a four shelf illustrative implementation, for a switch which does not use commutation. Table 4 shows the average delay, the uncompensated propagation skew, and the estimated propagation skew in an example using path equalizing techniques, for example by lengthening short optical paths, for major components of the shelf, card module, and interconnect of system of 780 illustrated in FIG. 19.

Table 4

| Delay Source | Avg. Path Length (cm) | Avg. Delay (ps) | Uncompensated skew (cm) | Uncompensated skew (ps) | Estimated Compensated Skew (ps) | Notes |
|---|---|---|---|---|---|---|
| Stage 1 – input – macromodule | 50 | 2500 | 3 | 150 | 20 | Timing ref is at switch input port |
| Stage 1 – SiPIC + Macromodule | 15 | 750 | 5 | 250 | 25 | |
| Stage 1 macromodule → output | 50 | 2500 | 3 | 150 | 20 | |
| Optical Backplane fiber shuffle | 45 + 30 + 45 + 25 → 145 | 7,250 | 75 + 75 + 3 + 50 = 203 | 10150 | 350 | Assumes skew compensation by padding fiber lengths out to maximum |
| Stage 2 – input – macromodule | 50 | 2500 | 3 | 150 | 20 | |
| Stage 2 – SiPIC + Macromodule | 25 | 750 | 10 | 500 | 50 | |
| Stage 2 macromodule → output | 50 | 2500 | 3 | 150 | 20 | |
| Optical Backplane fiber shuffle | 145 | 7,250 | 7 | 10150 | 350 | |
| Stage 3 – input – macromodule | 50 | 2500 | 3 | 150 | 20 | |
| Stage 3 – SiPIC + Macromodule | 15 | 750 | 5 | 250 | 25 | |
| Stage 3 macromodule → output | 50 | 2500 | 3 | 150 | 20 | |
| Total | 645 | 32,250 | 444 | 22,200 | 920 | |
| Percentage in packaging (not MM) | 91.5 | 91.5 | 95.5 | 95.5 | 89.1 | |

Table 4 shows that the overall propagation delay in an example packaged system, at an average of ~32 ns, is many times the IPG for systems where the IPG is enlarged by modest clock acceleration. As a result, the stages of the switch may be controlled by a delay offset on timing to match portions of the overall propagation delay along the switched paths. This stage to stage delay are caused by the long delays through the fiber shuffles, which have connectivity to all cards of each shelf each shuffle is connected to, resulting in long fiber runs. Because the shuffle is connected via a hinging arrangement at one side of the shelf, it has a high variation in uncompensated fiber lengths, for example twice the width and twice the height of a shelf. In a six-shelf implementation, there is a longer unbalanced lengths in the fiber shuffles.

The estimated uncompensated skew is 22.2 ns, largely from variations in the fiber shuffle function lengths, which may be reduced by increasing the lengths of the short fibers in loops or other means of introducing physically indirect paths. When skew compensation is applied via designing close to constant path lengths, a residual propagation skew is approximately 800-1,000 ps, for example 920 ps. Thus, a 100 Gb/s switched packet with a 1 ns input IPG is problematic, because the output IPG may be as low as zero–200 ps. However, by increasing the packet clock rate a minimum output IPG of 1 ns may be seen when the input IPG is increased to 1.92 ns, with a clock rate increase on a 120 ns containerized packet stream of about 0.77% to a clock rate of 100.77 GHz. However, this is achieved at the cost of increasing the average path length due to padding out all paths to the maximum delay of $Delay_{average}$+Uncompensated skew/2=32.2+11.1=43.3 ns, or over one third of a frame period of 120 ns framing.

Rack based large switches in a commutated approach may be connected via balanced length cabling to and from an additional commutation shelf which contains an array of cards with multiple ports of 1 input 2 output and 2 input 1 output commutating switches implemented in a low skew fast switching technology design. The propagation skew and timing offset of these cards is controlled. The propagation skew timing offset is controlled by using equal optical path lengths, which is facilitated by the lack of card-to-card optical interconnect within the commutator shelf, and fiber ribbon cable connectivity, because the fibers in a given connectorized ribbon are very close to the same length. The timing offset is controlled by the timing design, especially in distribution of clock timing to cards on the shelf.

When a cable runs to and from the large switch from an adjacent commutator shelf, which are about 3 meters each, and the optical path length through a commutator card is 50 cm per commutator card, there is an additional 7 meters of path length, or 35 ns of delay, and an estimated skew of around 500 ps, largely in ribbon-to-ribbon cabling length variations. This leads to an overall propagation delay and compensated propagation skew through the overall commutated conventionally packaged switch of around 35+43 ns=78 ns, while the propagation skew is about 1.3-1.5 ns. In the case of the non-commutated large fabric, the delay largely from the fiber shuffles, is significant, leading to set up timing of each stage being significantly different and precise to track the timing of the switched traffic IPGs as they transit each stage. In the commutated case, there still is careful timing control of the offset of the output commutator from the input commutator, in this case by about 78 ns, over half of a frame, but, when the large port count switch fabrics is set up, including control skew, in the frame time minus the propagation delay and skew time, no special treatment of stage to stage delay of control is used. This is because, when the set up time begins at a time offset equal to the overall propagation delay and residual propagation skew through the switch, the tail end of the slowest previous packet exits the switch just as the set up commences, and the set up sequence will finish before the leading edge of the next but one packet arrives. The next packet has been switched by the other large switch fabric. In one example, there is 120-78 ns=42 ns for switch set up—much higher than the 1 ns IPG. When a switch needs more time to set up, a measure of timing offset in the stage set up may be used, which may be sufficient offset so each stage set up is in its own 120 ns frame window, rather than being precisely aligned to the passing IPG as per the uncommutated case.

Due to the commutation hardware and cabling, the skew is increased from around 800-1000 ps without commutation to around 1300-1500 ps with commutation, which is problematic for an un-accelerated 100 Gb/s packet stream with 1 ns IPGs. However, acceleration may be used to achieve a larger IPG with the same throughput. The acceleration may be around +1.27%, with a clock rate of 101.27 GHz, an input IPG of 2.5 ns, and an output IPG of 1 ns.

Figure 21:
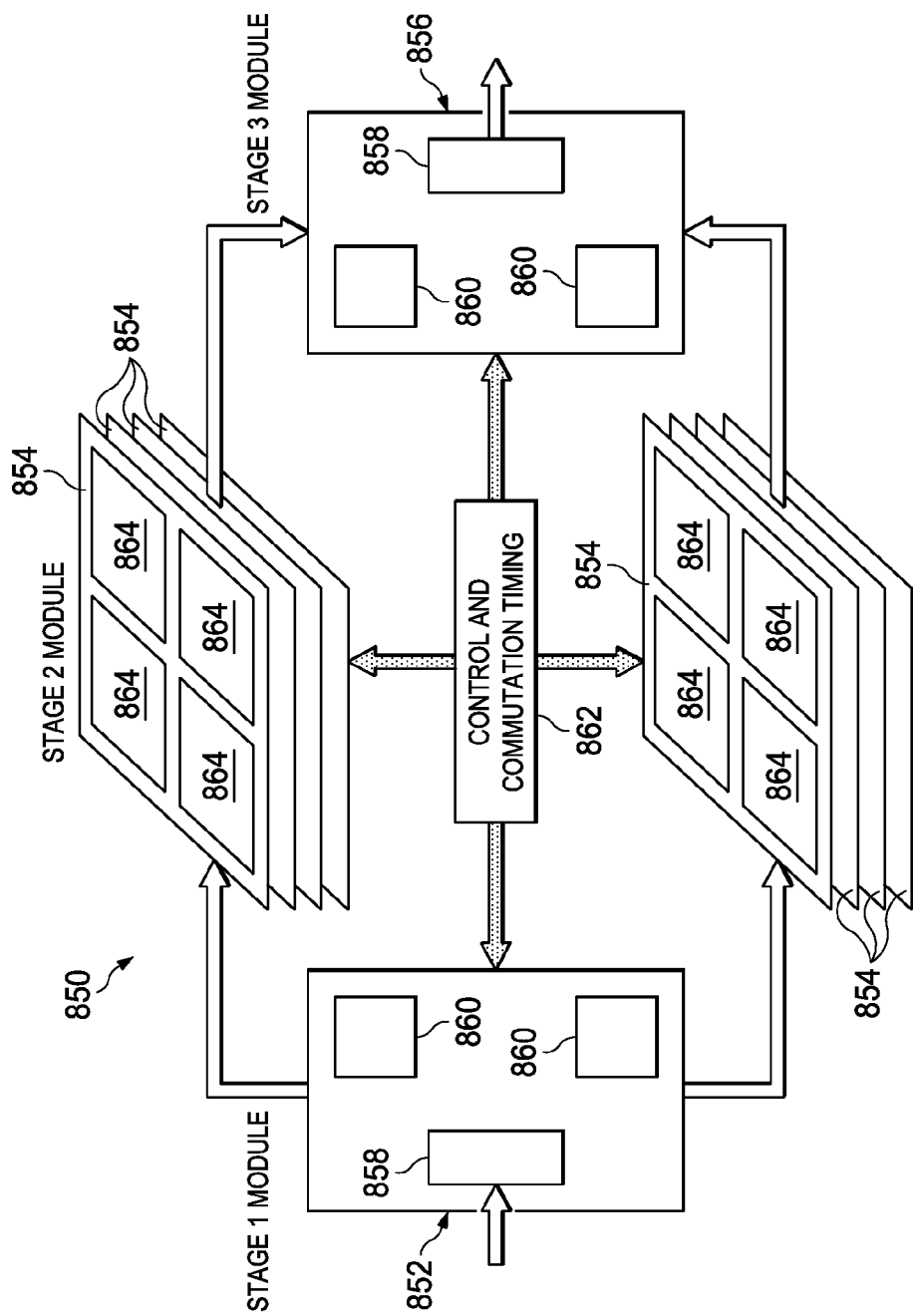
FIG. 21 illustrates an additional embodiment system for photonic packet switching with commutation.

In one example, commutation is built into the switch in the switching circuit packs or modules. FIG. 21 illustrates switching system 850 with embedded commutators. Packets are received by first stage module 852, which contains commutator 858 and high port count switches 860. The commutator and two high port count switches are embedded in first stage module 852. While one high port count switch is being set up, the other is in traffic, and vice versa. In one example, the commutator is made of lithium niobate, and the high port count switches are 32×64 port count switches.

Switched packets are passed to second stage modules 854, which contain high port count switches 864. A first stage module feeds two second stage module arrays. One array is being set up while the other is in service, and vice versa.

The switched packets are passed to stage three module 856, which contains commutator 858, a lithium niobate switch array, and high port count switches 860. Two alternating frame signals are merged in a third stage module with the inverse functionality of the first stage module.

The modules are controlled by control and commutation timing block 862.

Building the commutation directly into the switch itself removes the delays and skew of the cable from the physical switches to the commutators. This significantly reduces the delay and skew. Precision control over timing and skew is facilitated, because there are no rack to rack cabling delay considerations. With the two phases of commutation closely matched with a short overall path length this reduces delay as well as skew. A four centimeter peak-to-peak variation is plus or minus 0.1 ns, while a 20 cm peak-to-peak variation is plus or minus 0.5 ns. At such skew levels, a 100 GE or 400 GE synchronous fast circuit switch switching individual long packets may have no increase in IPG for 100 GE and a few percent increase in clock rate for 400 GE. The timing of a switch fabricated in packaging illustrated by FIGS. 19-20, with somewhat dense photonic functionality or with a somewhat low throughput and the same density of functionality would have approximately the same delay and skew properties. The propagation delay is about 43 ns when the optimum propagation skew is achieved and the propagation skew would be around 800 ps-1 ns. Thus, for 100 Gb/s switching, the switch set up time and timing skew allocation in the commutated case is about 120-43=77 ns when no special stage-to-stage control timing is used and the clock rate acceleration for a residual 1 ns IPG is 0.77% to 100.77 GHz. For 400 Gb/s with a 0.25 ns IPG requirement and a 30 ns long packet duration, because the packet duration is less than the propagation time through the switch, the set up timing of each stage is staggered in time. However, instead of that staggering having an accuracy of +/−125 ps to stay within the IPG, it now has an accuracy +/−15 ns to stay within the window allowed by the commutation frame. A skew of 1 ns involves a clock rate increase of 3.45% to 414 GHz from 400 GHz to maintain a minimum 0.25 ns IPG at the reconstituted output. 400 Gb/s packet streams may be carried on ten 40 GHz clocked optical carriers all switched on the same optical path as a multiplexed block, and the actual clock rates would be 40 GHz before acceleration and 41.4 GHz after acceleration. A similar consideration may apply to some forms of 100 GHz data streams, at a sub-multiplexing level of four streams rather than ten.

A photonic switching fabric may also have packet synchronization with the routing information. Routing information may arrive significantly in advance of the packet to be switched, so the control pipeline has a lead time to determine the paths for that frame of packets and generate a connection map for the packets' frame. This may be achieved by buffering the packets as part of the packet stream splitter and containerization process. The packet splitter generates a stream of long containerized padded packets and a separate stream of short packets.

Because a synchronous fast containerized long packet switch, whether commutated or not, has all of the packet container leading edges on all of the incoming ports time-aligned, skew in timing of incoming packet containers may be an issue. The cable lengths from the packet stream splitters, especially when those packet stream splitters are co-located with the remote TORs, which may be hundreds of meters away, may be a significant source of delay. The variations in lengths may cause offsets due to cable transmission delay resulting in precision timing set which is set at the splitter to be lost due to TOR/splitter to switch propagation skew. This may be accounted for by the application of a closed loop phase control, which facilitates that the packet frame phase at the splitter outputs feeding towards the switch is such that the packet frame phase of the incoming signals at the switch commutator inputs, or the inputs for a non-commutated synchronous fast circuit switch, are correctly aligned to the commutation signal, which is set by the master reference timing source at the switch, which is acting as the master timing reference for the switch and the subtending TOR-based splitters. Hence, the splitters deliver their data streams so the IPGs are aligned at the switch input or, for a commutated switch, at the commutator input.

Figure 22:
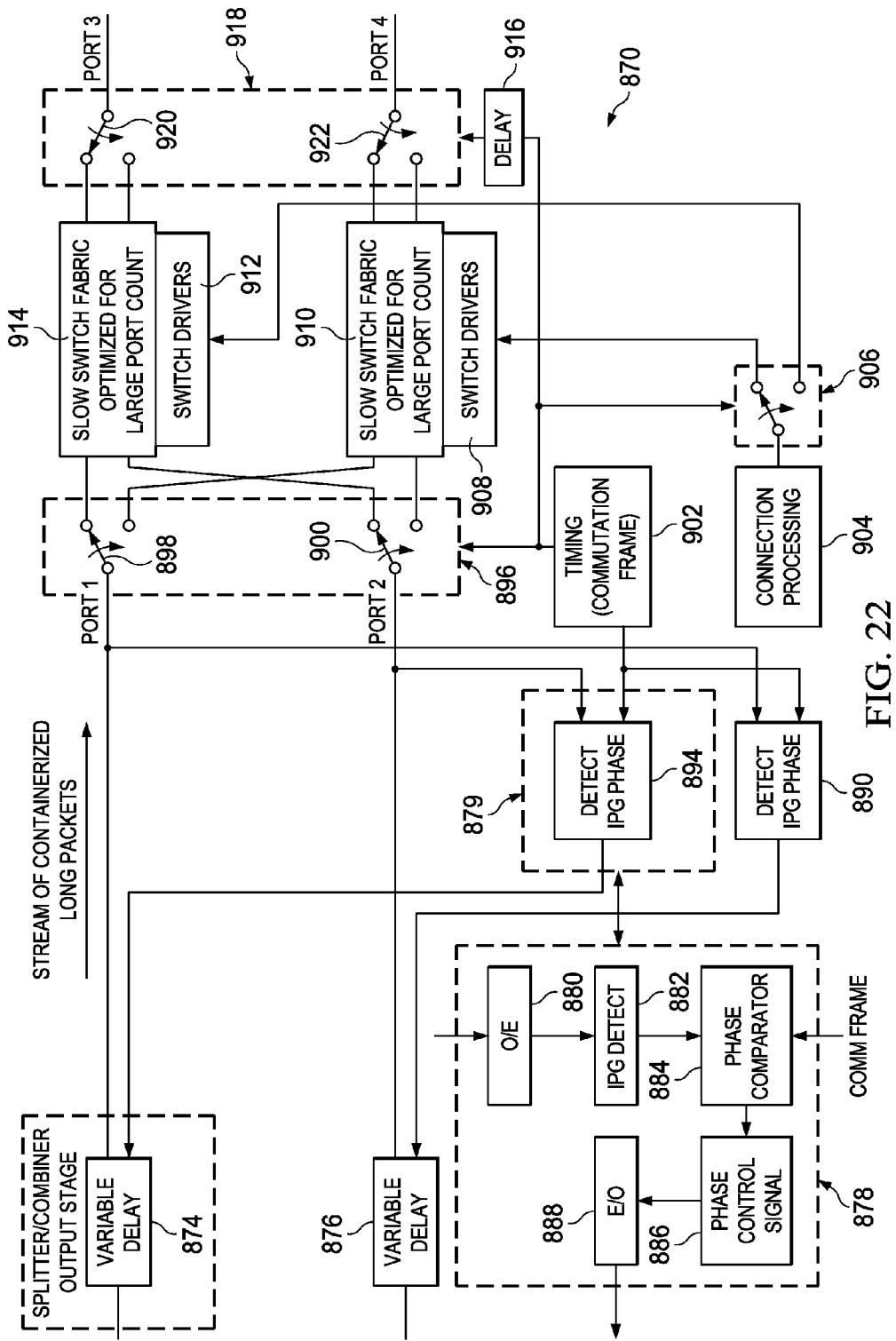
FIG. 22 illustrates an embodiment system for photonic packet switching with phase control and commutation.
Figure 23:
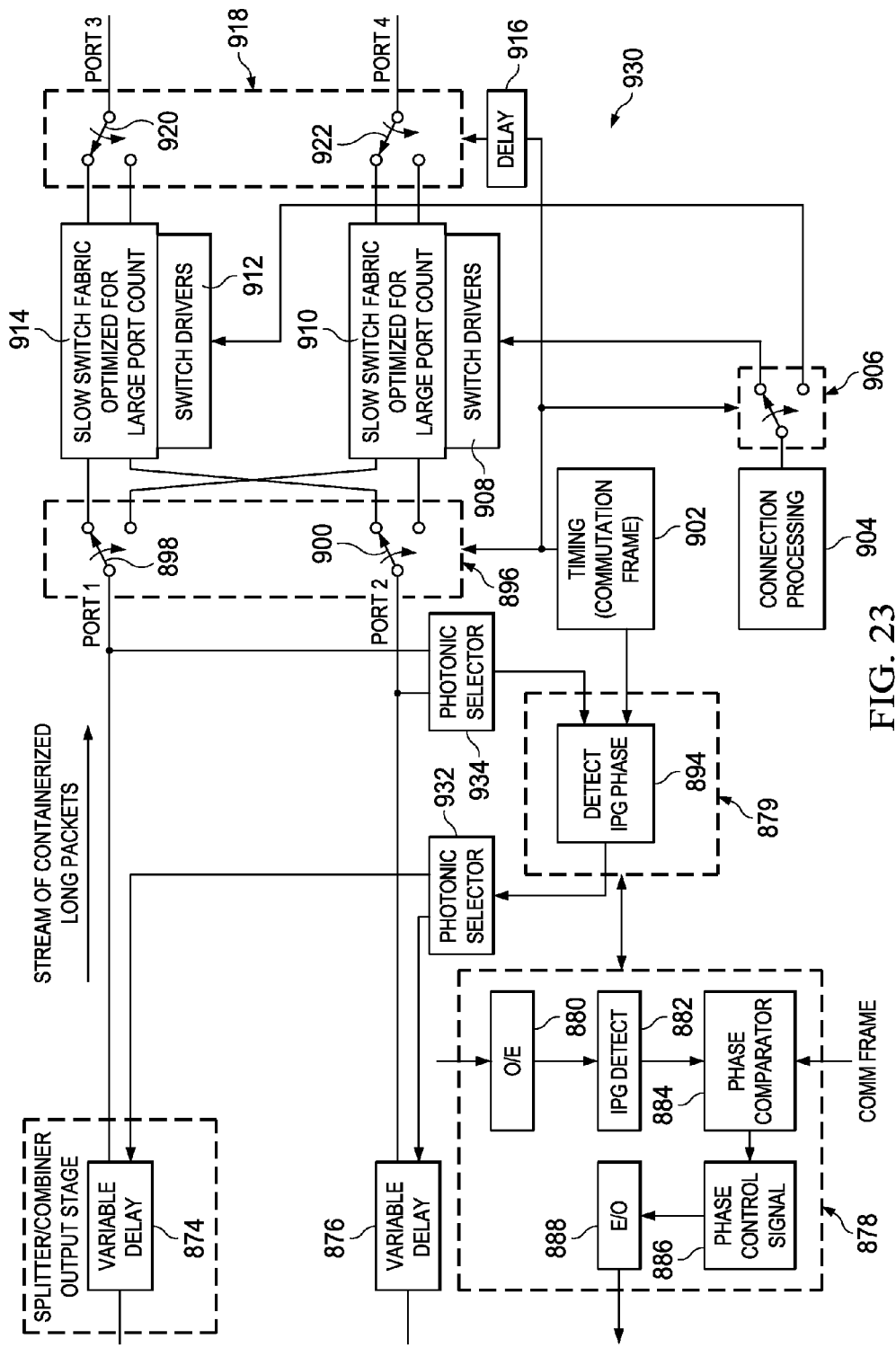
FIG. 23 illustrates another embodiment system for photonic packet switching with phase control and commutation.

FIGS. 22-23 illustrate examples of closed loop locking of the output phase of the splitters so the incoming signals at the commutator are precisely aligned to the commutation frame. FIG. 22 illustrates system 870 for a full-time measurement and correction of the incoming containerized packet data timing by discrimination of the incoming IPG phase at the switch input. System 870 detects errors in the phase of the incoming IPG relative to the local commutation frame and generates a phase correction signal, which is passed back to the originating splitter. This approach provides locking 100% of the time but uses a large number of tapped data signal optoelectronics, one per input port. Splitter/combiner output stages contain variable delay blocks 874 and 876, implemented as part of the splitter electronics before electro-optic conversion (not shown), which drive long packet streams to commutator 896 with switches 898 and 900. At the switch input, the optical signals of the packet streams are split in an asymmetric optical splitter (e.g. 90%:10% or 80%:20% with the higher power going on into the switch) with the lower power tapped component driving detect IPG phase blocks 894 and 890, which detect the phase of the IPG. Timing block 902 with the commutation phase is also fed as the master timing reference into detect IPG phase blocks 894 and 890.

In detect IPG block 878, the optical packet signal is converted to an electrical signal by optical-to-electrical (O/E) converter 880. The IPG is detected by IPG detector 882. Then, the phase of the detected IPG is compared to the timing reference of the commutation frame from timing block 902 by phase comparator 884. A phase control signal is produced based on the output from phase comparator 884 by phase control signal 886. The phase control signal is converted from the optical domain to the electrical domain by electrical-to-optical (E/O) converter 888. The control signal is fed back to variable delay blocks 874 and 876 to adjust the delay such that the measured phase difference between the reference signal from the commutation frame and the measured IPG is zero by a process of adjusting the source IPG phase at the TOR-splitter.

The timing in commutators 896 is set by the commutation frame signal from timing block 902. The commutators connect the packet stream to either high port count switch 914 or high port count switch 910 for the duration of the frame, while the other high port count switch is being set up. The connection processing is performed by connection processing block 904. The output of connection processing block 904 is connected to either switch driver 912 or switch driver 908 by electrical high port count switch 906 are fed to commutator 918 containing switches 920 and 922. The output commutation signal is driven by a delayed commutation signal, which is delayed by delay 916 to compensate for the optical propagation delay through the switch node.

FIG. 23 illustrates system 930 for scanning incoming data phase discrimination at the switch input. A photonic 1:P selector or selectors is inserted between the incoming signal taps and the optoelectronics of the IPG phase detector. In some examples, P may be from around 8 to around 64. This reduces the number of high speed receivers by a factor proportional to the number of inputs on the photonic selector. The control loop operates in a sample and hold phase error measurement mode. The drift of optimum phase for the overall loop, especially the variable delay, is much slower than the scan repetition rate which is applied to these photonic selectors. The overall phase changes between the TOR-based packet splitter and the commutators is dominated by factors such as time dependent changes in the delay of the fiber cable between the TOR based packet splitter and the commutator, especially when the cable is long. These changes are caused by changes in environmental temperature which tend to show up over minutes to months rather than microseconds. With a scan rate, for example of 12 microseconds per step, for a phase measurement over 40×40 GE packets, 100×100 GE packets, or 400×400 GE packets, combined with a value of N between 8 and 64 gives a corrective phase measurement every 96 to 768 microseconds per splitter, which is many orders of magnitude faster than the drift. A 12 microsecond step rate facilitates relatively slow photonic selectors, for example operating in the 1 µs set up range rather than 1 ns set up range.

The tapped off long packet streams are fed to photonic selectors 932 and 934, which send the packets to detect IPG phase block 879 for phase detection. When the phase control signal is created, it is sent back to photonic selectors 932 and 934, where it is sent back to variable delay blocks 874 and 876.

The closed loop control methods control the offset of the incoming IPG from the switch commutation frame to be a small component of the IPG period. The precision depends on the loop gain, the noise in the loop, and any threshold sensitivity of the phase detector.

Commutation may also be applied to the photonic switch control. The use of a synchronous fast circuit switch involves re-computation of the entire switching connection map every frame period. This may be 1.8 microseconds for 40 GE with 9000 byte jumbo-packets, 300 ns for 40 GE with 1500 byte packets, 120 ns for 100 GE with 1500 byte packets, and 30 ns for 400 GE with 1500 byte packets. The process of generating large connection maps may be broken down into multiple sequential smaller, simpler steps, each implemented in a processing resource within a frame period before being handed off to the next processing resource, which implements the next small simple process in a pipeline of process steps implemented in a pipeline of step-dedicated processing blocks.

In synchronous fast circuit switches, there may be a high computation rate, producing connection address routings at a high rate. For a 1024 by 1024 switch, this corresponds to producing 1024 address routings (packet routings) with a first stage routing, a second stage routing, and a third stage routing every packet frame. This corresponds to a peak of $1024 \times 10^9$/300 packet routings ($3.4 \times 10^9$ packet routings) per second for 40 GE packet streams into the switch, $8.5 \times 10^9$ packet routings per second for 100 GE, and $3.4 \times 10^{10}$ packet routings per second for 400 GE.

A divide and conquer approach to producing a stream of connection maps may be used. Small groups of inputs and outputs may be used to simplify the computation in the control flows, creating parallel control flows. Also, serial processing structures may be used, where part of the connection processing is carried out in a processor before it hands off to the next processor in a pipeline. The use of multiple pipelines may alternately handle input based groups and output based groups. Parallel pipelined control architectures are used where groups of addresses based on source addresses are partially processed in a parallel group of processors, which may be a series of processors handling sub-tasks. This is followed by a similar series of processors processing groups of addresses based on destination addresses, which may be a series of processors handling sub-tasks. The source address based processors may be interlinked to the destination address based processors by a series of orthogonal mappers. This may be repeated in series and parallel as needed, breaking down the 1024 address routings per frames into a series of smaller tasks implemented over small groups of inputs or outputs.

This is a parallel orthogonal pipelined approach. It is parallel because the processing is carried out in parallel based on a small number of groups. In a 1024 by 1024 switch, there may be 32+32 groups each of 32 inputs or outputs, dividing the processing into streams producing addresses at one thirty-second of the overall computation level and delivering one thirty-second of the complete connection map every frame. For 100 GE, this corresponds to $2.6 \times 10^8$ address routings per second per pipeline, reduced from $8.5 \times 10^9$. The method is orthogonal from the use of input group based processing and output group based processing sequentially along the pipeline with orthogonal mappers to map from groups of input based results to output based data, and vice versa. The method is pipelined because of the use of multiple processors in series, each of which has one simple task it repeats every frame. The processors may be very fast hard coded controllers or hardware state machines.

The data rate per pipeline may be large. A set-up address has on the order of two bytes per stage or six bytes per total address for a pipelined processor output rate of $2.6 \times 10^8 \times 6 = 1.56 \times 10^9$ bytes/second for 100 GE for a 1024×1024 switch. This rate is 624 Mbytes/second for 40 GE and 6.24 Gbytes/second for 400 GE for the same switch.

Parallel group based pipelined control may be used, where the control computation is broken up into a series of steps, each of which is completed in an ultra-fast computation block to achieve high speeds. An example of a computation block is a custom hardware state machine. This may be performed prior to handing off the intermediate results to the next hardware state machine in the pipeline in time for the current hardware state machine to accept the same task as it completed for the following frame's allocated group of synchronized packet addresses.

A commutated approach may be used in the control system. The left side of FIG. 3 illustrates two way commutation in pipelined control while the right side of FIG. 3 shows four way commutation in pipelined control. The frame specific control input is input into the input commutator 239 or 250, rotating at one position per time-slot. Timing blocks 236 and 252 coordinates the timing.

The control input is the connection map for the next packet frame. This is done by control systems 240 and 242 for P=2, and control systems 260, 262, 264, and 266 for P=4. The control blocks are alternately connected, one packet frame at a time, to the incoming routing requests of complete frames of packets, which are fed from the commutating input switches. $1/P^{th}$ of the information is input into the parallel pipeline processor structure. As the computations are completed they are output for that specific connection time via the output commutator switch, switch 244 and switch 258.

The control blocks may be single processors, pipelined processors, or parallel arrays of pipelined processors. The control blocks receive 1/P of the routing requests and have P times as long to deliver a processed connection map. The connection map may be based on the just received input for a single processor or input from a number of frames previous, which has been processed through a processor pipeline at a pipeline step rate of one processor step per P frames.

The output connection maps from the control modules represent alternating portions of the frame rate stream of connection maps. When P=2, one control module has odd frames, while the other has even frames. These are sequentially combined through the output commutator to provide control of all frames with the control connection map stream. When P=4, the period between successive inputs into the control is four packet frame periods, and the overall workload of the controls is one quarter what it would be with one control block.

The control maps are sent to high port count switch 234 and high port count switch 256. The packet streams have been delayed by delays 232 and 254. This may be performed electronically in a splitter to provide time for the connection processing. The traffic signal is fed to a fast circuit photonic switching fabric to arrive synchronous with the processed controlled from the control system.

Because the commutator inputs control input every P frames to a specific control block, the control block has P times as much time to complete each pipeline element's processing. This may reduce the number of elements in series or provide time for complex elements to complete their tasks.

As pictured in FIG. 3, information is not passed from one frame processing to the next. Alternatively, information may be passed between control systems In one example, a control structure uses a partitioned parallel pipelined control with orthogonal address stream mappers. The pipeline steps are 300 ns for 40 GE and 30 ns for 400 GE. Table 5 shows a pipeline frame rate as a function of packet duration and level of commutation over a range from 40 GE to 400 GE. The relationships between data rates and the consequent long packet duration are shown, with the level of control commutation to produce a change in the control pipeline frame rate which is the period between stages handing off work to repeat their task for the next input. A control frame rate or hand-off period of between 200 ns and 800 ns may be used, setting the level of commutation for any given packet frame rate. However smaller or larger frame rates may also be used.

TABLE 5

|  | 40 GE Long Packets | 100 GE Long Packets | 400 GE Long Packets | 400 GE 9K Jumbo Packets |
|---|---|---|---|---|
| Packet Duration | 300 ns | 120 ns | 30 ns | 180 ns |
| Hand-off period - no commutation | 300 ns | 120 ns | 30 ns | 180 ns |
| Hand-off period - 2 way commutation | 600 ns | 240 ns | 60 ns | 360 ns |
| Hand-off period - 4 way commutation | 1200 ns | 480 ns | 120 ns | 720 ns |
| Hand off period - 8 way commutation | 2400 ns | 960 ns | 240 ns | 1440 ns |
| Hand off period - 16 way commutation | 4800 ns | 1920 ns | 480 ns | 2880 ns |
| Hand off period - 32 way commutation | 9600 ns | 3840 ns | 960 ns | 5720 ns |

For 1024 by 1024 port switches with 40 GE, 100 GE, or 400 GE long packets or 400 GE jumbo packets using 32 parallel pipelines, corresponding to 32 TORs and their associated first stage or third stage, the per-pipeline output address rate in terms of addressed per second pipeline is $1.04 \times 10^8$/sec for 40 GE long packets, $2.6 \times 10^8$/sec for 100 GE long packets, $1.04 \times 10^9$/sec for 400 GE long packets, and $1.72 \times 10^8$/sec for 400 GE jumbo packets. With P-way control commutation, each stream is divided by the value P. Table 6 shows the per pipeline stream address delivery rates as a function of input data rate and control commutation level for a 1024 by 1024 port long packet switch with 32 groups.

Table 6

| Data Rate | P = 1 | P = 2 | P = 4 | P = 8 | P = 16 | P = 32 |
|---|---|---|---|---|---|---|
| 40 GE long packets | $1.04 \times 10^8$ | $5.2 \times 10^7$ | $2.6 \times 10^7$ | $1.3 \times 10^7$ | $6.5 \times 10^6$ | $3.3 \times 10^6$ |
| 100 GE long packets | $2.6 \times 10^8$ | $1.3 \times 10^8$ | $6.5 \times 10^7$ | $3.3 \times 10^7$ | $1.6 \times 10^7$ | $8.3 \times 10^6$ |
| 400 GE long packets | $1.04 \times 10^9$ | $5.2 \times 10^8$ | $2.6 \times 10^8$ | $1.3 \times 10^8$ | $6.5 \times 10^7$ | $3.3 \times 10^7$ |
| 400 GE jumbo packets | $1.72 \times 10^8$ | $8.6 \times 10^7$ | $4.3 \times 10^7$ | $2.2 \times 10^7$ | $1.1 \times 10^7$ | $5.4 \times 10^6$ |

The combination of 32 parallel pipelines, where the pipelines are associated with an input or output group of ports and its associated input or output matrix, combined with commutation of up to 32 ways may reduce the processed data throughput per processor by a factor of 1024. For example, with a very fast processor pipeline delivering 100 million addresses per second and 32 groups per port, the 32 ports for a 400 GE interfaced 1024 by 1024 long packet switch, a control commutation level of about 12 may be used. For 40 GE and 10 million addresses per second with 32 groups of ports, and a group being 8 ports for a 256 by 256 switch, the commutation may be level three.

Figure 24A:
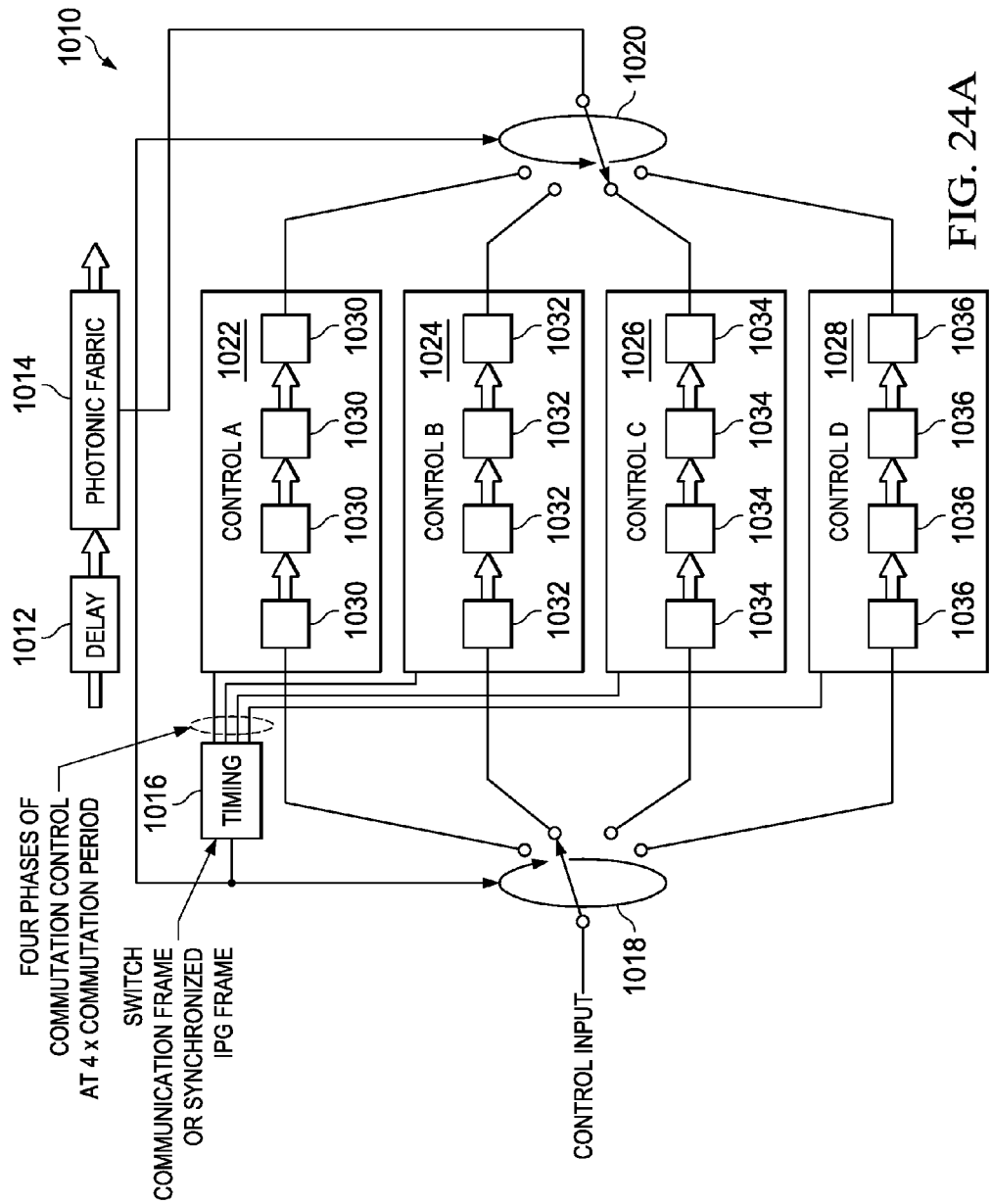
FIGS. 24A-24B illustrate an embodiment system for commutation in control for photonic packet switching and a control timing diagram.
Figure 24B:
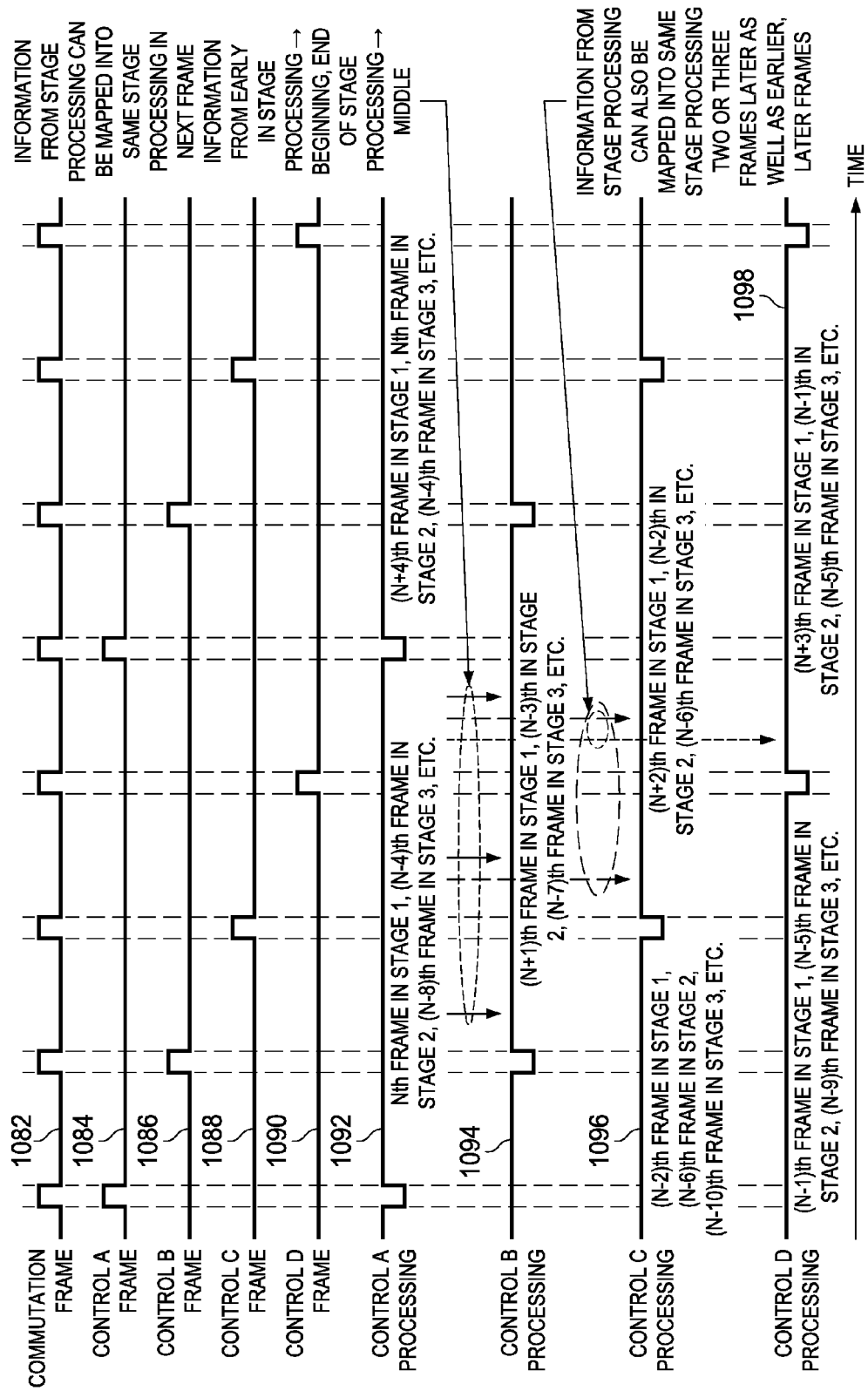

FIGS. 24A-B illustrate commutated pipelined control and a control commutation frame timing diagram for four phase commutation. In pipelined control 1010 in FIG. 24A, the switch commutation frame or synchronized IPG frame is received by timing block 1016. Four phases of commutation control with four times the commutation period are produced by timing block 1016.

Commutator 1018, a four way commutator, is applied to four parallel pipelined control systems control systems 1022, 1024, 1026, and 1028. The control systems contain pipelined control stages, stages 1030, 1032, 1034, and 1036, respectively. While four states are illustrated, another number of stages may be used. For example, 2, 8, 10, 16, or 32 stages may be used. The output is combined by commutator 1020, which recombines the individual quarter time control streams of processed addresses into a single complete control stream, is delayed behind the input commutation to synchronize to and connect to the correct output as the pipelines complete the computation and release the connectivity data for one frame of the switch.

Photonic switching fabric 1014 uses the connectivity map to process the photonic packets, which have been delayed by delay 1012.

The control pipelines are clocked with their individual phase clock at the packet frame rate divided by the commutation level, for example a one quarter rate for four phase commutation. The part-processed data is clocked from one pipeline stage to the next, so the first stage receives and processes a new set of data.

FIG. 24B illustrates a timing diagram for four phase commutation. Trace 1042 shows the commutation frame, traces 1044, 1046, 1048, and 1050 show the control frames for the four control modules, and traces 1052, 1054, 1056, and 1058 show control processing for the four control modules. Every fourth control frame enters a specific control module. 32 packet addresses of a frame per pipeline enter every fourth control frame for a 1024 by 1024 switch with 32 groups. The step changes in the pipeline are clocked by the appropriate phase of a commutation to step the processing to the next processor in the pipelines in synchronism with loading the next frame to be processed. While step 1 is processing the control of packet frame N, step 2 is processing N-4, step 3 is processing N-8, etc.

In the processing, a pipeline stage may determine that it cannot route some of the traffic. For example, two packets in the same frame may have the same destination port address. In one example, when the splitters are in adjacent racks, a back-off signal is sent to one of the splitters commanding it to hold the packet an extra packet frame. This involves lateral communication within the control system, so the delayed packet is correctly routed.

Figure 25A:
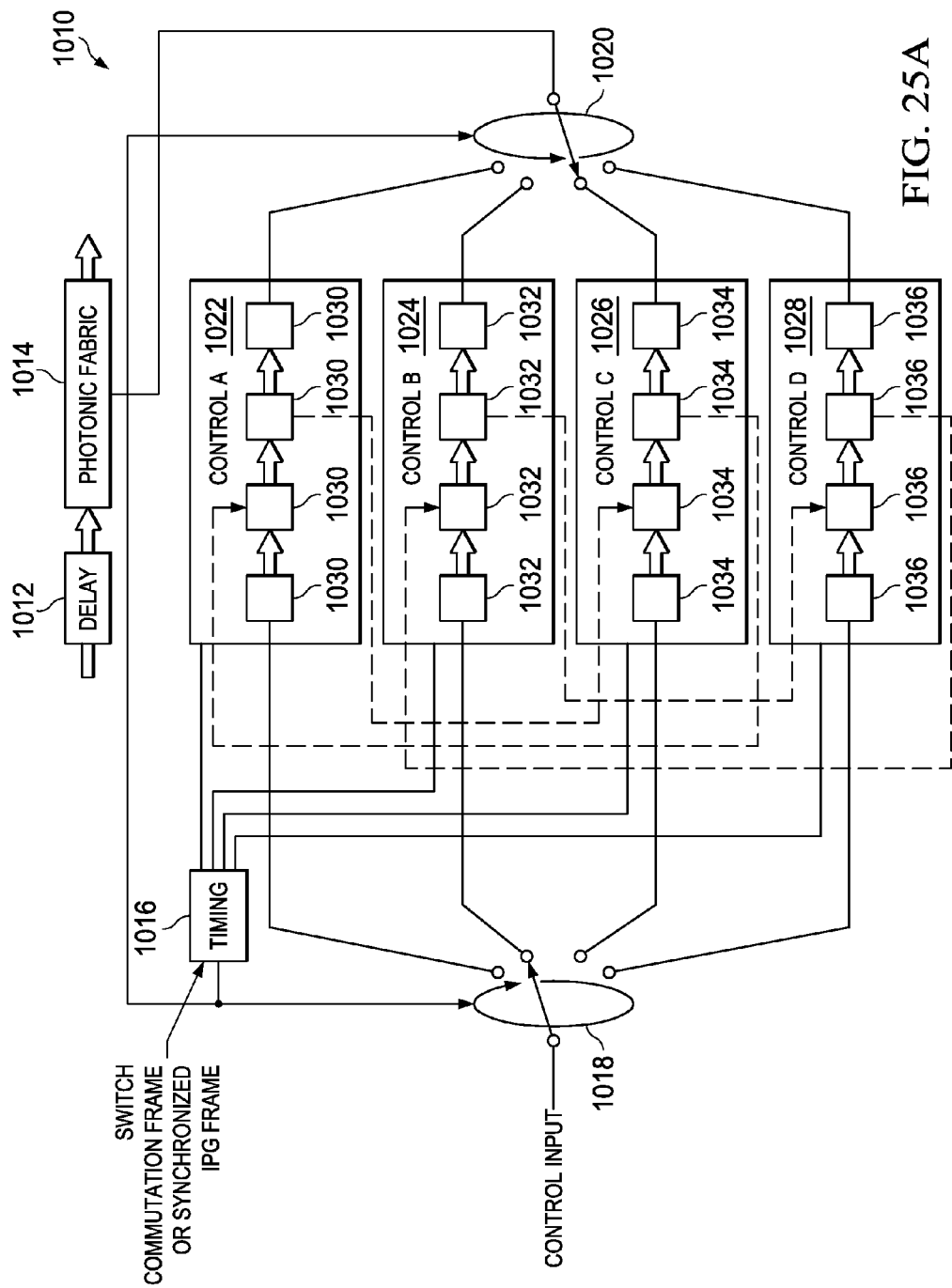
FIGS. 25A-25B illustrate an embodiment system for commutated control for photonic packet switching and a control timing diagram with messages passing between control systems.
Figure 25B:
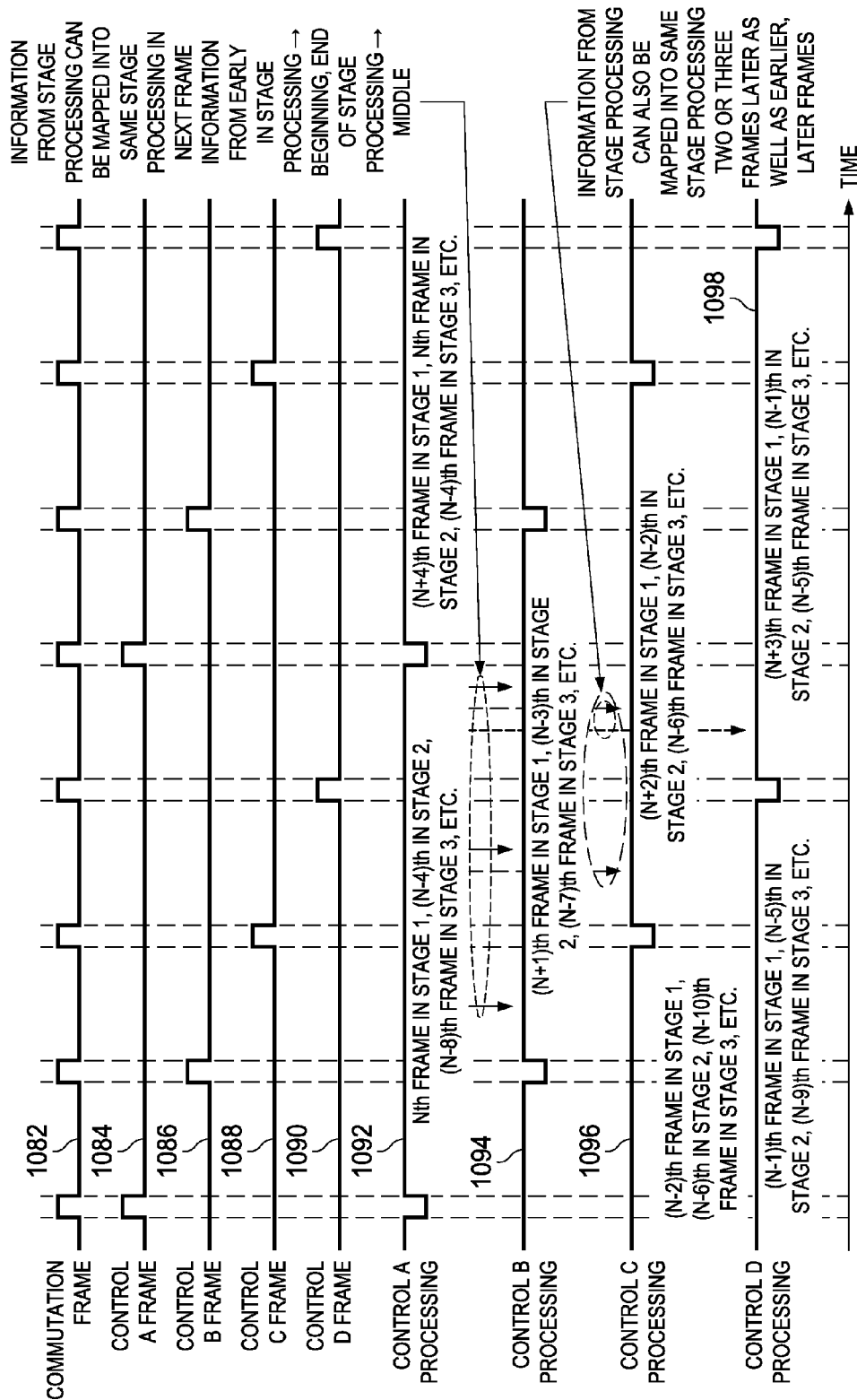

FIGS. 25A-B illustrate an example with laterally transferring information, such as addresses of overflowing packets to the same, earlier, or later processing steps of later phased commutator segments. FIG. 25A shows system 1060 with communication between control modules. There are communications between control blocks 1062, 1064, 1066, and 1068, which contain pipeline elements 1070, 1072, 1074, and 1076. Control systems pass results to appropriate points in the flow of later control processes. For example, addresses of contending packets are sent to a later flow to facilitate one of the packets being switched after the other.

FIG. 25B illustrates a control commutation frame timing diagram for inter-pipeline communications. Curve 1082 shows the commutation frame, curves 1084, 1086, 1088, and 1090 show four control frames, and curve 1092, 1094, 1096, and 1098 show the control processing for the four control modules. Links between the same steps of pipelines may transfer to adjacent one commutation phase later pipelines. This is shown for step 1 of the pipeline, but may occur for any step. This facilitates that a pipeline, having deduced a result in a particular step, transfers that result to the adjacent pipeline for use in the next packet frame when the information may be inserted into the adjacent pipelines for the same step sufficiently early, when there is only a quarter step phase difference. Alternatively, the information is inserted into the same step of the pipeline two commutation phases removed (not pictured). It may be inserted into that later step half a step time earlier operated on for a packet frame two frames later. In one example, one of two packet addresses is passed when it is determined that the two packet addresses have the same destination, and will collide at the destination port. This facilitates serialization of those packets with feedback to the nearby splitters when this determination is made early in the pipeline.

Information from very early in a pipeline processing step may be passed back into the late stages of a previous step.

Figure 26:
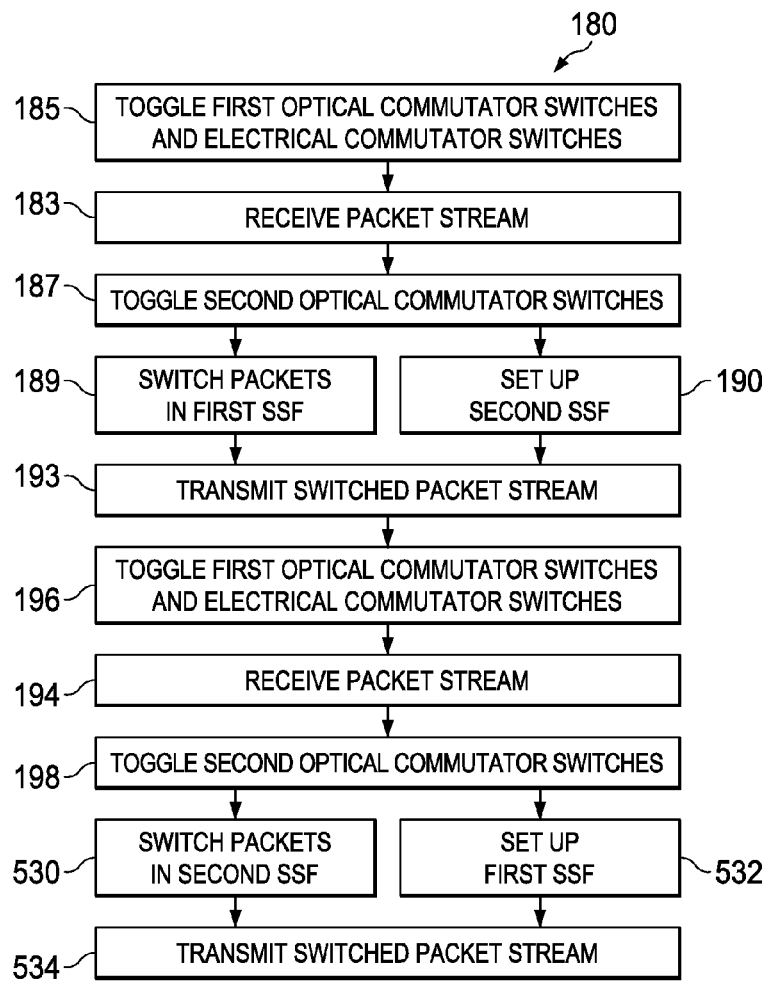
FIG. 26 illustrates a flowchart of an embodiment method of photonic packet switching with commutation.

FIG. 26 illustrates flowchart 180 for a method of photonic packet switching using commutating photonic switches. Initially, in step 185, a first optical commuter switch and an electrical commutator switch are toggled. The first optical commutator switch is a fast optical switch, for example made of lithium niobate. The first optical commutator switch is at the input of a photonic switching fabric and determines which high port count switch an incoming photonic packet is routed towards. The electrical commutator switch determines which high port count switch a control is routed to.

Next, in step 183, the system receives a photonic packet. The packet is routed to the first high port count switch by the first commutator switch.

Then, in step 187, the second optical commutator switch is toggled. The second optical commutator switch is at the output of the high port count switches. There is a delay from toggling the first optical commutator switch and toggling the second optical commutator switch to account for the propagation time of light through the system. The second optical commutator switch may also be made of lithium niobate.

In step 189, the packet is switched by the first high port count switch. The first high port count switch has already been set up. The first high port count switch is a large complex photonic switch which maintains connections for the duration of the packet. The first high port count switch may be a three stage photonic switch. In one example, the first and third stages are solid state crosspoint switches and the second stage is AWG-Rs. Alternatively, all three stages are solid state crosspoint switches. Another number of stages, such as five, may also be used.

Meanwhile, the second high port count switch is being set up for a subsequent packet. Like the first high port count switch, the second high port count switch is a large complex photonic switch.

In step 193, the switched packet is transmitted to its destination TOR.

Then, in step 196, the first optical commutator switch and the electrical commutator switch are toggled so incoming packets are directed towards the second high port count switch and the first high port count switch is being set up for a subsequent packet.

In step 194, the system receives the next packet to be switched. This packet will be switched by the second high port count switch.

Next, in step 198, the second optical commutator switch is toggled. The second optical commutator switch directs the switched packets from the appropriate high port count switch. There is some delay between toggling the first optical commutator switch and the second optical commutator switch to account for propagation delays.

In step 530, the packets are switched by the second high port count switch. These packets are directed to the second high port count switch by the first optical commutator switch.

Meanwhile, the first high port count switch is being set up in step 532. The set up information is sent to the first high port count switch through the electrical toggling switch.

Finally, the switched packets are transmitted in step 534. They are sent to the destination TOR.

Figure 27:
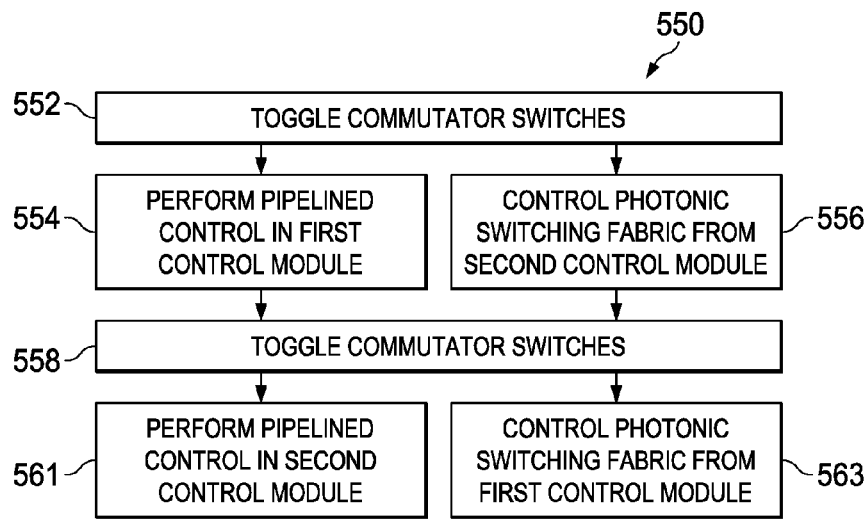
FIG. 27 illustrates a flowchart of an embodiment method of controlling photonic packet switches with commutation.

FIG. 27 illustrates flowchart 550 for a method of commutating control modules. Initially, in step 552, commutator switches are toggled. There are input commutator switches which determine which control modules receive information, and output commutator switches which determine which control modules output control information, for example to a photonic switching fabric.

In step 554, the first control module determines connections for a photonic switching fabric. In one example, the first control module is a pipelined control module. Alternatively, the first control module is a single processor. In a pipelined control module, there are a series of steps, where the input of one step is the output of the previous step. In one example, information is passed from one control module to another control module. For example, when there are contending packets, one control module may tell another to schedule one of the contending packets for the next timeslot. A control module may communicate with another control module which is in an earlier pipelined control step.

Meanwhile, in step 556, a second control module is controlling the photonic switching fabric. In one example, there are several control modules in various stages of pipelined control.

Then, in step 558, the commutator switches toggles.

In step 561, the second control module determines a connection map for the photonic switching fabric. The second control module may receive connection requests.

Meanwhile, in step 563, the first control module controls the photonic switched fabric. This process continues. There may be more control modules.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A photonic switching fabric comprising:
   an input photonic commutator switch configured to receive a photonic frame stream comprising a plurality of containerized photonic packets;
   a first high port count photonic switch coupled to the input photonic commutator switch;
   a second high port count photonic switch coupled to the input photonic commutator switch, wherein the input photonic commutator switch is configured to route the photonic frame to either the first high port count photonic switch or the second high port count photonic switch; and
   an output photonic commutator switch coupled to the first high port count photonic switch and the second high port count photonic switch, wherein the output photonic commutator switch is configured to output a switched photonic frame.

2. The photonic switching fabric of claim 1, further comprising an electrical commutator switch coupled to the first high port count photonic switch and the second high port count photonic switch, wherein the electrical commutator switch is configured to direct a control map to either the first high port count photonic switch or the second high port count photonic switch.

3. The photonic switching fabric of claim 2, further comprising a control module coupled to the electrical commutator switch.

4. The photonic switching fabric of claim 3, wherein the control module comprises:
   an input control commutator switch;
   a first control module coupled to the input control commutator switch;
   a second control module coupled to the input control commutator switch; and
   an output control coupled to the first control module and the second control module.

5. The photonic switching fabric of claim 1, further comprising:
   a third high port count photonic switch coupled to the input photonic commutator switch; and
   a fourth high port count photonic switch coupled to the input photonic commutator switch.

6. The photonic switching fabric of claim 1, further comprising a third high port count photonic switch coupled to the input photonic commutator switch, wherein the input photonic commutator switch is configured to toggle between the first high port count photonic switch and the third high port count photonic switch when an error is detected in the second high port count photonic switch and between the first high port count photonic switch, the second high port count photonic switch, and the third high port count photonic switch when the error is not detected in the second high port count photonic switch.

7. The photonic switching fabric of claim 1, wherein the input photonic commutator switch and the output photonic commutator switch are fast commutator switches, and wherein the first high port count photonic switch and the second high port count photonic switch are multi-stage photonic switching fabrics.

8. The photonic switching fabric of claim 7, wherein the input photonic commutator switch is configured to be set up in a first period of time, wherein the first period of time is shorter than an inter-frame gap in the photonic frame stream, wherein the first high port count photonic switch is configured to be set up in a second period of time, and wherein the second period of time is longer than the inter-frame gap in the photonic frame stream.

9. The photonic switching fabric of claim 1, wherein a first optical path length from the input photonic commutator switch through the first high port count photonic switch to the output photonic commutator switch is approximately equal to a second optical path length from the input photonic commutator switch through the second high port count photonic switch to the output photonic commutator switch.

10. The photonic switching fabric of claim 1, wherein the input photonic commutator switch is incorporated in a switch input stage card and the output photonic commutator switch is incorporated in a switch output stage card.

11. The photonic switching fabric of claim 1, further comprising:
    a variable delay module configured to delay the photonic frame before the input photonic commutator switch; and
    a skew detection module coupled to the variable delay module.

12. The photonic switching fabric of claim 11, wherein the skew detection module is configured to measure an input signal skew at an input of the input photonic commutator switch and perform an adjustment in accordance with the input signal skew.

13. The photonic switching fabric of claim 11, wherein the skew detection module comprises:
    an inter-packet gap (IPG) phase detection module configured to detect an IPG phase of the photonic frame stream; and
    an IPG detection module configured to detect an IPG of the photonic frame stream and produce a phase control signal for the variable delay module in accordance with the IPG phase of the photonic frame stream and the IPG of the photonic frame stream.

14. The photonic switching fabric of claim 13, further comprising a photonic selector coupled between the variable delay and the IPG detection module.

15. A method of photonic packet switching, the method comprising:
    toggling a first optical commutator switch during a first period of time;
    receiving a first packet of a photonic packet stream;
    directing the first packet to a first high port count photonic switch;
    switching the first packet by the first high port count photonic switch to produce a first switched photonic packet during a second period of time, wherein the second period of time is after the first period of time; and
    setting up a second high port count photonic switch during the second period of time.

16. The method of claim 15, further comprising toggling an electrical commutator switch during the first period of time, wherein setting up the second high port count photonic switch comprises receiving control information from the electrical commutator switch.

17. The method of claim 15, further comprising:
    toggling an output optical commutator switch during a third period of time, wherein the third period of time is a first delay after the first period of time; and
    transmitting the switched photonic packet through the output optical commutator switch.

18. The method of claim 17, wherein the first delay is equal to the second period of time.

19. The method of claim 15, further comprising:
togging the first commutator switch during a third period of time, wherein the third period of time is after the second period of time;
receiving a second packet of the packet stream;
directing the second packet to the second high port count photonic switch;
switching the second packet by the second high port count photonic switch during a fourth period of time, wherein the fourth period of time is after the third period of time; and
setting up the first high port count photonic switch during the fourth period of time.

20. A method of controlling a photonic switching fabric, the method comprising:
toggling an input commutator switch during a first period of time;
toggling an output commutator switch during the first period of time;
determining a first connection map for the photonic switching fabric by a first control module during a second period of time, wherein the second period of time is after the first period of time; and
transmitting the first connection map to the photonic switching fabric by a second control module during the second period of time.

21. The method of claim 20, further comprising:
toggling the input commutator switch during a third period of time, wherein the third period of time is after the second period of time;
toggling the output commutator switch during the third period of time;
determining a second connection map for the photonic switching fabric by the second control module during a fourth period of time, wherein the fourth period of time is after the third period of time; and
transmitting the second connection map to the photonic switching fabric by the first control module during the fourth period of time.

22. The method of claim 20, wherein the first control module is a pipeline controller.

23. The method of claim 20, further comprising transmitting, by the second control module to the first control module, a message.

* * * * *